(12) United States Patent
Lampe-Onnerud et al.

(10) Patent No.: US 11,349,147 B2
(45) Date of Patent: May 31, 2022

(54) BATTERY SYSTEMS

(71) Applicant: Cadenza Innovation, Inc., Wilton, CT (US)

(72) Inventors: Maria Christina Lampe-Onnerud, Wilton, CT (US); Jay Jie Shi, Acton, MA (US); Richard V. Chamberlain, II, Fairfax Station, VA (US); Tord Per Jens Onnerud, Wilton, CT (US); Michael Suba, Sandy Hook, CT (US)

(73) Assignee: Cadenza Innovation, Inc., Danbury, CT (US)

( * ) Notice: Subject to any disclaimer, the term of this patent is extended or adjusted under 35 U.S.C. 154(b) by 0 days.

(21) Appl. No.: 17/215,540

(22) Filed: Mar. 29, 2021

(65) Prior Publication Data

US 2021/0408575 A1 Dec. 30, 2021

Related U.S. Application Data

(60) Provisional application No. 63/044,835, filed on Jun. 26, 2020.

(51) Int. Cl.
*H01M 10/0525* (2010.01)
*H01M 10/658* (2014.01)
(Continued)

(52) U.S. Cl.
CPC ..... *H01M 10/0525* (2013.01); *H01M 10/658* (2015.04); *H01M 50/207* (2021.01); *H01M 50/383* (2021.01)

(58) Field of Classification Search
CPC .................. H01M 10/658; H01M 10/9525
See application file for complete search history.

(56) References Cited

U.S. PATENT DOCUMENTS

| 8,785,026 B2 | 7/2014 | Hu et al. |
| 9,685,644 B2 | 6/2017 | Lampe-Onnerud et al. |

(Continued)

FOREIGN PATENT DOCUMENTS

| WO | WO 2014/059348 | 4/2014 |
| WO | WO 2015/179597 | 11/2015 |

(Continued)

OTHER PUBLICATIONS

PCT International Search Report and Written Opinion dated Oct. 18, 2021 for PCT Application No. PCT/US2021/038867.

(Continued)

*Primary Examiner* — Ula C Ruddock
*Assistant Examiner* — Thomas H. Parsons
(74) *Attorney, Agent, or Firm* — McCarter & English, LLP

(57) ABSTRACT

Battery systems are provided that include a plurality of modules positioned within an enclosed space (e.g., a room, data center or storage system), wherein at least one of the modules includes a plurality of lithium ion cells and thermal insulator(s) positioned between adjacent lithium ion cells, and wherein the battery systems offer a requisite level of safety by scaling the system such that the internally available volume of the enclosed space (measured in liters) is in the range of about 39±5 times and 80±5 times the amp-hour (Ah) capacity of lithium ion cell(s) positioned therewithin, and associated methods for safe deployment of battery systems in enclosed spaces. The relevant lithium ion cell(s) for determination of Ah capacity is/are the lithium ion cell(s) that is/are thermally insulated relative to adjacent lithium ion cell(s).

24 Claims, 23 Drawing Sheets

(51) Int. Cl.
*H01M 50/383* (2021.01)
*H01M 50/207* (2021.01)

(56) References Cited

U.S. PATENT DOCUMENTS

| | | | |
|---|---|---|---|
| 9,705,163 B2* | 7/2017 | Lim | H01M 50/20 |
| 9,806,325 B2 | 10/2017 | Woehrle et al. | |
| 9,871,236 B2 | 1/2018 | Lampe-Onnerud et al. | |
| 10,629,876 B2 | 4/2020 | Lampe-Onnerud et al. | |
| 10,637,022 B2 | 4/2020 | Lampe-Onnerud et al. | |
| 10,651,521 B2 | 5/2020 | Onnerud et al. | |
| 2012/0003508 A1 | 1/2012 | Narbonne et al. | |
| 2012/0028107 A1 | 2/2012 | Sugita et al. | |
| 2016/0190549 A1 | 6/2016 | Ohara et al. | |
| 2017/0098806 A1 | 4/2017 | Bowersock et al. | |
| 2017/0214103 A1 | 7/2017 | Onnerud et al. | |
| 2018/0205045 A1 | 7/2018 | Schröder et al. | |
| 2018/0241020 A1 | 8/2018 | Lampe-Onnerud et al. | |
| 2018/0287127 A1 | 10/2018 | Onnerud et al. | |
| 2018/0375076 A1 | 12/2018 | Lampe-Onnerud et al. | |
| 2019/0097204 A1 | 3/2019 | Liposky et al. | |
| 2019/0104636 A1* | 4/2019 | Jochim | H05K 7/1489 |
| 2019/0181419 A1 | 6/2019 | Suba et al. | |
| 2019/0341585 A1 | 11/2019 | Shi et al. | |
| 2020/0062920 A1 | 2/2020 | O'Neil et al. | |

FOREIGN PATENT DOCUMENTS

| | | | |
|---|---|---|---|
| WO | WO 2015/179625 | | 11/2015 |
| WO | WO2015179625 | * | 11/2015 |
| WO | WO 2017/106349 | | 6/2017 |
| WO | WO 2019/227059 | | 11/2019 |
| WO | WO 2020/028168 | | 2/2020 |
| WO | WO 2020/028170 | | 2/2020 |
| WO | WO 2020/072897 | | 4/2020 |
| WO | WO 2020/112618 | | 6/2020 |

OTHER PUBLICATIONS

U.S. Appl. No. 63/044,835, filed Jun. 26, 2020.
U.S. Appl. No. 17/215,540, filed Mar. 29, 2020.
PCT/US21/38867, Jun. 24, 2021.
U.S. Appl. No. 62/044,835, filed Jun. 26. 2020.
PCT/US2021/038867, Jun. 24, 2021.

* cited by examiner

BATTERY SYSTEMS

CROSS-REFERENCE TO RELATED APPLICATIONS

The present application claims priority benefit to a provisional patent application entitled "Battery Systems" that was filed on Jun. 26, 2020, and assigned Ser. No. 63/044,835. The entire content of the foregoing provisional application is incorporated herein by reference.

The present application is also related to a series of previously filed patent applications by the present applicant/assignee, including specifically:
- a PCT application entitled "Lithium Ion Battery" (Serial No. PCT/US2013/064654) and its domestic/international family/progeny (including specifically U.S. Pat. Nos. 9,685,644, 9,871,236 and 10,629,876);
- a PCT application entitled "Lithium Ion Battery with Thermal Runaway Protection" (Serial No. PCT/US2015/031899) and its domestic/international family/progeny (including specifically U.S. Pat. No. 10,651,521);
- a PCT application entitled "Low Pressure Disconnect Device for Lithium Ion Batteries" (Serial No. PCT/US2016/066663) and its domestic/international family/progeny (including specifically US Patent Publication No. 2018/0287127);
- U.S. Pat. No. 10,637,022 entitled "Lithium Ion Battery;"
- US Patent Publication No. 2018/0241020 entitled "Lithium Ion Battery;"
- US Patent Publication No. 2019/0341585 entitled "Lithium Ion Battery;"
- US Patent Publication No. 2019/0097204 entitled "Lithium Ion Battery with Modular Bus Bar Assemblies;"
- US Patent Publication No. 2018/0375076 entitled "Lithium Ion Battery;"
- US Patent Publication No. 2019/0181419 entitled "Overcharge Electrical Disconnect System;"
- a PCT application entitled "Lithium Ion Battery" (Serial No. PCT/US2019/034024) and its domestic/international family/progeny;
- a PCT application entitled "Housing for Rechargeable Batteries" (Serial No. PCT/US2019/043643) and its domestic/international family/progeny;
- a PCT application entitled "Lithium Ion Battery" (Serial No. PCT/US2019/043657) and its domestic/international family/progeny;
- a PCT application entitled "System and Method for Electrolyte Filling and Electrical Connection of Lithium Ion Batteries" (Serial No. PCT/US2019/054685) and its domestic/international family/progeny; and
- a PCT application entitled "Modular Battery System" (Serial No. PCT/US2019/062967.

The entire contents of the foregoing patent applications are incorporated herein by reference.

FIELD OF DISCLOSURE

This disclosure relates to battery systems that include a plurality of modules positioned within an enclosed space (e.g., a room, data center or storage system), wherein at least one of the modules includes a plurality of lithium ion cells and thermal insulator(s) positioned between adjacent lithium ion cells, and wherein the battery systems offer a requisite level of safety by scaling the system such that the internally available volume of the enclosed space (measured in liters) is greater than about seventy (70) times the amp-hour (Ah) capacity of lithium ion cell(s) positioned therewithin, and associated methods for safe deployment of battery systems in enclosed spaces.

The relevant lithium ion cell(s) for determination of Ah capacity is/are the lithium ion cell(s) that is/are thermally insulated relative to adjacent lithium ion cell(s). Thus, if each lithium ion cell is individually thermally insulated from adjacent lithium ion cell(s), then the Ah capacity for purposes of the present disclosure is the Ah capacity of the individual lithium ion cell. Conversely, if a group of lithium ion cells are collectively thermally isolated from adjacent lithium ion cell(s), then the Ah capacity for purposes of the present disclosure is the cumulative Ah capacity of the foregoing group of lithium ion cells. This includes cases where cells are connected in parallel and/or series and then collectively thermally isolated. Describing series-connected cells in terms of an aggregated capacity of individual cells is not typical of standard usage for this term.

BACKGROUND

Lithium ion battery systems are used in a wide array of applications, including energy storage for motive drive and energy storage for stationary systems. These battery systems have modules that incorporate a number of Li-ion cells of varying types, including small cylindrical cells, larger prismatic cells or polymer (or pouch) cells. The capacity and voltage of a system is controlled by connecting the cells in parallel and/or serially within a module.

Larger systems have multiple modules, with similar serial or parallel connections. In order to optimize cost and performance, each serial element of a battery needs to have the same capacity in terms of Ah. Also each string of battery modules or cells in series used in a battery system needs to have the same voltage for safe operation. Depending on the application, these batteries may further have additional mechanical requirements, such as geometrical format/form factor and an ability to be cooled by air or liquid cooling circuits.

In current practice, battery energy storage systems (BESS) are deployed to support the grid during times of high power utilization where local grid points cannot support the flow of energy to areas of high use, such as densely populated areas. In other areas, there is a desire to strengthen the grid to support a higher utilization of solar and wind, as well as hydropower. Cheaper than natural gas, coal and oil, energy from renewable sources can be stored in BESS during low power periods and deployed during high use.

However, a fire risk has been identified in the field where propagating runaway and flammable gases have caused energy storage installations to experience fire and explosions. This risk may be attributed to two main causes:
1. Thermal runaway and propagation; and
2. Exhaust of flammable/explosive gases and associated ignition, resulting in fires of explosive nature A majority of these catastrophic events originate from an internal short in the Li-ion cell, resulting in a cell experiencing thermal runaway and propagation to neighboring cells in the module. Module-to-module propagation then takes place and a cascading fire results that can spread to the entire battery rack and any neighboring battery rack.

A BESS system is typically installed in an enclosure or dedicated building and consists of a number of battery racks that stores the energy, an inverter (which converts the DC voltage to AC voltage that can be connected to the power grid), and control systems that communicate between the battery racks, the inverter, and from inverter to the grid controls (such as a building management systems or a centrally managed dispatch). The risk of propagating runaway of densely packaged Li-ion batteries when an internal fire (usually from an internal short) takes places is a serious issue for widespread adoption and success of Li-ion grid storage systems.

Due to the noted safety concern, a number of standards have been promulgated by Underwriters Laboratories (UL) and the National Fire Protection Agency (NFPA). In addition, some local fire authorities have adopted rules around what constitutes a safe system. At present, the safety data that is generally assessed during permitting (which requires fire department approvals and approvals from the "Authority Having Jurisdiction," i.e., the AHJ) are UL9540 standard (a system level standard), UL1973 standard (battery racks, modules and cells), and UL9540a standard (a test method standard that informs about the safety performance of a battery systems). As an example of local implementation of the noted UL standards, the recently issued NFPA855 standard, which is part of a recent FDNY rule for battery safety, calls for all of these standards to be met and sets criteria such as:

defined distance for separation of battery racks (unless testing justifies otherwise),
  use of deflagration venting systems (when explosion needs to be mitigated),
  gas and smoke sensing, heat detection,
  fire rated walls,
  use of sprinklers or other extinguishing systems,
  associated venting system (to lower flammable gas concentration in the enclosure to below the lower flammability limit (LFL) and thereby avoid explosions), and.
  electrical and other standard safety measures for electrical systems.

Generally, the enclosures themselves requires fire rated walls (2 hours) and high throughput sprinkler systems that are intended to put out a cascading fire before it propagates to neighboring racks, and if such a fire cannot be put out, the racks have to be separated by a specified distance (about 3 ft). All of these systems add to the cost of the BESS and add size to the system, thereby limiting deployment possibilities. In addition, in densely populated areas, safety barriers needs to be created to protect property and people.

Thus, a need exists for improved modular battery systems that may easily be customized and interchangeably used in equipment while accounting for a minimization of alterations required to the surrounding equipment. Such batteries allow the customer of an application to select batteries with varying run time and hence optimize for low cost depending on the customer's specific application and energy storage needs.

SUMMARY

The present disclosure provides advantageous battery systems that offer, inter alia, enhanced safety. Exemplary embodiments of the present disclosure provide a battery system that includes an enclosed space; a lithium ion battery positioned within the enclosed space, the lithium ion battery including a plurality of modules wherein at least one of the plurality of modules includes a plurality of Li-ion cells, and wherein the plurality of Li-ion cells includes a first Li-ion cell and a second Li-ion cell in a side-by-side orientation; and at least one thermal insulator positioned between the first Li-ion cell and the second Li-ion cell, wherein said at least one thermal insulator has a thickness of at least 0.3 mm and an insulating conductivity that is less than 0.5 W/mK, wherein the enclosed space defines an internally available volume measured in liters that is greater than about 39±5 times and less than 80±5 times the amp-hour (Ah) capacity of the first Li-ion cell.

Exemplary implementation of the disclosed battery system include implementations wherein:
  the plurality of Li-ion cells are lithium iron phosphate (LFP) cells, and wherein each of the LFP cells has a capacity in a range of 10 Ah to 70 Ah;
  the internally available volume of the enclosed space is greater than 390±50 liters;
  the internally available volume of the enclosed space is less than 5,600±350 liters;
  the plurality of Li-ion cells are lithium nickel manganese cobalt oxide (NMC) cells, and wherein each of the NMC cells has a capacity in a range of 6 Ah to 50 Ah and, in certain instances, the internally available of the enclosed space is greater than 240±30 liters or the internally available of the enclosed space is greater than 4,000±250 liters;
  each of the Li-ion cells has a pressure-activated vent and, in certain instances, each pressure-activated vents is equipped with a flame arrestor, the pressure-activated vent is activated at a pressure below about 100-300 psi and/or the battery is configured such that, when activated, gas that is released through each pressure-activated vent is directed to a pocket or channel filled with inert gas.
  the at least one thermal insulator is selected from one or more thermal isolation materials disclosed herein;
  the at least one thermal insulator is a ceramic separation structure;
  the at least one thermal insulator is one or more disclosed endothermic materials;
  the at least one thermal insulator includes alumina trihydroxide;
  the at least one thermal insulator includes a metal oxide;
  the at least one thermal insulator includes mineral wool;
  the at least one thermal insulator includes a silicate-based ceramic material;
  the thickness (in mm) of the at least one thermal insulator is equal to or larger than about 1% of the energy density of the Li-ion cell measured as Wh/kg;
  the first Li-ion cell is an individual Li-ion cell; and
  the first Li-ion cell is a group or subset of Li-ion cells that are collectively thermally isolated from second Li-ion cell(s) by the at least one thermal insulator.

The present disclosure also provides method for implementation of the disclosed battery systems.

Additional features, functions and benefits of the disclosed battery systems will be apparent from the description which follows, particularly when read in conjunction with the accompanying figures.

BRIEF DESCRIPTION OF THE FIGURES

To assist those of skill in the art in making and using the disclosed assemblies, systems and methods, reference is made to the appended figures, wherein:

FIG. 7A is an assembled view of the exemplary multi-core subassembly of FIG. 7;

DETAILED DESCRIPTION

Figure 1:
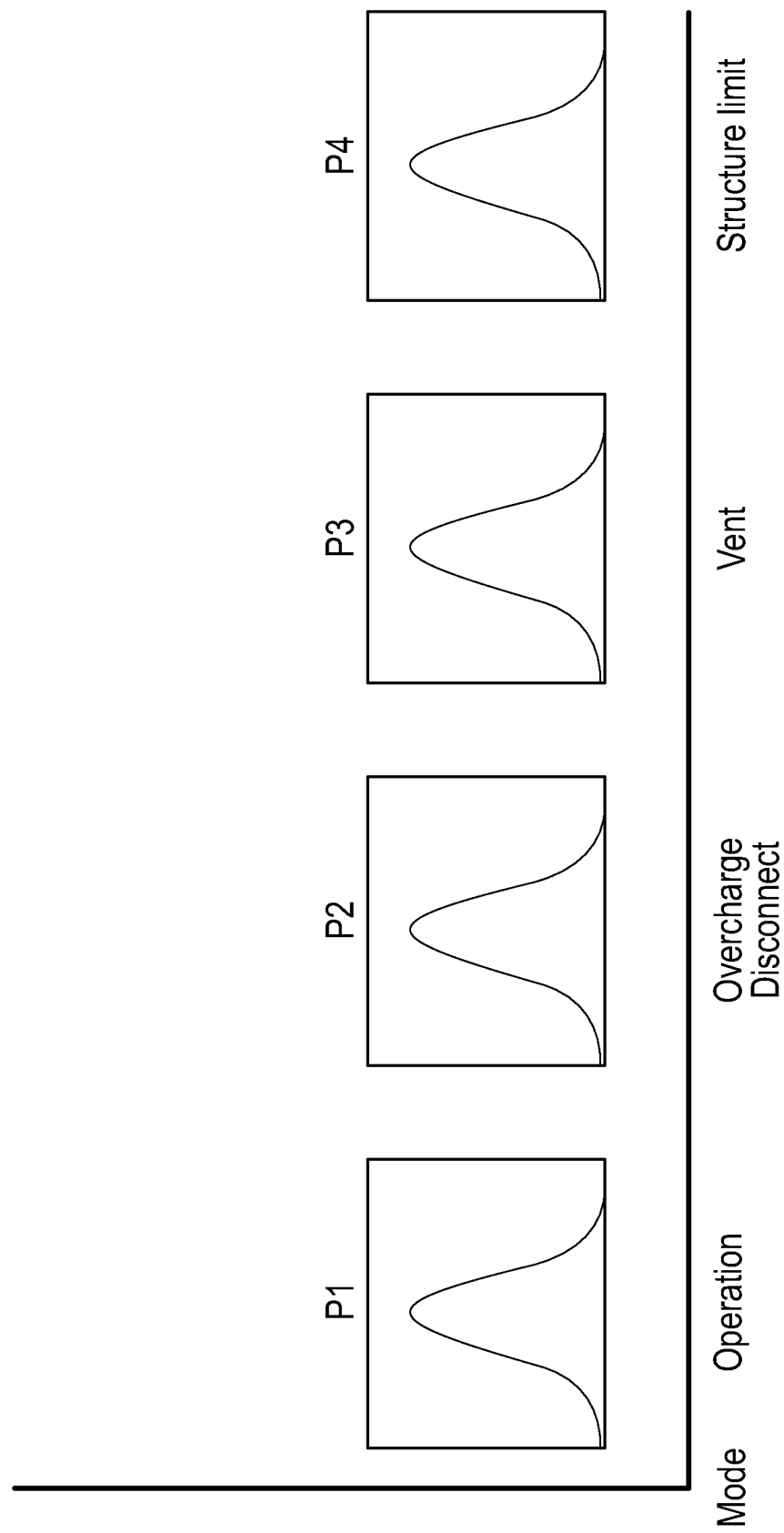
FIG. 1 is a schematic diagram that illustrates the sequence of fail safe mechanisms for a battery system.

The present disclosure provides battery energy storage systems (BESS) that address critical safety concerns, e.g., for grid support and other energy storage/delivery applications. The disclosed battery energy storage systems reduce the potential for fire/explosions by limiting the potential for thermal runaway and propagation, and by addressing risks associated with flammable/explosive gases that may lead to ignition and/or fires of an explosive nature.

In exemplary embodiments of the present disclosure, battery systems are provided that include a plurality of modules positioned within an enclosed space (e.g., a room, data center or storage system). The battery systems of the present disclosure and the associated methods for battery system deployment have broad applicability and utility in enclosed spaces that define an internal contained volume within which the battery systems is positioned and from which it operates, typically in conjunction with other conventional electronics as are known in the battery storage and energy delivery field.

The modules included in the disclosed battery systems generally include a plurality of battery cells, e.g., lithium ion cells, that are designed to store and deliver energy. As is known in the art, the lithium ion cells include an anode, cathode, separator and electrolyte. The lithium ion cells may take various forms, including cylindrical cells, prismatic cells, pouch cells and variations thereon. The present disclosure is not limited by or to a particular electrolyte chemistry, and has applicability/utility across electrolyte chemistries, as are known in the art.

According to the present disclosure, at least one of the modules associated with the disclosed battery system includes thermal insulation material(s) positioned between adjacent lithium ion cells, whereby the thermal insulation material(s) isolate potential temperature increases that may arise on a first side of the thermal insulation material(s) from transferring to lithium ion cell(s) on a second side of the thermal insulation material(s) to the extent necessary to propagate thermal runaway and/or ignition of the lithium ion cell(s) on the second side. In exemplary embodiments, the thermal insulation material(s) are positioned so as to surround or otherwise isolate each individual lithium ion cell relative to adjacent lithium ion cell(s). In other exemplary embodiments, the thermal insulation material(s) are positioned so as to surround or otherwise isolate a group or subset of the lithium ion cells in the module from adjacent lithium ion cell(s). For example, groups/subsets of a plurality of lithium ion cells may be surrounded by or otherwise isolated from adjacent lithium ion cell(s) by inter-positioning of thermal insulation material(s) (e.g., groups/subsets of two lithium ion cells, of three lithium ion cells, of four lithium ion cells, etc.) The groups/subsets of lithium ion cells may be equal in number within a given module, or may vary within a module.

The thermal isolation material(s) may take various forms and may be based on a variety of materials. For example, thermal isolation material(s) may include one or more materials that exhibit endothermic functionalities that contribute to the safety and/or stability of the batteries. In exemplary implementations of the present disclosure, the thermal isolation material(s) may include a ceramic matrix that incorporates an inorganic gas-generating endothermic material. In use, the thermal isolation material(s) may operate such that if the temperature rises above a predetermined level, e.g., a maximum level associated with normal operation, the thermal isolation material(s) may serve to provide one or more functions for the purposes of preventing and/or minimizing the potential for thermal runaway. For example, in addition to thermal insulation, the thermal isolation material(s) may advantageously provide one or more of the following further functionalities: (i) energy absorption; (ii) venting of gases produced, in whole or in part, from endothermic reaction(s) associated with the thermal isolation material(s), (iii) raising total pressure within the battery structure; (iv) removal of absorbed heat from the battery system via venting of gases produced during the endothermic reaction(s) associated with the thermal isolation material(s), and/or (v) dilution of toxic gases (if present) and their safe expulsion (in whole or in part) from the battery system. It is further noted that the vent gases associated with the endothermic reaction(s) dilute the electrolyte gases to provide an opportunity to postpone or eliminate the ignition point and/or flammability associated with the electrolyte gases.

The thermal insulating characteristics of the disclosed thermal isolation material(s) are advantageous in their combination of properties at different stages of their application to lithium ion battery systems. In the as-made state, the thermal isolation material(s) provide thermal insulation during small temperature rises or during the initial segments of a thermal event. At these relatively low temperatures, the insulation functionality serves to contain heat generation while allowing limited conduction to slowly diffuse the thermal energy to the whole of the thermal mass. At these low temperatures, the thermal isolation material(s) are selected and/or designed not to undergo any endothermic gas-generating reactions. This provides a window to allow for temperature excursions without causing any permanent damage to the insulation and/or lithium ion battery as a whole. For lithium ion type storage devices, the general range associated as excursions or low-level rises are between 60° C. and 200° C. Through the selection of inorganic thermal isolation material(s) that resist endothermic reaction in the noted temperature range, lithium ion batteries may be provided that initiate a second endothermic function at a desired elevated temperature. Thus, according to the present disclosure, it is generally desired that endothermic reaction(s) associated with the disclosed thermal isolation material(s) are first initiated in temperature ranges of from 60° C. to significantly above 200° C. Exemplary thermal isolation material(s) for use according to the present disclosure include, but are not limited to:

TABLE 1

| Mineral | Chemical Formula | Approximate onset of Decomposition (° C.) |
| --- | --- | --- |
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

These thermal isolation material(s) typically contain hydroxyl or hydrous components, possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water. If a thermal event associated with a lithium ion battery does result in a temperature rise above the activation temperature for endothermic reaction(s) of the selected endothermic gas-generating material, then the disclosed thermal isolation material(s) will advantageously begin absorbing thermal energy and thereby provide both cooling as well as thermal insulation to the lithium ion battery system. The amount of energy absorption possible generally depends on the amount and type of endothermic gas-generating material incorporated into the thermal isolation material(s), as well as the overall design/positioning of the endothermic materials/systems relative to the source of energy generation within the lithium ion battery. By distributing the heat to the whole thermal mass in a controlled manner, the temperature of the adjacent cells can be kept below the critical decomposition or ignition temperatures. However, if the heat flow through the thermal isolation material(s) is too large, i.e., energy conduction exceeds a threshold level, then adjacent cells will reach decomposition or ignition temperatures before the mass as a whole can dissipate the stored heat.

In exemplary embodiments of the present disclosure, the battery system includes at least one thermal insulator positioned between the lithium ion cell (or cells) to be thermally insulated relative to adjacent lithium ion cells, wherein the at least one thermal insulator has a thickness of at least 0.3 mm and an insulating conductivity that is less than 0.5 W/mK.

With these parameters in mind, the thermal isolation material(s) associated with the present disclosure are designed and/or selected to be thermally stable against excessive shrinkage across the entire temperature range of a typical thermal event for lithium ion battery systems, which can reach temperatures in excess of 900° C. This insulation-related requirement is in contrast to many insulation materials that are based on low melting glass fibers, carbon fibers, or fillers which shrink extensively and even ignite at temperatures above 300° C. This insulation-related requirement also distinguishes the insulation functionality disclosed herein from intumescent materials, since the presently disclosed materials do not require design of device components to withstand expansion pressure. Thus, unlike other energy storage insulation systems using phase change materials, the thermal isolation material(s) of the present disclosure may not be organic and hence would not combust when exposed to oxygen at elevated temperatures. Moreover, the evolution of gas by the disclosed thermal isolation material(s), with its dual purpose of removing heat and diluting any toxic gases from the energy storage devices/lithium ion battery system, is particularly advantageous in controlling and/or avoiding thermal runaway conditions.

The thermal isolation material(s) of the present disclosure may contain a ceramic insulating matrix in combination with an inorganic endothermic material selected to produce off-gassing at temperatures above normal operating temperatures of the battery system, but lower than a predetermined temperature liable to lead to thermal runaway due to heating.

According to exemplary embodiments of the present disclosure, the amount of endothermic material is above zero and at an amount effective to provide heat-carrying and gas-diluting effects. As low as 1% by weight gas-generating endothermic material may be effective dependent upon device design, but higher quantities may be desired.

In exemplary embodiments in which the thermal isolation material(s) include a ceramic matrix and an endothermic material, the ratio of ceramic matrix to endothermic material may be in the range 1:19 to 9:1 by weight and preferably in the range 1:9 to 6:4 by weight. Alternative relative levels may be implemented without departing from the spirit or scope of the present disclosure, provided desired functionalities are achieved within the battery system.

In exemplary embodiments in which the thermal isolation material(s) includes a ceramic matrix, the ceramic matrix typically includes inorganic fibers and binders, and may include particulate materials. The particulate materials may be microporous in nature, and may include fumed ceramics, opacifiers, and mixtures thereof. The binders may include liquid binders, dry binders or both, and may be inorganic, organic, or both. Opacifiers may be present and, dependent on product form, the thermal isolation material(s) may include water or other solvent as a constituent.

A typical but non-limiting formulation of an exemplary thermal isolation material is described in the following Table 2:

TABLE 2

| MATERIAL CATEGORY | WT. % |
| --- | --- |
| Ceramic Oxide Powder | 0-60 wt % |
| Opacifier | 0-30 wt % |
| Endothermic Material | 10-90 wt % |
| Dry Binder | 0-10 wt % |
| Liquid Binder | 0-60 wt % | with the above named components amounting to greater than 60%, greater than 70%, greater than 80%, or greater than 90% of the thermal isolation material. The proportions of the components may vary according to product form.

Inorganic fibers generally function to provide structural strength, insulating properties and to prevent shrinkage at elevated temperatures. The structural strength the fibers impart allows for the thermal isolation material(s) to resist flexural stresses that may cause excessive cracking, either during normal operation or during thermal events. Since the fibers are not organic or pure-carbon based, they will not combust and hence will not contribute to exothermic heat generation. During elevated temperature excursions, the fibers will generally serve to hold the matrix together due to their refractory nature, unlike those that combust or melt at temperatures less than the 900° C., i.e., temperatures often achieved during thermal events. Fibers that may be employed according to the present disclosure include ceramic, E-glass, S-Glass, polycrystalline, phosphoric, leached silica, quartz or zirconia fibers. Depending on design criteria, inorganic fibers may be absent, but typically may be present in amounts of 3% or more.

Microporous insulating materials typically include inorganic oxides in which the pore size is so small that the material interferes with the mean free path of gas due to convection, while also minimizing conduction through minimizing contact points between the particles. Typical materials utilized for microporous materials are ceramic oxide powders, for example, fumed silica, fumed alumina, fumed zirconia, or mixtures thereof. The amount of microporous material necessary for exemplary implementations of the present disclosure is generally a function of the nature of the battery system. According to the present disclosure, microporous material may be included in the disclosed thermal isolation material(s) at levels ranging from 0% (i.e., non-present) through to embodiments with up to 60% microporous material. The purpose of the microporous component is generally to insulate the affected cell(s) to a level that the heat flux that does flow outward is sufficiently low that it can be conveyed through the whole of the assembly by conduction without raising any point outside the affected cell(s) above the thermal ignition point. For example, if the overall design of the battery system includes relatively small cells that are sufficiently insulated and/or the battery system is characterized by relatively low energy capacity, then very little if any microporous material may be needed. For example, in such circumstance, the insulating characteristics of the ceramic fiber matrix materials may be enough. If, however, the insulated cell(s) contain(s) a high level of potential thermal energy, then a relatively high amount of microporous material may be necessary and/or desirable to prevent adjacent cells from rising above the ignition temperatures while also providing time for the endothermic materials to react and absorb energy if the temperatures become high enough.

The opacifier is a component that may augment the performance of the thermal isolation material(s) during thermal upset conditions where the temperatures rise into the levels of radiant heat. The potential need for opacifiers is generally dependent upon the heat release characteristics of the battery system analogous to the description above for the microporous component. If the temperatures during a thermal event are sufficiently high to reach radiant heat temperatures, then an opacifier will help to slow transmission of any radiant heat generated. A microporous material, fiber matrix or a combination thereof may not be effective against radiant heat transfers by themselves. Common opacifier materials include $TiO_2$, silicon, alumina, clay (which may function both as opacifier and binder), SiC and heavy metal oxides. These opacifiers do not provide any function at normal operating temperatures or even at lower temperatures during a thermal event. The opacifiers tend to be high in cost and very dense and, therefore, add weight to the battery system. Depending upon the design of the battery system and the nature of the heat release during a thermal event, the range for opacifier additions may range from 0 to 30 percent.

An endothermic material constituent may offer significant benefits according to exemplary embodiments of the present disclosure. It is known that most energy storage devices/ lithium ion batteries function well at 60° C. or below. The disclosed endothermic materials/systems of the present disclosure are generally designed and/or selected to begin their respective endothermic reaction(s) above this temperature, but preferably low enough that the endothermic materials/ systems can begin absorbing heat energy generated during a thermal event at the initial moments of such an event to minimize temperature rise in the affected cells and adjacent cells. Upon exceeding a set level above the normal operating temperature, the endothermic material absorbs heat and evolves gas. The evolving gas serves to dilute, neutralize and carry away heat. Also, the sudden generation of heat can be used to signal or cause the vents in energy storage devices to begin venting. The amount of endothermic material needed or desired generally depends upon device configuration, energy density and thermal conductivity of the remainder of the thermal isolation material(s). Endothermic materials/systems with 76% or more by weight endothermic gas-generating material are contemplated, although differing ratios and/or ranges may be employed.

The amount of endothermic gas-generating material may also be regulated to achieve a desired volume of gas generation and the selection of type can be used to set the temperature at which the endothermic gas generation should occur. In highly insulating systems, a higher temperature may be desired whereas, in less insulating systems, a lower temperature may be needed to prevent temperatures in neighboring cells reaching critical ignition temperature. Typical inorganic endothermic materials that meet these requirements include, but are not limited to, the following endothermic materials:

TABLE 3

| Mineral | Chemical Formula | Approximate onset of Decomposition (° C.) |
|---|---|---|
| Nesquehonite | $MgCO_3 \cdot 3H_2O$ | 70-100 |
| Gypsum | $CaSO_4 \cdot 2H_2O$ | 60-130 |
| Magnesium phosphate octahydrate | $Mg_3(PO_4)_2 \cdot 8H_2O$ | 140-150 |
| Aluminium hydroxide | $Al(OH)_3$ | 180-200 |
| Hydromagnesite | $Mg_5(CO_3)_4(OH)_2 \cdot 4H_2O$ | 220-240 |
| Dawsonite | $NaAl(OH)_2CO_3$ | 240-260 |
| Magnesium hydroxide | $Mg(OH)_2$ | 300-320 |
| Magnesium carbonate subhydrate | $MgO \cdot CO_{2(0.96)}H_2O_{(0.3)}$ | 340-350 |
| Boehmite | $AlO(OH)$ | 340-350 |
| Calcium hydroxide | $Ca(OH)_2$ | 430-450 |

As noted above, these endothermic materials typically contain hydroxyl or hydrous components, possibly in combination with other carbonates or sulphates. Alternative materials include non-hydrous carbonates, sulphates and phosphates. A common example would be sodium bicarbonate which decomposes above 50° C. to give sodium carbonate, carbon dioxide and water.

In exemplary embodiments of the present disclosure, jelly rolls or enclosed jelly roll units in a multi-core electrochemical assembly are located in a housing, where individual jelly rolls or enclosed jelly roll units are separated by a housing material or a combination of housing materials. Examples of commercially available enclosed jelly rolls units are 18650, 183765, 26650 and other types of Li-ion cells, available from companies such as Sanyo, Panasonic, Sony, Samsung, LG, and many others. Each of the jelly rolls or enclosed jelly roll units are surrounded in part or in full by the housing materials. One of the purposes of using a housing is to increase safety through delaying heat propagation between jelly rolls upon thermal abuse. Another purpose of the housing is to mechanically protect the jelly rolls or enclosed jelly roll units by absorbing damage otherwise made by impact energy, external penetration, prevention of vibration damages to the structure, to mention a few mechanical failures. The housing can have different configurations and formats. It can include cylindrical holes formed in a block where individual jelly rolls can be held in these cylindrical holes. It can be plates, fabric pads or meshes inserted between jelly rolls or wrapping individual jelly rolls to separate them, hold them in position and provide mechanical support. The housing material can include or consist of metal foams, such as aluminum foams, nickel foams and stainless steel foams. Suppliers for these foams include Cymat and ERG. The housing can also be formed from solid, porous or microporous ceramics, such as alumina, silicate based ceramics and $ZrO_2$, etc. Suppliers of such materials include ERG, CeramaTec, Morgan Advanced Materials, Saint Gobain, Zircar, and Coors. Specific materials include, but are not limited to, the following vendors: material types; CeramTec: porous $Al_2O_3$—$SiO_2$ composite (V 38 Alumina): 96% $Al_2O_3$; ZIRCAR CERAMICS: micro porous $SiO_2$—SiC composite (MICROSIL): $SiO_2$: 85%, SiC: 15%; Morgan Advanced Materials: microporous ceramics (Min-K, BTU-BLOCK and Kaowoo): Kaowoo: $Al_2O_3$—$SiO_2$; Refractory Specialties: microporous ceramics (MicroCell): MicroCell S: $Al_2O_3$—$SiO_2$ 10%-35% others 55%; Induceramic: Porous ceramics (TC1250, TC1600 and TC1750): $Al_2O_3$—$SiO_2$ composites ($Al_2O_3$ in TC1250: 45%, in TC1600: 72% and in TC1750, 96%). Housing materials can further include or consist of metals and carbon materials, such as Al, stainless steel, Ni, graphite and carbon composites. Furthermore, housing materials can include or consist of polymer materials, such as polyethylene, polypropylene, ethylene and propylene copolymers and Teflon.

In an exemplary embodiment, at least one heat absorbing agent is incorporated into the housing materials to form a composite housing material. This heat absorbing agent can be positioned through the material as a composite, in pores of the material, or in pockets formed inside the housing. The heat absorbing agents may function to absorb heat from jelly rolls having enhanced temperature at a certain transition temperature, either through chemical reactions or physical transformations. One example of a chemically heat absorbing material is sodium bicarbonate. When the system temperature is above 50° C., sodium bicarbonate endothermically decomposes to sodium carbonate, carbon dioxide and water.

In further exemplary embodiments of the present disclosure, a plurality of endothermic materials are incorporated into the same energy storage device/lithium ion battery, wherein the constituent endothermic materials initiate their respective endothermic reactions at different temperatures. For example, sodium bicarbonate may be combined with $Al(OH)_3$ [also known as ATH (aluminum trihydrate)] to provide a dual response endothermic material/system according to the present disclosure. In such exemplary implementation, the sodium bicarbonate can be expected to begin absorbing energy and evolving gas slightly above 50° C., whereas ATH would not begin absorbing energy and evolving gas until the system temperature reached approximately 180-200° C. Thus, it is specifically contemplated according to the present disclosure that the endothermic material may be a single material or mixture of endothermic materials.

It should be noted that some materials have more than one decomposition temperature. For example, hydromagnesite referred to above as having a decomposition temperature starting in the range 220-240° C. decomposes in steps: first by release of water of crystallization at about 220° C.; then at about 330° C. by breakdown of hydroxide ions to release more water; then at about 350° C. to release carbon dioxide. However, these steps in decomposition are fixed and do not permit control of at what temperatures heat is absorbed and at what temperatures gas is generated.

By use of a mixture of two or more endothermic materials having different decomposition temperatures, the cooling effect can be controlled over a wider temperature range than with one material alone. The two or more endothermic materials may comprise one or more non-gas generating endothermic materials in combination with one or more gas-generating materials.

By use of a mixture of two or more endothermic materials evolving gas at different decomposition temperatures, the production of gas can be controlled over a wider temperature range than with one material alone. The number and nature of endothermic materials used can hence be tailored to give tailored heat absorption and gas evolution profiles. Such tailoring of heat absorption and gas evolution profiles by mixing different endothermic materials allows the control of the evolution of temperature and pressure to meet design requirements of the apparatus in which the material is used.

The binder phase of the insulation can be inorganic or organic in nature, but is preferably inorganic. The intent of the binder phase is to provide adequate structural integrity to assemble the device, hold the cells in place during normal operation and, optionally, to provide mechanical stability during a thermal event. The type and amount of binder can be varied to allow for the desired rigidity necessary for assembly and in-service mechanical performance. An example of a binder that would allow a highly flexible insulation material is a natural and/or synthetic latex material. One or more starches could be used to produce more rigid formations. Thermosetting binders may also be utilized, especially when high levels of microporosity are utilized. For those applications where organic binders are not desirable, then inorganic binders are advantageously employed, such as, but not limited to sodium silicate, potassium silicate, colloidal silica and colloidal alumina. Refractory clay(s), such as kaolin, may also be used as binder(s). These clays also contain water, which at highly elevated temperatures volatizes off in an endothermic manner, providing further benefit in the disclosed systems. All of the inorganic binders can be added to the insulating material either in solution/suspension or in a dry form depending upon the forming process employed.

It is noted that not all constituent materials disclosed with respect to the endothermic materials/systems of the present disclosure are compatible with the commonly applied manufacturing routes. For this reason, the design requirements of a particular energy storage device/battery may dictate the necessary and/or desired manufacturing route. In selecting manufacturing method(s) for a particular application, it is noted that:

a. A brittle material is not as good as a material that can be deformed without cracks during mechanical abuse. Accordingly, manufacturing methods and formulations that minimize the brittleness, and increase the deformability, of the disclosed endothermic materials/systems are generally preferable.

b. A material that is soft is generally preferable as compared to a hard material from a point of not being able to penetrate the jelly rolls and cause internal shorts. On the other hand, a hard material can increase the strength so that crash can be mitigated and protect the jelly roll. Accordingly, manufacturing methods and formulations that optimize the noted balance of soft/hard attributes in fabricating the disclosed endothermic materials/systems are generally preferable.

c. Once the cell or module is deformed, it is desirable that the endothermal protection is as homogenous as possible even after the crash, so that thermal protection is intact. Accordingly, manufacturing methods and formulations that deliver homogeneity are generally preferable.

d. If the endothermic material/system contains water and is to be used with an energy storage device sensitive to water, the vapor pressure of water associated with the endothermic material/system in normal operating temperatures of the associated electrical storage device is desirably low.

e. Differing regions of a device that includes a plurality of electrical storage devices may require different levels of endothermic materials and so a material having different concentrations of endothermic material through its extent may be applied. For example the material may include:

a surface region having a higher concentration of endothermic material than a region within the body of the material; and/or a surface region having a higher concentration of endothermic material than a different surface region of the material By way of example, four exemplary manufacturing methodologies/formulation combinations are described below. However, the present disclosure is not limited by or to these exemplary modalities.

Dry Pressing

One exemplary method of manufacture of the disclosed endothermic materials/systems according to the present disclosure is to first dry blend the constituents together and then press them into a desired initial shape under high pressures until a microporous structure is formed. If high green strengths are desired, then a dry thermosetting binder can be added in the blending step, in which case the shape is held at temperatures below that at which gas would evolve from the endothermic material, but high enough to set the thermosetting binder. This can be done either during the pressing step or afterward. Once completed, the resulting shape can be machined to the specified design. A typical formulation for this manufacturing route is given below.

TABLE 4

Typical dry pressed shape formulation

| MATERIAL CATEGORY | WT. % |
| --- | --- |
| Ceramic Powder | 0-60 wt % |
| Opacifier | 0-30 wt % |
| Endothermic Material | 10-60 wt % |
| Dry Binder | 0-10 wt % |
| Fiber | 3-15 wt % |

Infiltration of a Preform

In an alternative exemplary method of manufacture of the disclosed endothermic materials/systems according to the present disclosure, the product is formed in a process in which a fiber component is first preformed into a shape (preform), and then subsequently infiltrated with a suspension containing the remaining constituents.

The preform may be created using commonly applied vacuum forming techniques employed by other industries, such as pulp molding, paper and ceramic fiber shapes. In these processes, a dilute suspension of the fiber component in a liquid (a slurry) is exposed to a mesh screen upon which the slurry constituents build up as the liquid (typically water) is drawn through. The concentration of the slurry varies to match the process being used and fiber properties. An organic or inorganic binder may also be incorporated into this step. Once the shape (or flat material) builds to a desired thickness, it is removed from the suspension and dried until sufficient handling strength and open porosity is achieved to allow for infiltration.

Infiltration may be accomplished by submerging the preform (or flat material) into a suspension of the remaining non-fiber constituents of the present disclosure. Capillary action draws the suspension into the porosity, displacing air in the process. Infiltration can be assisted through the application of either vacuum or pressure, if needed. The infiltrated part is then dried to remove water. Once water is removed, the binder (if present) will harden. The resultant material can then be further machined and/or processed, if required, or used as is, if appropriate.

This manufacturing route lends itself to producing formulations with high endothermic material loading, readily achieving an 80% loading and extendable to higher loadings still. Table 5 shows the dry ingredients of a typical fiber preform (where there is reference to liquid binder, this means the set residue of a liquid binder).

TABLE 5

Typical fiber preform formulation (dry)

| MATERIAL CATEGORY | WT. % |
|---|---|
| Ceramic Oxide Powder | — |
| Opacifier | — |
| Endothermic Material | — |
| Dry Binder | 0-10 wt % |
| Liquid Binder | 10-40 wt % |
| Fiber | 50-90% |

The following Table 6 shows a typical infiltration suspension (where there is reference to liquid binder, this means the liquid binder before setting).

TABLE 6

Typical infiltration suspension

| MATERIAL CATEGORY | WT. % |
|---|---|
| Ceramic Oxide Powder | — |
| Opacifier | 0-20 wt % |
| Endothermic Material | 4-85 wt % |
| Dry Binder | 0-5 wt % |
| Liquid Binder | 0-40 wt % |
| Fiber | — |
| Water | 15-45 wt % |

A typical composition for the resulting final shape of the present disclosure produced by this manufacturing route is given below (where there is reference to liquid binder, this means the set residue of a liquid binder).

TABLE 7

Typical final formulations for infiltrated part

| MATERIAL CATEGORY | WT. % |
|---|---|
| Ceramic Oxide Powder | — |
| Opacifier | 0-16 wt % |
| Endothermic Material | 32-80 wt % |
| Dry Binder | 0-5 wt % |
| Liquid Binder | 2-40 wt % |
| Fiber | 10-18 wt % |

Vacuum Forming

One characteristic of the infiltration technique is the presence of a concentration gradient of the non-fiber constituents. The concentration is greatest on the outer surfaces and decreases towards the center. This is caused by the insulating matrix acting as a filter and restricting infiltrate as it travels further the surface. One-method for reducing non-uniform distribution is to form the disclosed endothermic material/system with all the constituents in one step. In this exemplary vacuum forming manufacturing method, all of the constituent materials are introduced into the initial dilute slurry suspension. The suspension is then formed into the desired shape (or flat material) via standard vacuum forming techniques commonly applied in pulp molding, paper and ceramic fiber industries. The resulting part or paper is then dried and can be used as made, or further machined.

This technique has the advantage of producing a more homogenous shape, but is not well suited for producing formulations with very high loadings of non-fiber constituents. This is due to blinding of the forming screens that interferes with the ability of the suspension to be pulled through. This technique is, therefore, more applicable to thin products, such as papers, or near net shapes where the cross sections are less than 10 mm in thickness. The use of a water suspension generally precludes the use of fumed oxides because these materials cannot create microporous structures once exposed to water.

The following Table 8 shows typical vacuum formed shape chemistry excluding process water and in which, where there is reference to liquid binder, this means the unset liquid binder.

TABLE 8

Typical vacuum formed shape chemistry

| MATERIAL CATEGORY | WT. % |
|---|---|
| Ceramic Oxide Powder | — |
| Opacifier | 0-30 wt % |
| Endothermic Material | 10-85 wt % |
| Dry Binder | 0-10 wt % |
| Liquid Binder | 3-15 wt % |
| Fiber | 3-60 wt % |

Moldable Products

The endothermic materials/systems according to the present disclosure can also be made as a moldable material for use in forming the assembly of the energy storage device/battery instead of in the form of an article. The manufacturing of the moldable version typically starts with wet mixing constituents in a mixer until well mixed (e.g., for approximately 10 minutes). A biocide may be added at this point to prevent mold growth during storage. pH modifiers may be included, if required. Once mixing is complete, the moldable products can then be packaged into caulking tubes or drums for storage and distribution prior to assembly. During assembly, the moldable material may be injected, pressed, or otherwise placed into the areas to be insulated and the resultant assembly dried to remove water.

Typically, if an inorganic binder is used, then the dried part will adhere very tightly to the non-insulation components, adding to the structural integrity of the device. Such a moldable material requires little or no additional machining after drying.

A typical formulation for the moldable production method in given below in Table 9. Due to the nature of fumed ceramic oxides, they generally cannot be wet processed with water, so this manufacturing method normally precludes their incorporation into implementations of the present disclosure.

TABLE 9

Typical mouldable formulation

| INGREDIENTS | WT. % |
|---|---|
| Ceramic Oxide Powder | — |
| Opacifier | 0-15 wt % |
| Endothermic Material | 10-60 wt % |

TABLE 9-continued

Typical mouldable formulation

| INGREDIENTS | WT. % |
|---|---|
| Clay Binder | 0-10 wt % |
| Liquid Binder | 5-60 wt % |
| Fiber | 0-10 wt % |
| Added Liquid (e.g., Water) | 0-70 wt % |

It should be noted that the liquid present may include the liquid binder and/or also include added liquid. Setting agents for the liquid binder may be included in the added liquid.

Other Forms

The materials may be in the form of a foam that is chemically and/or mechanically foamed. Foamed ceramics are known for insulation purposes [e.g. U.S. Pat. No. 4,596, 834] and the endothermic material may include part of the constituents of the foam and/or be subsequently impregnated into the foam. Compositions similar to the moldable composition may be foamed.

Typical Compositions

Below are given exemplary compositions that have been demonstrated to provide effective endothermic properties/functionalities according to the present disclosure.

TABLE 10

| Material Category | Description | Pressed Shape | Injectable Paste | Infiltrated Board | Vacuum Shape or Paper |
|---|---|---|---|---|---|
| Ceramic Oxide Powder | Fumed silica type P | 36.50 | 0.00 | 0.00 | 0.00 |
| Ceramic Oxide Powder | Micronized silica | 7.50 | 0.00 | 0.00 | 0.00 |
| Endothermic Material | Alumina Trihydrate | 49.00 | 47.00 | 80.00 | 72.40 |
| Binder | Heat Set Resin binder | 2.00 | 0.00 | 0.00 | 0.00 |
| Binder | Latex Binder | 0.00 | 0.00 | 0.00 | 6.11 |
| Binder | Potassium Silicate (48% solids content) | 0.00 | 10.00 | 0.00 | 0.00 |
| Binder | Colloidal Silica | 0.00 | 0.00 | 4.72 | 1.36 |
| Binder (Stabilizer for Binder) | HCl (20% Solution) | 0.00 | 40.00 | 0.00 | 0.00 |
| Binder | Starch | 0.00 | 0.00 | 1.57 | 0.00 |
| Fiber | SUPERWOOL® plus bulk fiber (alkaline earth silicate fiber) | 0.00 | 3.00 | 10.24 | 20.14 |
| Fiber | ½" E-glass | 1.00 | 0.00 | 0.00 | 0.00 |
| Fiber | Denka B97T4 Alumina Fiber | 4.00 | 0.00 | 3.46 | 0.00 |
| | | 100.00 | 100.00 | 100.00 | 100.00 |

Nature of Shaped Material

The above description refers to forming shapes, including flat shapes such as boards and papers. These shapes for the present application may have particular forms. For example, the shapes may include:
- a body of material having a recess shaped to receive an energy storage device/battery or cell thereof;
- a body of material having a plurality of recesses, each shaped to receive an energy storage device/battery or cell thereof;
- a material having two or more regions having different concentrations of endothermic material;
- a material having a gradient of endothermic gas-generating material;
- a material that includes a surface region of the material having a higher concentration of endothermic material than a region within the body of the material;
- a material that includes a surface region of the material having a higher concentration of endothermic material than a different surface region of the material.

With reference to the exemplary implementations of the disclosed endothermic materials/systems, it is noted that the positioning/location of thereof within an energy storage device/lithium ion battery is generally selected so as to facilitate the desired energy absorption/transfer functionalities described herein without interfering with the underlying energy generation and storage associated with such energy storage device/lithium ion battery. Moreover, it is generally desirable that the disclosed endothermic materials/systems be positioned/located so as to permit effective gas communication with associated venting functionality, thereby permitting prompt and effective degassing of gaseous by-products generated by the endothermic reaction(s) of the present disclosure.

In exemplary embodiments of the present disclosure, the thermal isolation material(s) may take the form of blanket or mat positioned in contact with (or in close proximity to) jelly roll assemblies—particularly open end of jelly roll assemblies—housed within a support member. The disclosed blanket may substantially limit the quantity of hot particulate residue, e.g., liquid electrolyte and electrolyte gas, from interacting with adjacent jelly rolls if/when released from one or more jelly roll(s).

The disclosed blanket may feature flow characteristics that promote axial gas and fluid flow through the blanket, but substantially reduce lateral (e.g., side-to-side) flow within the blanket. Therefore, particulates associated with such gas/fluid flow are forced through the body of the blanket and into the shared atmosphere of the battery system enclosure (or an individual compartmentalized region of the battery system). To the extent an applicable threshold pressure is reached within the shared atmosphere, the particulate-containing gas/fluid is vented from the enclosure, as described herein.

In an illustrious embodiment, the blanket may be fabricated from a ceramic material (or similar material) with a pore size/structure that promotes axial flow therethrough.

The ceramic material is typically stable at relatively high temperatures, e.g., greater than 200° C. In exemplary embodiments of the present disclosure, the pore size of the disclosed blanket is sized so as to (i) capture larger hot particulates/debris, e.g., larger sized carbonized debris, metal debris, metal oxide particulates and melted metal particulates, so as to ensure those larger particulates/debris do not contact adjacent jelly rolls, and (ii) facilitate smaller particulates and gas in passing through the blanket and out the vent (if the vent is activated). Smaller particulates for purposes of the present disclosure are those particulates that will pass freely through the vent so as to not become trapped/clogged within the vent outlet. In an illustrious embodiment, the blanket may be installed beneath a bus bar; however, the blanket may be installed above the bus bar.

Although the foregoing structure for controlling gas/fluid flow from electrochemical unit(s) is described as a blanket, it is noted that the desirable functionality of controlling gas/fluid flow may be achieved by a plurality of discrete elements that are positioned in proximity to the electrochemical units, e.g., in a one-on-one manner. Thus, individual gas/fluid flow elements may be positioned in proximity to the open end of individual jelly rolls to facilitate axial/non-lateral flow of gas/fluid that is expelled from the jelly rolls—while capturing larger particulates—as described above with reference to the noted blanket. In like manner, the disclosed structure for controlling gas/fluid flow may be configured/dimensioned as a structure that provides flow control functionality with respect to a sub-set of electrochemical units positioned within the enclosure, e.g., a row or column of electrochemical units.

In an exemplary embodiment, the thermal isolation material(s) (including the disclosed blanket) may be fabricated, in whole or in part, from a thermally insulating mineral material (e.g., AFB® material, Cavityrock® material, ComfortBatt® material, and Fabrock™ material (Rockwool Group, Hedehusene, Denmark); Promafour® material, Microtherm® material (Promat Inc., Tisselt, Belgium); and/or calcium-magnesium-silicate wool products from Morgan Thermal Ceramics (Birkenhead, United Kingdom). The thermally insulating mineral material may be used as a composite and include fiber and/or powder matrices. The mineral matrix material may be selected from a group including alkaline earth silicate wool, basalt fiber, asbestos, volcanic glass fiber, fiberglass, cellular glass, and any combination thereof. The mineral material may include binding materials, although it is not required. The disclosed building material may be a polymeric material and may be selected from a group including nylon, polyvinyl chloride ("PVC"), polyvinyl alcohol ("PVA"), acrylic polymers, and any combination thereof. The mineral material may further include flame retardant additives, although it is not required, an example of such includes alumina trihydrate ("ATH"). The mineral material may be produced in a variety of mediums, such as rolls, sheets, and boards and may be rigid or flexible. For example, the material may be a pressed and compact block/board or may be a plurality of interwoven fibers that are spongey and compressible. Mineral material may also be at least partially associated with the inner wall of a battery system enclosure, so as to provide an insulator internal thereto.

Figure 26:
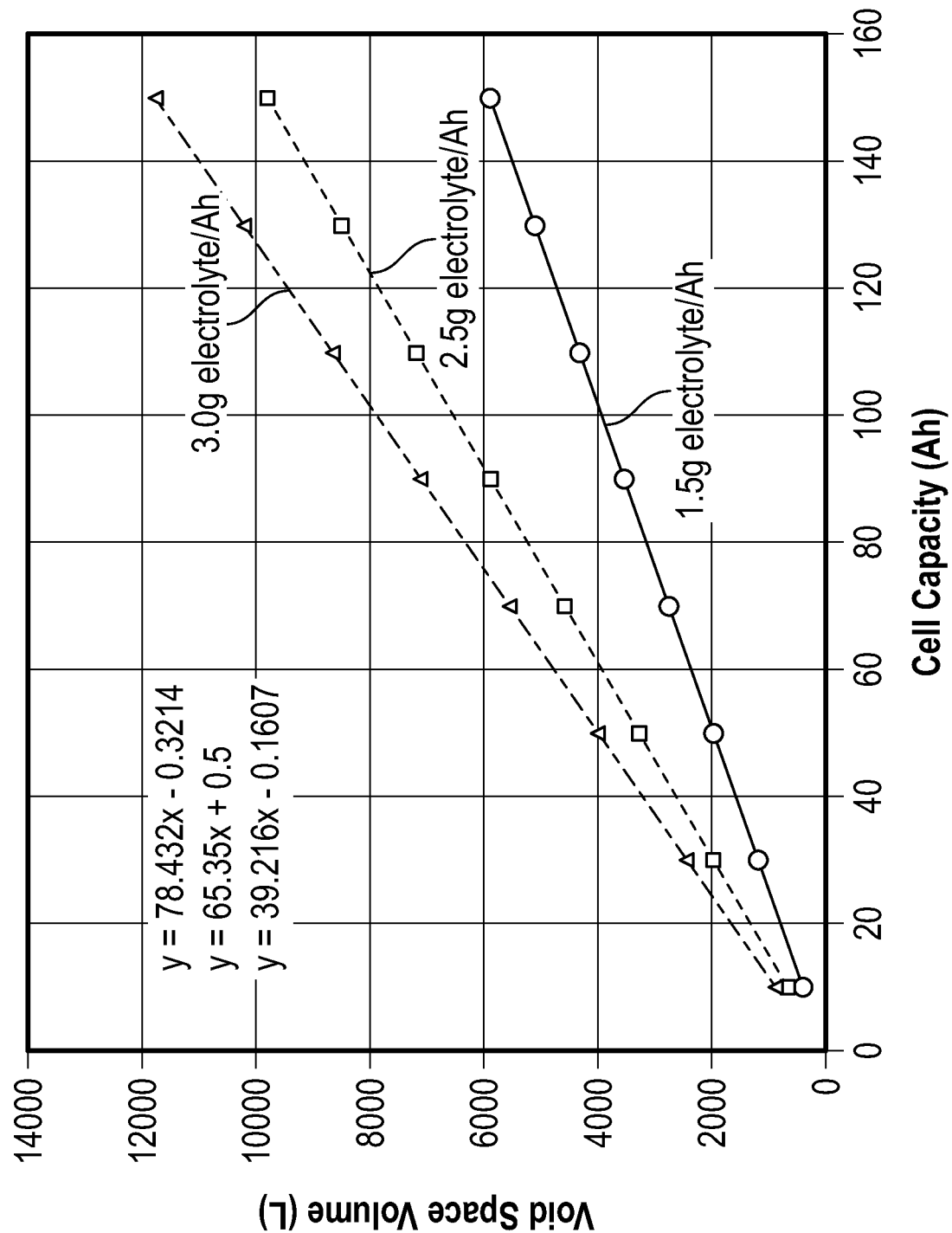
FIG. 26 is a plot of void space volume vs. cell capacity for different electrolyte quantities according to the present disclosure.

To maintain a requisite level of safety within an enclosed space, the energy capacity of the disclosed battery system may not exceed a threshold level as described herein:

The internally available volume of the enclosed space (measured in liters) must be in the range of about 39±5 and 80±5 times the amp-hour (Ah) capacity of the lithium ion cell(s) positioned therewithin that is/are thermally insulated from adjacent lithium ion cell(s) by thermal isolation material(s) as described hereinabove (see slopes in FIG. 26).

The relevant lithium ion cell(s) for determination of Ah capacity is/are the lithium ion cell(s) that is/are thermally insulated relative to adjacent lithium ion cell(s). Thus, if each lithium ion cell is individually thermally insulated from adjacent lithium ion cell(s), then the Ah capacity for calculation of the requisite internally available volume of the enclosed space is the Ah capacity of the individual lithium ion cell. Conversely, if a group of lithium ion cells are collectively thermally isolated from adjacent lithium ion cell(s), then the Ah capacity for purposes of the present disclosure is the cumulative Ah capacity of the foregoing group of lithium ion cells. This includes cases where cells are connected in parallel and/or series and then collectively thermally isolated. As noted previously, describing series-connected cells in terms of an aggregated capacity of individual cells is not typical of standard usage for this term.

The foregoing relationship of the requisite internally available volume relative to the energy capacity of the lithium ion cells is based on a recognition that safety is tied to the amount of total gas generated during thermal runaway in the involved lithium ion cells. Thus, if only a single lithium ion cell is involved in the "thermal runaway" event (based on effective thermal insulation of that cell from adjacent cells), then the energy capacity of that cell alone allows a determination of the gas to be generated by the thermal runaway event (based on the electrolyte present in the cell). If instead thermal insulation is implemented relative to a subset of lithium ion cells, e.g., six adjacent cells are collectively thermally insulated from the other cells in the battery system, then the total energy capacity of the six cells will be determinative of the gas to be generated from a thermal runaway event tied to such subset of lithium ion cells (based on the electrolyte present in the six cells).

Based on the gas composition ratio measured during thermal runaway of an exemplary lithium ion battery system, the "lower flammability limit" (LFL) of the venting gas in air is about 7.3%. The LFL will vary depending on the lithium ion battery system under consideration, but the representative value—7.3%—is useful for describing the battery systems of the present disclosure and is merely illustrative of an exemplary lithium ion battery system.

When the venting gas volume ratio in air is less than 25% of LFL, it is believed that the gas is non-flammable. The cell capacity and the void space volume in an enclosure to accommodate the venting gas to meet the non-flammable requirement, i.e., less than 25% of LFL in air, has a linear relationship as shown in FIG. 26. Based on experimental study, the void space volume for a cell with an electrolyte quantity of 1.5 g per Ah capacity is about 39 times of cell capacity. The void space volume for a cell with an electrolyte quantity of 2.5 g per Ah capacity is about 65 times of cell capacity. The void space volume for a cell an electrolyte quantity of 3.0 g per Ah capacity is about 78 times of cell capacity.

Thus, as described herein, fire/explosion risks associated with battery systems and overall safety can be viewed from the perspective of two distinct but related phenomena:
  a) internal fire (from within the Li-ion cell—e.g., internal shorts, overcharge, or external short resulting in internal heating and fire onset), and
  b) external fire stemming from a source that is external to the battery system.

Fires that are caused by external sources are generally addressed in conventional ways, e.g., through use of sprinklers, inert gases, or various types of fire retardant foams. However, fires that initiate internal to the battery system are more problematic. There are two main properties that are mentioned in the safety standards that affects the safety controls required on a system level;

1. propagation property—the way a failure propagates when one cell is put into full thermal runaway, and
2. the amount of flammable gases that is created when one or more Li-ion cells is consumed by such a fire.

Of note, explosive gases associated with a Li-ion battery system are generally present in a mixture that includes hydrogen, carbon monoxide, and multiple hydrocarbons, such as methane and propane. All Li-ion batteries have similar electrolytes and the amount of gases created during runaway is basically a function of the total mass of electrolyte (and some plastics in the battery) that is combusted during a runaway event.

According to the present disclosure, a battery system is provided that reduces the amount of flammable (and explosive) gases that are produced so as to effectively limit the runaway propagation. Specifically, the present disclosure achieves this objective at the lowest level of the system by preventing individual cell units from propagating to the next/adjacent unit in the system. By managing/controlling propagation at the cell unit level, the present disclosure significantly reduces or potentially eliminates the need and/or reliance on conventional fire control technologies, such as sprinkler systems and/or inert gas-based systems that are intended to put out the fire.

Thus, in exemplary embodiments of the present disclosure, the disclosed battery system includes a combination of:

Implementing structures that isolate each cell unit (as described herein) so that propagation cannot be driven by heat transfer phenomena;

Implementing structures that effectively move flammable gases away from heat sources, thereby disallowing/inhibiting ignition of neighboring cells; and Implementing structures that, in the event circumstances arise that would otherwise translate to thermal runaway, limit the creation of flammable gases below a threshold level, thereby ensuring that the system does not reach lower flammability limit (LFL) limits that can cause a secondary fire.

Safety can be further enhanced by using fans or other means to assist in the mixing of flammable gases ejected during thermal runaway. This avoids pockets of more concentrated gas that may exceed flammability levels.

For purposes of the present disclosure, the Lower Flammability Limit (LFL) of flammable gases is the minimum or threshold percentage of gases required within the system for ignition to occur, e.g., during Li-ion runaway. Current safety standards generally define a safety limit based on the concentration of flammable gases in an enclosed space. For example, current safety standards set the maximum concentration of flammable gases at twenty five percent (25%) of the LFL value for a projected gaseous mixture within an enclosure (or any enclosed pocket that can be created within the enclosure). LFL can thus be measured through well established industry methods. For example, if an enclosure has a flammable gas (or explosive gas mixture) with a characteristic of its LFL limit being 10% and a total gas volume of 25 L, then the void volume in the enclosure to reach flammable limits is 250 L or less (not considering upper flammability limits). If the safety standard sets an added safety window at 25% of the LFL, the void volume for flammable gases would need to be ≥1000 L to meet the safety limit, or in other words, not be able to achieve sufficient concentration to achieve flammability or cause a deflagration explosion.

An exemplary safety standard of relevance to the present disclosure is the UL9540a test standard which takes into consideration experimental data around propagation and flammable gas measurements (i.e., flammable gas amounts and flammability properties). According to the UL9540a test standard, a Li-ion cell is put into runaway and the amount of gas created is measured along with its constituents ($H_2$, CO, $CH_4$, $C_2H_6$, etc.). The ignition properties of this mixture are then studied and the LFL limit determined. Other factors may also be assessed, e.g., deflagration venting and explosive factors, such as pressure and pressure propagation velocity. The established LFL limit can then be compared to the volume of the enclosure or room where the battery system is to be located/housed. If the LFL is exceeded for the volume of the enclosure/room, there is a fire risk under the noted standard.

Another of the methods included in the UL9540a standard requires measurement of cell-to-cell or module-to-module propagation. This aspect of the UL9540a standard assesses, inter alia, the use of extinguishing systems to limit the impact on neighboring racks and also the total amount of flammable gases that can be created.

From a regulatory standpoint, if the assessment of the AHJ is that an external fire can be handled based on the totality of considerations in the enclosure/room (so that the entire rack is not burned) and if the AHJ further determines that propagation from an internal fire can be handled (so that adjoining cells/modules are not ignited), then only gases from a single cell must be considered in designing/implementing an acceptable safety mitigation system. Conversely, if it is not demonstrated that the fire event can be constrained to a single cell, then the safety mitigation system must be scaled to address the overall cascading effect of that initial cell, i.e., based on the number of involved cells/modules that can be expected to ignite through propagation until such propagation runs its course or is stopped by the applicable fire mitigation system.

Against this backdrop and as noted above, the present disclosure provides a battery system that reduces the amount of flammable (and explosive) gases that are produced so as to effectively limit the potential for runaway propagation. Specifically, the disclosed battery system prevents individual cell units from propagating to the next/adjacent unit in the system. By managing/controlling propagation at the cell unit level, the present disclosure significantly reduces or potentially eliminates the need and/or reliance on conventional fire control technologies, such as sprinkler systems and/or inert gas-based systems that are intended to put out the fire. Moreover, the present disclosure provides battery systems that are designed to ensure that LFL levels are maintained within acceptable limits by scaling the energy capacity of the individual cells that make up the battery system to the available space/volume of the enclosure/room in which the Li-ion battery is positioned. Indeed, the present disclosure delivers a desired level of safety by controlling the relationship between (i) the volume of explosive gases that may be generated from a single unit cell associated with the Li-ion battery, (ii) the ability of the unit cell to propagate to adjacent cell(s)/module(s), and (iii) the size of the enclosure/room in which the Li-ion battery is positioned. By controlling the noted relationship as disclosed herein, it is possible to limit/reduce cost and fire mitigation complexity for the purpose of safe system design. Of note, the housing (or separation material between adjacent cells, such as in FIGS. 24 and 25) may be designed to allow for a narrowing of the distance between the cells and, as long as the flammable gases are quickly dispersed, diluted enough, and propagation does not occur, the need for complex fire mitigation may be eliminated.

There are practical limits as to the cell size, limited by both the total energy during runaway (which ultimately causes the propagation), the separation material and the amount of gases in relation to the volume of the enclosure. Thus, according to the present disclosure, a critical relationship between the energy capacity of a Li-ion cell and the enclosure size can be established for the design and implementation of safe systems. Additionally, by utilizing the isolating and any endothermal properties of the housing material, a distance correlated to the Ah-size of the cell can be further defined.

In exemplary embodiments of the present disclosure, a battery system is provided that includes: (i) an enclosed space (e.g., an enclosure or room); (ii) a plurality of modules positioned within the enclosed space, wherein at least one of the plurality of modules includes a plurality of Li-ion cells, and wherein the plurality of Li-ion cells includes a first Li-ion cell and a second Li-ion cell in a side-by-side orientation; and (iii) at least one thermal insulator positioned between the first Li-ion cell and the second Li-ion cell, wherein the at least one thermal insulator has a thickness of at least 0.3 mm and an insulating conductivity that is less than 0.5 W/mK, wherein the enclosed space defines an internally available volume measured in liters that is greater than about 39±5 times and less than 80±5 times of the amp-hour (Ah) capacity of one individual Li-ion cell of the plurality of Li-ion cells. The disclosed Li-ion cell may be an LFP cell having a capacity greater than 10 Ah and less than 70 Ah and may be positioned in an enclosed space that has an open volume (internally available) that is larger than 390+50 L and less than 5600±350 L. The Li-ion cell may also be an NMC cell having a capacity greater than 6 Ah and less than 50 Ah and may be positioned in an enclosed space that has an open volume that is larger than 240±30 and less than 4000±250 L.

The disclosed Li-ion cell may include a vent and such vent may be equipped with a flame arrestor. In exemplary embodiments, the vent of the Li-ion cell may be activated below about 300 psi, and more advantageously below 100 psi. The disclosed vent/venting mechanism may be designed to vent into a pocket associated with the battery systems that is filled with an inert gas.

Turning to exemplary embodiments depicted in the accompanying figures, FIG. 1 shows a sequence of fail safe mechanisms for a container/casing design (the x axis schematically represents pressure within the system). P1 represents the pressure for regular operation of the battery, P2 represents the pressure at which a pressure disconnect device (if used) should be activated, P3 represents a pressure at which a venting mechanism should be activated, and P4 represents the pressure when the can/container seal, terminal feedthrough and/or other parts of container start leaking (i.e., the overall pressure rating of the container/casing). It is essential for safe operation that spacing of these pressures can be achieved in mass production without an ability that the normal distribution for production of operational pressure of one component enters the region of the normal distribution for another component.

For instance, an overcharge disconnect (i.e., pressure disconnect device) cannot cause premature short circuiting of the battery (i.e., P2 is within the P1 range), as that prematurely disables operation of the battery. Similarly, if the vent does not activate before other structures start leaking (i.e., P3 is within the P4 range), the direction of the venting which results from leaking (or other system failure) cannot be controlled, which may result in venting hot gasses or a flame into a neighboring cell, causing cascading failures.

In establishing a vent structure in battery systems of the type disclosed herein, it is desirable to provide a vent mechanism that operates at very low pressures (P3 in FIG. 1) without risking nuisance failures in regular use due to that relatively high metal residuals can be maintained at the score site. This low pressure for P3 in turn allows use of mechanically sealed cans/containers, or alternatively laser welding can be used to seal the can, because the P4 pressure may also be reduced without risking an overlap with P3. Thus, the ability to reliably reduce P3 may translate to an overall improvement in battery system design and operation.

Moreover, the area of the vent should be relatively large to allow a reliable opening pressure with a controllable flow area, allowing for quicker pressure release and eliminating atomization of the electrolyte. A larger vent area should generally produce a design with increased safety.

In exemplary embodiments of the present disclosure that include a venting mechanism alone (i.e., without a pressure disconnect device), the vent pressure (P3) is on the order of about 10 psig to about 140 psig, and the structural limit pressure of the container (P4) is at least about 10% higher than the vent pressure.

In exemplary embodiments that include both a pressure disconnect device and a venting mechanism, the pressure at which the pressure disconnect device is activated is generally dependent on the overall design of the lithium ion battery. However, the threshold pressure within the casing which activates the disclosed pressure disconnect device is generally 10 psig or greater, and is generally in the range of 10-40 psig. In embodiments that also include a venting mechanism, the pressure at which the vent mechanism is activated to vent, i.e., release pressurized gas from the casing, is generally at least 5 psig greater than the pressure at which the pressure disconnect device is activated. Thus, for example, if the pressure disconnect device is set to activate at 15 psig, then in exemplary embodiments of the present disclosure, the independent vent structure may be selected so as to vent at 20 psig. Of note, the overall pressure rating of the casing itself, i.e., the pressure at which the casing may fail, is generally set at a pressure of at least 5 psig greater than the pressure at which the vent structure is activated. Thus, in the example described above (activation of pressure disconnect device at 15 psig; activation of vent structure at 20 psig), the casing is generally designed to withstand an internal pressure of at least 25 psig. The pressure rating of the casing has particular importance with respect to interface welds and other joints/openings that include sealing mechanisms where failures are more likely to occur. An exemplary pressure disconnect would operate at 20 psig to 50 psig, and vent at 60 psig to 300 psig, where the structure holds >310 psig, leaving a manufacturing window relative to the design pressure.

Several vent type geometric shapes exist today and are generally designed to fail at score line(s) defining the vent at specified pressures. The main concern with straight line vents, "Y" vents, and radial vents is that they generally do not open completely since the crack propagation may not always choose the same path. A round vent is generally preferred because it can quickly open a large area and the residual metal flap can quickly bend out of the way so that gas can be released without significant pressure increase of the container. Optimal vent designs are effective in that, upon a venting event, all gas can quickly be released without build-up of increased pressure inside the can/container due to further gas generation.

For example, for circular or substantially circular vent openings, an opening diameter of about 1½ inches may provide suitable vent functionality for batteries of the present disclosure, although alternative diameter openings may be employed based on features/functions of a specific battery implementation. For non-circular vent openings, an overall vent area of between about 0.4 cm$^2$ to about 12 cm$^2$ may be effectively employed, although again alternative vent areas may be provided based on the features/functions of specific battery implementations.

Although an increased vent area limits atomization of the electrolyte in connection with a venting event, there is a risk for flashback. Such flashback can ignite the electrolyte of isolated electrode structures inside the cell that have not failed during the abuse conditions, such as an internal short. In order to limit this risk, a flame arrestor may be advantageously positioned in proximity to the vent in order to prevent a flame front from reentering the enclosure containing the multi-roll structure. In exemplary embodiments of the present disclosure, a flame arrestor is positioned internal to the vent structure, i.e., across the area defined by and/or in the vicinity of the score line that forms/defines the vent structure and/or initiates the vent functionality.

In the event of a failure of an individual jellyroll, a large amount of gas is generated (~10 liters), and this gas is both hot (~250-300° C.) and flammable. It is likely that this gas will ignite outside of the multi-jellyroll enclosure after a vent occurs. To prevent and/or reduce the likelihood that the flame will enter the cell, a mesh may be advantageously placed/positioned over the vent area to function as a flame arrestor. This mesh functions to reduce the temperature of the exiting gas stream below its auto-ignition temperature.

Since the mesh is serving as a heat exchanger, greater surface area and smaller openings reject more heat, but decreasing the open area of the mesh increases the forces on the mesh during a vent. A 30 US standard mesh, 0.012" wire diameter, has been found to be effective in preventing flashback for the large Li-ion batteries tested. Other mesh sizes are expected to function effectively, but the 30 mesh is preferred due to its general supply availability and effective arrestor function for Li-ion batteries. A 30 mesh has an open area of 40%, which means that in a vent at 70 psi, the mesh must withstand instantaneous forces of 70 psi*0.6=42 lbf/in$^2$ of vent area. For reasonable vent areas, such as those used for the Li-ion application, calculated stresses in the mesh from this loading are modest. For instance, for a 2 inch diameter vent, (larger than can be fit on the sidewall of a conventional battery container), the instantaneous stress in the mesh at vent is roughly:

$$((\text{pi}*1 \text{ in}^2)*42 \text{ lbf/in}^2)/(\text{pi}*2 \text{ in}*0.012*0.6*0.7854) = \sim 3714 \text{ psi}$$

The yield strength of copper is ~20,000 psi.

Exemplary Pressure Disconnect Device (PDD) Implementations

In exemplary implementations of the present disclosure, a current interruption assembly, i.e., a pressure disconnect device, is provided that may be activated by internal pressure conditions of a lithium ion battery and, particularly, a multi-core lithium ion battery. Although exemplary pressure disconnect device(s) and venting mechanism(s) are described hereinbelow, the present disclosure is not limited by or to such exemplary embodiment(s). Rather, the present disclosure may be implemented with pressure disconnect devices and venting mechanisms of alternative design/operation, as will be apparent to persons skilled in the art.

Figure 2A:
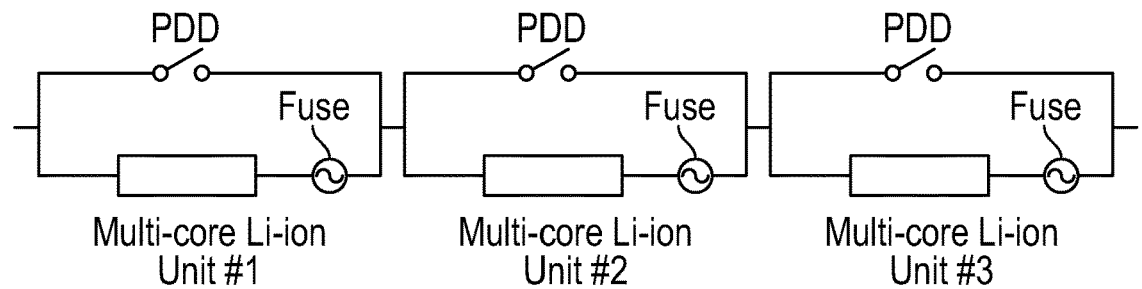
FIG. 2A is a schematic view of exemplary module circuitry associated with a multi-core lithium ion battery in normal operation.
Figure 2B:
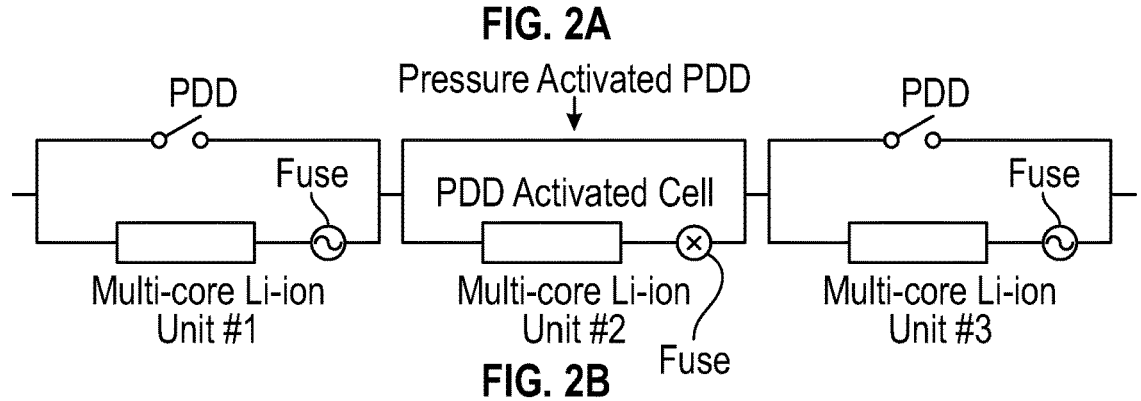
FIG. 2B is a schematic view of the exemplary module circuitry associated with a multi-core lithium ion battery of FIG. 2A after activation of a pressure disconnect device ("PDD")

With reference to FIGS. 2A-2B, an exemplary battery module that includes a plurality of multi-core lithium ion electrochemical units (e.g., jelly rolls) is schematically depicted. More particularly, the schematic illustrations of FIGS. 2A-2B include three (3) distinct multi-core lithium ion electrochemical units. Although three multi-core lithium ion units are schematically depicted in FIGS. 2A-2B, the present disclosure is not limited by or to implementations that include three multi-core lithium ion units.

Each of the multi-core lithium ion electrochemical units is associated with a pressure disconnect device (PDD) and, as shown schematically in FIG. 2B, the $2^{nd}$ unit has experienced an overcharge condition that has triggered activation of the PDD (as schematically depicted by the "X" in the circuit). Activation of the PDD for the $2^{nd}$ unit has resulted in an external short of the cell and, based on the blown fuse, the electrochemical unit is isolated from the overall circuit. As discussed below, the fuse is advantageously positioned external to the battery casing and is associated with the negative terminal. In response to activation of the PDD, current is by-passed through the casing of the battery.

Figure 3:
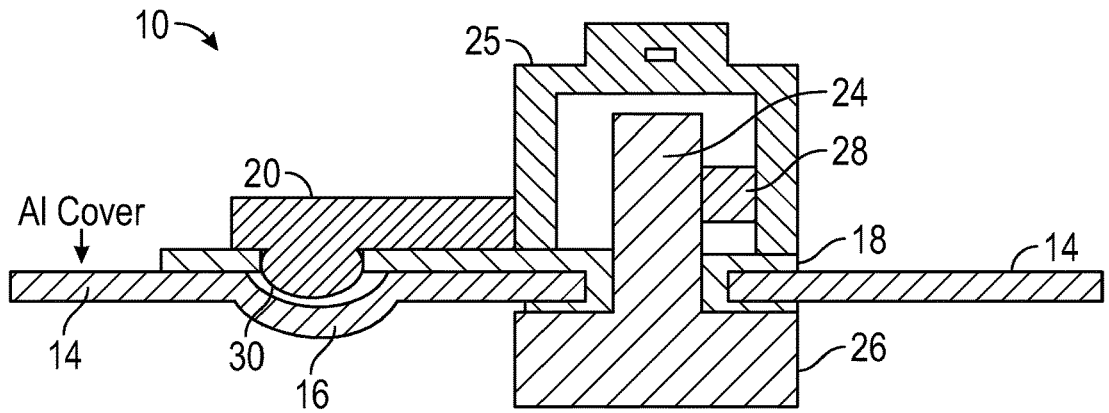
FIG. 3 is a schematic view of an exemplary PDD design (in a normal operation state), wherein a fuse is positioned external to a battery casing/cover and in association with the negative terminal thereof.
Figure 4:
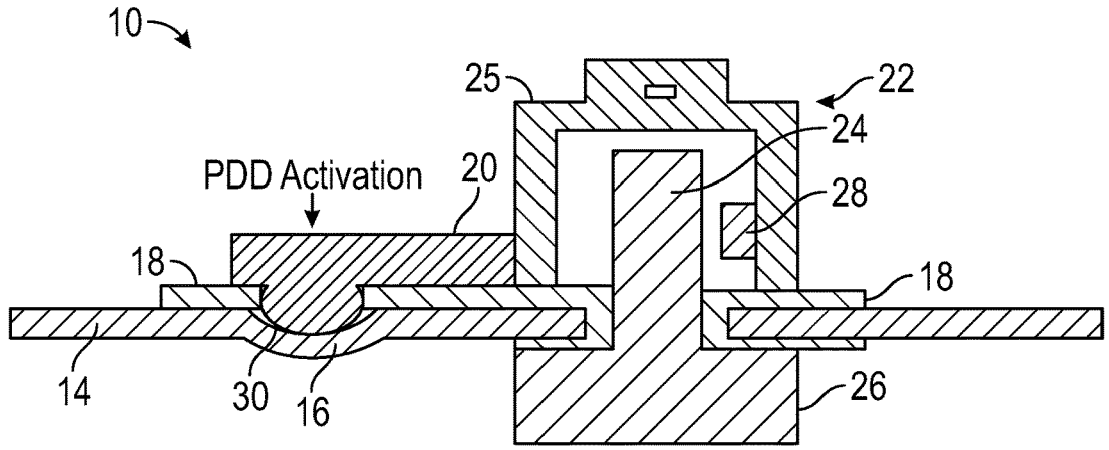
FIG. 4 is a schematic view of the exemplary PDD design of FIG. 3, wherein the PDD has been activated in response to an over-pressure condition within the battery casing and the fuse associated with the negative terminal has blown.

Turning to FIGS. 3 and 4, schematic views of exemplary PDD assembly 10 that is pressure activated according to the present disclosure are provided. The PDD assembly 10 includes a deflectable/deformable dome 16 associated with a cover 14 of the lithium ion battery casing (not shown). Cover 14 is advantageously fabricated of aluminum, although alternative materials may be employed without departing from the spirit/scope of the present disclosure (e.g., stainless steel). A deflectable/deformable dome 16 is associated with cover 14. Deflectable/deformable dome 16 may be fabricated from various materials, including aluminum of reduced cross-section relative to the remainder of cover 14. Thus, deflectable/deformable dome 16 may be integrally formed with cover 14 or attached or adhered with respect to an opening defined in cover 14, e.g., welded with respect thereto.

An insulation layer 18 is positioned between the cover 14 and a PDD activation arm 20. The insulation layer 18 generally extends into the electrode region 22, e.g., to electrically isolate the upstanding copper terminal 24 and bus bar 26 from the cover 14. A fuse element 28 is associated with the electrode region 22 so as to complete the circuit between upstanding terminal 24 and terminal element 25.

As shown in FIG. 3, dome 16 and PDD activation arm 20 are initially spaced relative to each other, thereby preventing electrical communication therebetween. A gap in insulation layer 18 is provided adjacent dome 16, thereby permitting physical contact and electrical communication between dome 16 and PDD activation arm 20 when a threshold internal pressure is reached within the battery casing. In exemplary embodiments, PDD activation arm 20 may define a geometry that cooperates with the geometry of dome 16, e.g., a mushroom-like knob 30 extending from an end region of activation arm 20, to ensure effective contact therebetween. Alternative cooperative geometries may be employed, as will be readily apparent to persons skilled in the art.

As shown in FIG. 4, if the internal pressure within the battery casing exceeds a certain level, the dome 16 will deflect upward into contact with knob 30 of PDD activation arm 20, thereby completing an electronic circuit between the bus bar 26, upstanding terminal 24, fuse 28, terminal element 25, activation arm 20 and cover 14. Completion of this circuit exceeds the capacity of fuse 28, which "blows" (as shown in FIG. 4), thereby by-passing all current associated with the battery through the casing (including the cover) thereof.

Appropriate fuse diameters may be calculated using the Onderdonk equation.

$$I_{fuse} = \text{Area} \ast \text{SQRT}(\text{LOG}(T_{melt} - T_{ambient})/(234 - T_{ambient}) + 1)/\text{Time} \ast 33)$$

Where:
$T_{melt}$ is the melting temp of wire in degrees Centigrade
$T_{ambient}$ is the ambient temp in degrees Centigrade
Time is the melting time in seconds
$I_{fuse}$ is the fusing current in amps
Area is the wire area in circular mils (where "circular mils" is the diameter of the wire in thousandths of an inch (mils) squared. That is, it is the area of a circle 0.001" in diameter.)

Assuming a 700 amp current for the fusing current, application of the Onderdonk equation yields the following wire diameter results:

|  | Melting time (s) | | |
| --- | --- | --- | --- |
|  | 1 | 5 | 10 |
| Aluminum wire area (mm²) | 2.62 | 5.86 | 8.28 |
| Aluminum wire diameter (mm) | 1.83 | 2.73 | 3.25 |

Thus, the Onderdonk equation shows that, assuming a 700 amp fusing current, an aluminum fuse diameter of 2.73 mm would be effective in the exemplary assembly of FIGS. 3 and 4 for a melting time of five (5) seconds. Alternative fuse materials/diameters may be employed, as will be readily apparent to persons skilled in the art, resulting in increased or reduced fusing currents.

Turning to FIGS. 5-11, schematic illustrations of lithium ion battery implementations according to the present disclosure are provided. With initial reference to FIG. 5, an exploded view of an exemplary multi-core lithium ion battery 100 is provided. An assembled view of the exemplary lithium ion battery is provided in FIG. 5A.

Battery 100 includes an outer can or casing 102, that defines an interior region for receipt of components, as follows:

An aluminum bus bar 104 that defines a plurality (24) of openings (e.g., circular openings);
A housing or support structure 106 that defines a plurality (24) of spaced, substantially cylindrical regions or cavities that are configured and dimensioned to receive jelly roll/jelly roll sleeve subassemblies;
A plurality (24) of jelly roll sleeves 108 configured and dimensioned to receive corresponding jelly rolls and to be positioned within the cylindrical regions defined by housing 106—the jelly roll sleeves 108 may be fabricated of various materials, e.g., polymers or metals, and may take the form of polymer and metal foil laminated foil pouches;
A plurality (24) jelly rolls 110, i.e., electrochemical units, configured and dimensioned to be positioned within jelly roll housings 108;
A plurality (24) of substantially circular jelly roll backing sheets 111 positioned between bus bar 104 and the jelly rolls 110;
A plurality (24) jelly roll covers 112 that are configured and dimensioned to cover the jelly rolls 110 positioned within the cavities defined by housing 106;
A copper bus bar 114 that defines a substantially H-shaped geometry so as to effect electrical communication with each of the jelly rolls 110;
A bus bar insulator 116 that defines a geometry that generally corresponds to the geometry of bus bar 114 so as to insulate the bus bar 114 relative to the top cover of the battery assembly;
A plurality (6) of anti-vibration mats 118 that are positioned between the bus bar insulator 116 and the top cover to absorb potential vibration and minimize relative movement therebetween;
A substantially rectangular top cover 120 that is configured and dimensioned to cooperate with the outer can 102 to encase the foregoing components therewithin;
A plurality (24) of steel balls 122 positioned on the exterior of the top cover 120 to obstruct openings formed in the top cover 120 to facilitate electrolyte introduction to the jelly rolls;
One or more anti-vibration mats 124 are positioned between the outer can 102 and the outer wall(s) of housing 106 to further dampen vibration and prevent movement therebetween.

Of note, the corners of the outer can/casing 102, bus bar 104, housing 106 and top cover 120 are generally radiused at their respective corners to minimize size and facilitate manufacture/assembly. Of further note, the jelly rolls 110 positioned within housing 106 define a multi-core assembly that generally share headspace within outer can 102 and top cover 120, but do not communicate with each other side-to-side. Thus, any build-up in pressure and/or temperature associated with operation of any one or more of the jelly rolls 110 will be spread throughout the shared headspace and will be addressed, as necessary, by the safety features described herein below. However, electrolyte associated with a first jelly roll 110 does not communicate with an adjacent jelly roll 110 because the substantially cylindrical regions defined by housing 106 isolate jelly rolls 110 from each other from a side-to-side standpoint. The sleeves 108 further contribute to the side-to-side electrolyte isolation as between adjacent jelly rolls 110.

Still further, the exemplary battery 100 shown in FIGS. 5-11 includes thermal insulation material positioned between adjacent jelly rolls 110 (not pictured). The thermal insulation material is present at a level sufficient to prevent propagation of thermal runaway and/or ignition of adjacent jelly rolls, as described elsewhere herein. Thermal insulation material may also be incorporated, in whole or in part, within housing 106 (e.g., as a composite and/or a dispersed constituent therewithin).

With further reference to FIGS. 5, 5A, 6, 6A, 7, 7A, 8 and 8A (collectively, FIGS. 5-8), exemplary safety features associated with lithium ion battery 100 include a vent assembly 200 and a pressure disconnect device (PDD) assembly 300. According to the exemplary battery 100 of FIGS. 5-8, operative components of vent assembly 200 and PDD assembly 300 are mounted/positioned along a top wall 126 of outer can 102. However, alternative positioning (in whole or in part) of one or both of vent assembly 200 and/or PDD assembly 300 may be effectuated without departing from the spirit/scope of the present disclosure, as will be apparent to persons skilled in the art based on the present disclosure.

With initial reference to vent assembly 200, it is noted that the top wall 126 of outer can or casing 102 defines an opening 128. A flame arrestor 202 and a vent disc 204 are mounted across the opening 128. A seal is maintained in the region of flame arrestor 202 and vent disc 204 by vent adapter ring 206. Various mounting mechanisms may be employed to fix vent adapter ring 206 to top wall 126, e.g., welding, adhesive, mechanical mounting structures, and the like (including combinations thereof). Of note, vent disc 204 is necessarily sealingly engaged relative to top wall 126 and may be formed in situ, e.g., by score line(s) and/or reduced thickness relative to top wall 126, as is known in the art.

As noted above, in the event of a failure of an individual jelly roll (or multiple jelly rolls), a large amount of gas may be generated (~10 liters), and this gas is both hot (~250-300° C.) and flammable. It is likely that this gas will ignite outside of the multi-jelly roll enclosure after a vent occurs. To prevent the flame front from entering the casing, a mesh may be provided to function as flame arrestor 202 and may be advantageously placed or positioned over the vent area, i.e., opening 128. This mesh functions to reduce the temperature of the exiting gas stream below its auto-ignition temperature. Since the mesh is serving as a heat exchanger, greater surface area and smaller openings reject more heat, but decreasing the open area of the mesh increases the forces on the mesh during a vent.

Figure 5:
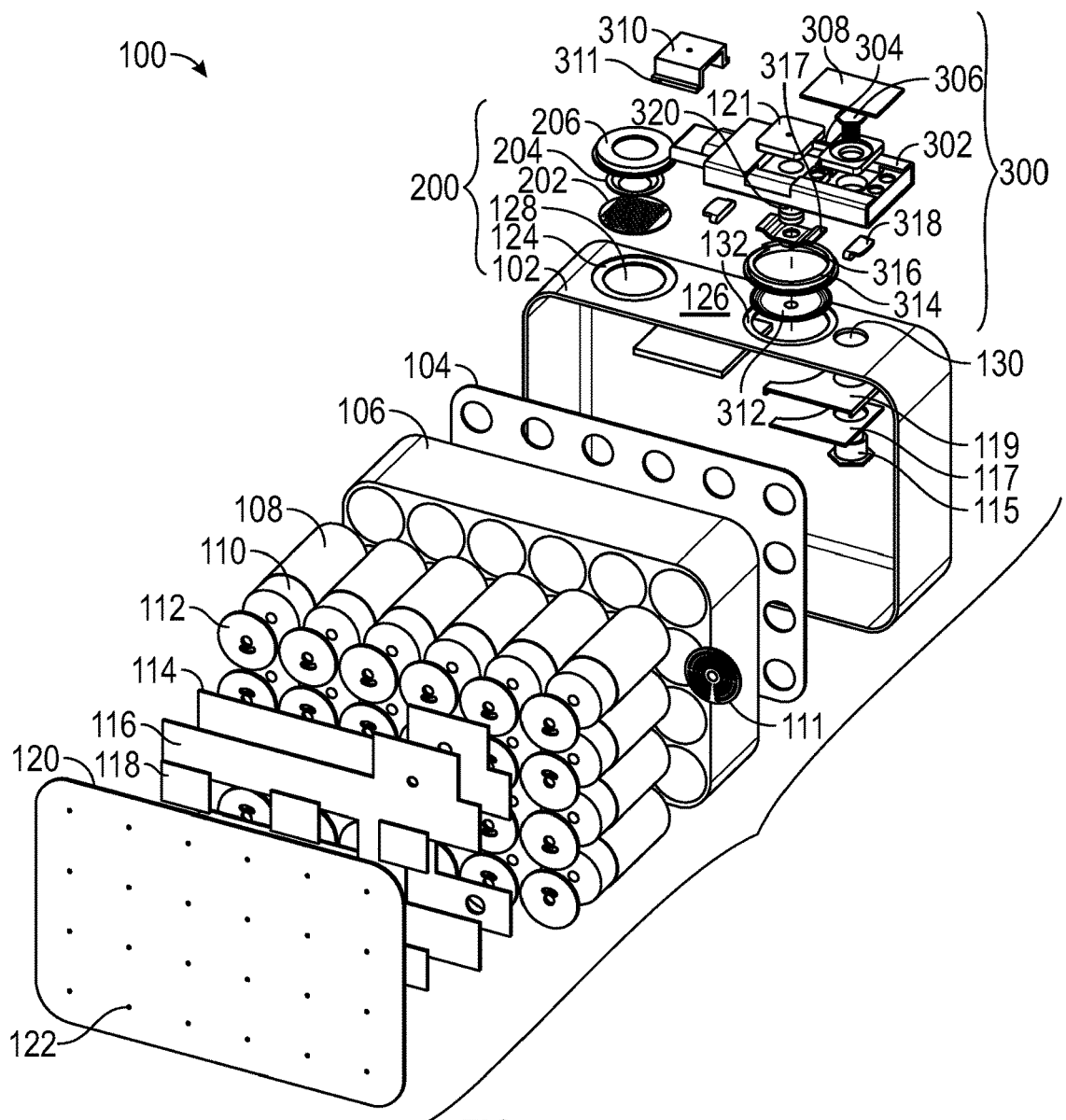
FIG. 5 is an exploded view of an exemplary multi-core lithium ion battery.
Figure 5A:
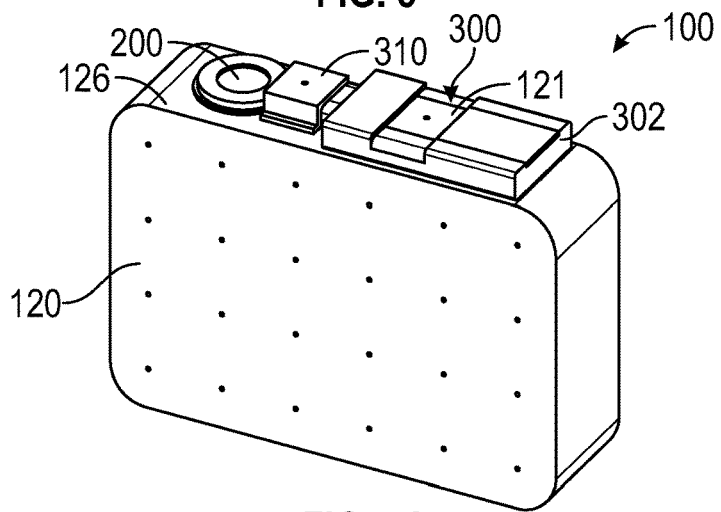
FIG. 5A is an assembled view of the exemplary multi-core lithium ion battery of FIG. 5.
Figure 6A:
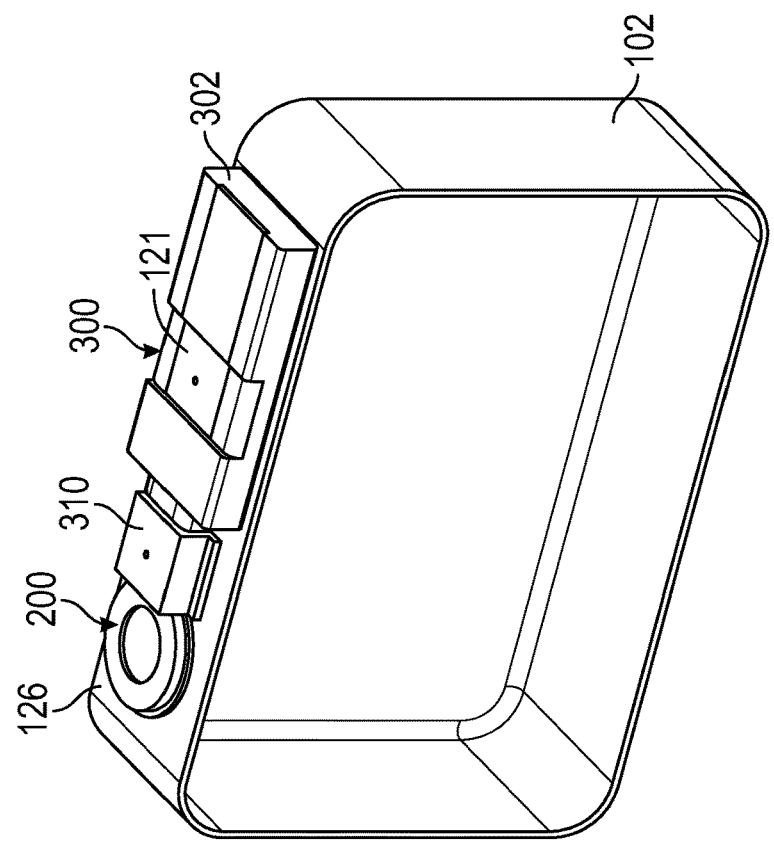
FIG. 6A is an assembled view of the exemplary casing assembly of FIG. 6.
Figure 6:
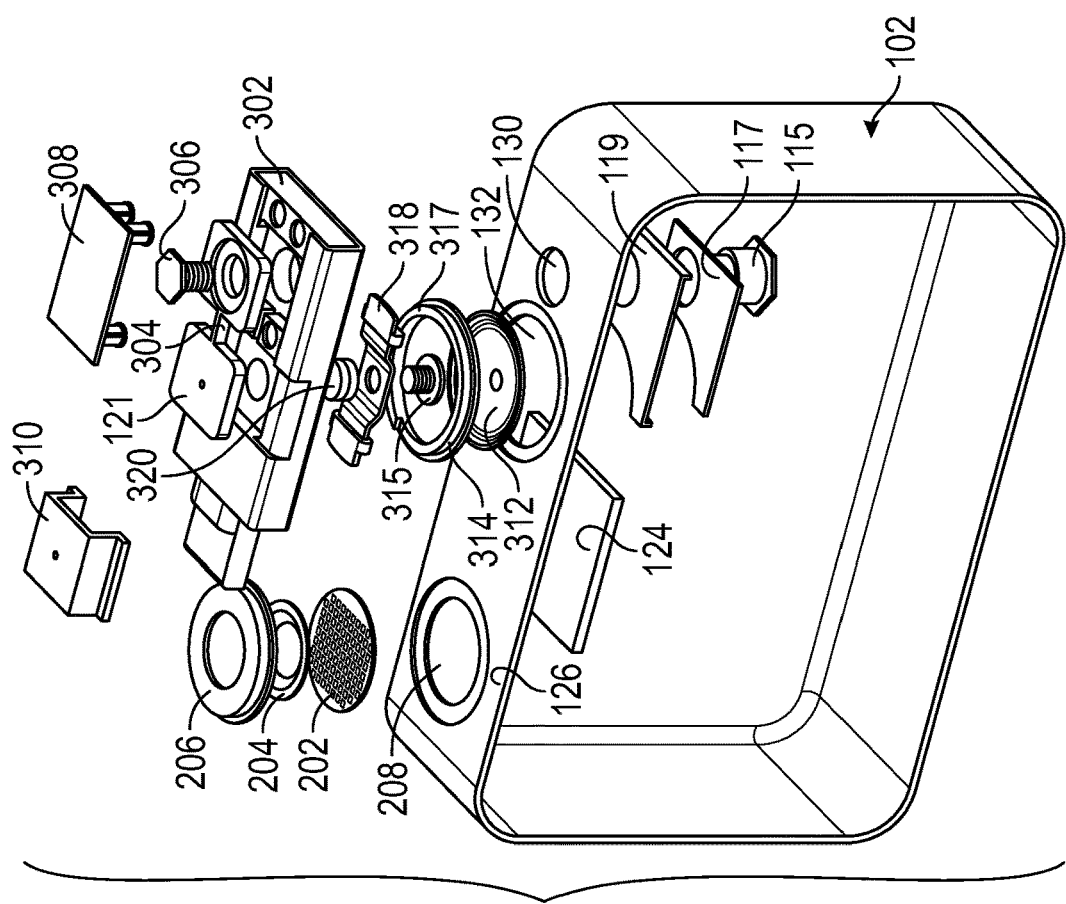
FIG. 6 is an exploded view of an exemplary casing assembly with associated safety features.
Figure 7:
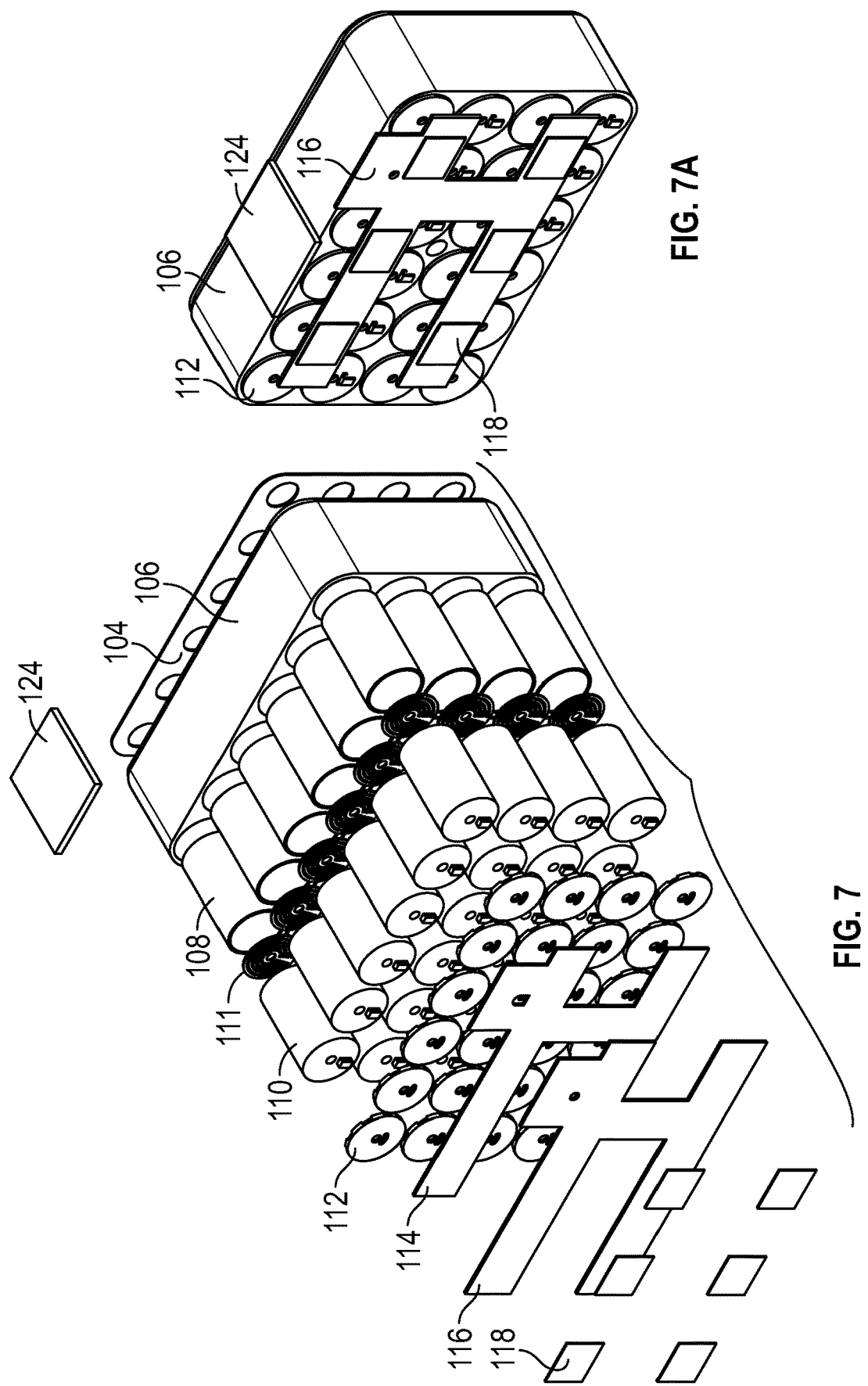
FIG. 7 is an exploded view of an exemplary multi-core subassembly.
Figure 8:
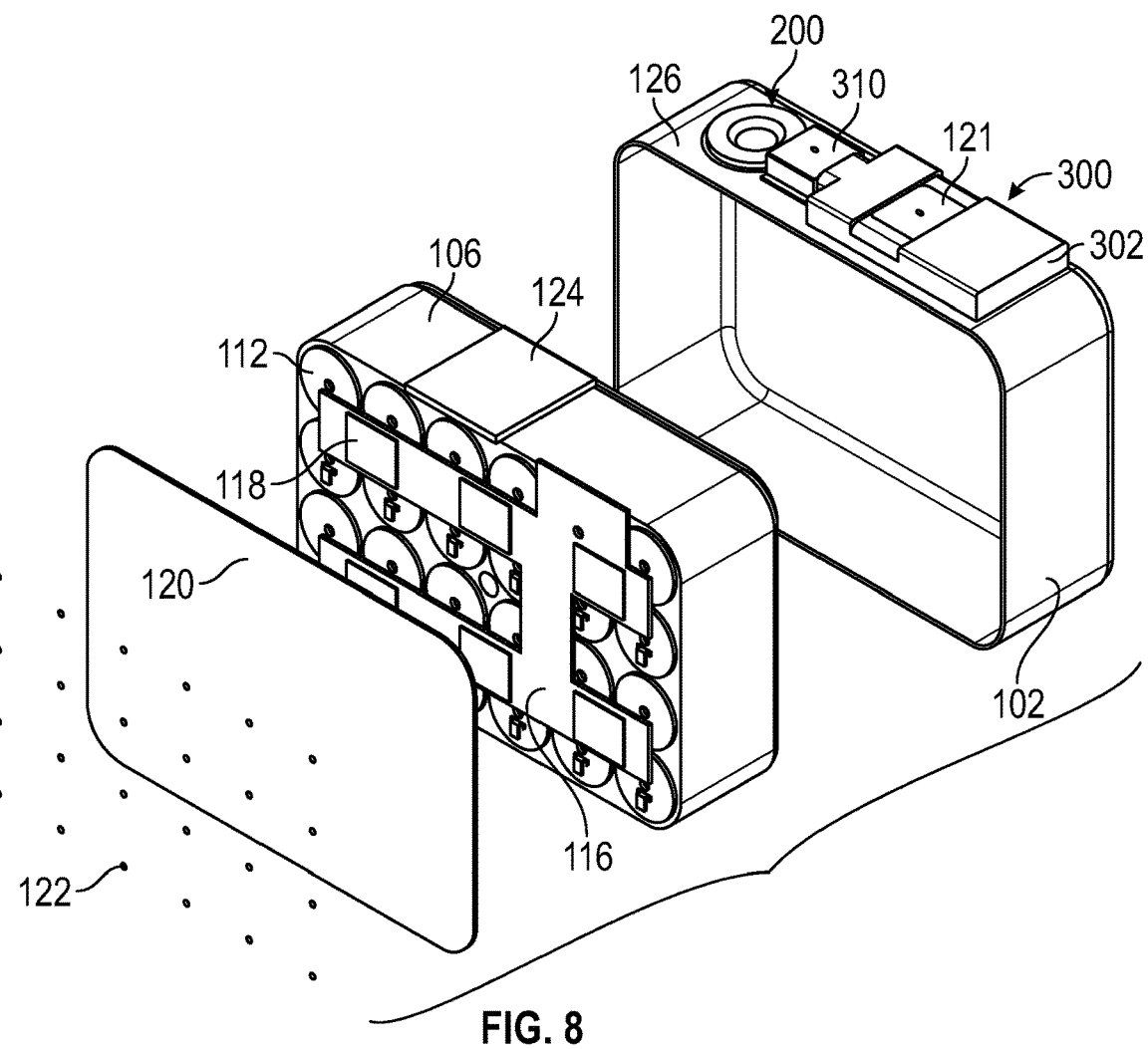
FIG. 8 is an exploded view of an exemplary multi-core lithium ion battery.
Figure 8A:
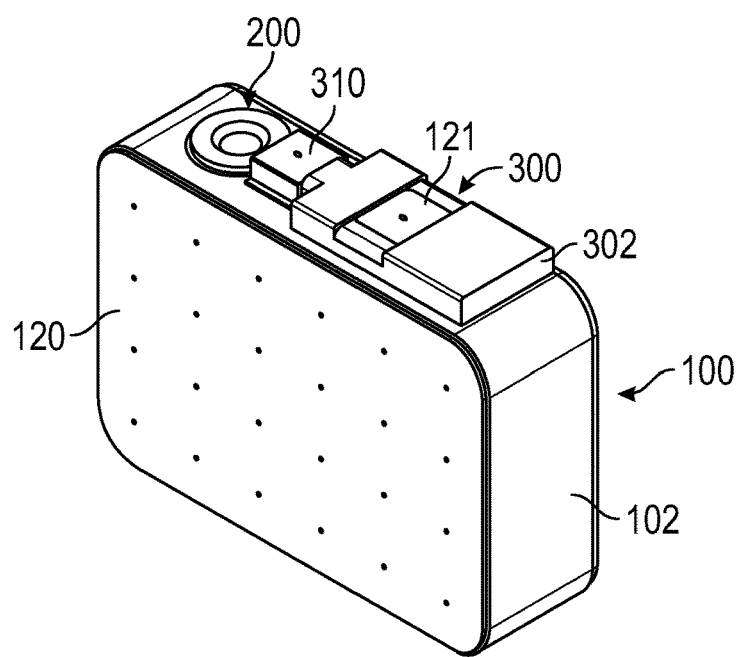
FIG. 8A is an assembled view of the exemplary multi-core lithium ion battery of FIG. 8.

Turning to the electrical aspects of battery 100, the exploded views of FIGS. 5 and 6 show upstanding copper terminal 115 which functions as the anode for the disclosed lithium ion battery and is configured and dimensioned to extend upward thru a further opening 130 formed in the top wall 126 of outer can or casing 102. The upstanding terminal 115 is in electric communication with the copper bus bar 114 and bus bar connector 117 internal to casing 102, and extends thru bus bar connector insulator 119 so as to be exposed upward and outward of outer can/casing 102. The upper end of upstanding copper terminal 115 is positioned within fuse holder 302, which may define a substantially rectangular, non-conductive (e.g., polymeric) structure that is mounted along the top wall 126 of outer can/casing 102. Upstanding terminal 115 is in electrical communication with terminal contact face 121 by way of fuse 304.

Fuse 304 is positioned within fuse holder 302 and external to outer can/casing 102 in electric communication with upstanding copper terminal 115 and terminal contact face 121. A terminal screw 306 may be provided to secure fuse 304 relative to fuse holder 302 and upstanding terminal 115, and the fuse components may be electrically isolated within the fuse holder 302 by fuse cover 308.

A substantially U-shaped terminal 310 defines spaced flange surfaces 311 that are in electrical and mounting contact with the top wall 126 of outer can/casing 102. Aluminum bus bar 104 which is internal to casing 102 is in electrical communication with the outer can/casing 102, thereby establishing electrical communication with terminal 310. Terminal 310 may take various geometric forms, as will be readily apparent to persons skilled in the art. Terminal 310 is typically fabricated from aluminum and functions as the cathode for the disclosed lithium ion battery.

Thus, the anode terminal contact face 121 and cathode terminal 310 are positioned in a side-by-side relationship on the top wall 126 of casing 102 and are available for electrical connection, thereby allowing energy supply from battery 100 to desired application(s).

With reference to exemplary PDD assembly 300, a conductive dome 312 is positioned with respect to a further opening 132 defined in the top wall 126 of outer can/casing 102. Dome 312 is initially flexed inward relative to the outer can/casing 102, and is thereby positioned to respond to an increase in pressure within the outer can by outward/upward deflection thereof. Dome 312 may be mounted with respect to top wall 126 by a dome adapter ring 314 which is typically welded with respect to top wall 126. In exemplary implementations and for ease of manufacture, dome adapter ring 314 may be pre-welded to the periphery of dome 312, thereby facilitating the welding operation associated with mounting dome 312 relative to top wall 126 due to the increased surface area provided by dome adapter ring 314.

In the exemplary embodiment depicted in FIGS. 5-8, a non-conductive (i.e., insulative) hammer holder 315 is positioned in engagement with a top face of the dome 312, thereby electrically isolating dome 312 from the underside of terminal contact face 121, as described below.

However, it is contemplated that the non-conductive hammer holder 315 and braid assembly may be eliminated in alternative implementations of the present disclosure, as described herein. In an exemplary non-braid implementation, upward/outward deflection of dome 312 (based on an increased pressure within outer can/casing 102) may bring dome 312 into direct contact with the underside of terminal contact face 121. In selecting this approach, care should be taken that the current running thru the dome 312 does not negatively impact the structural integrity of the dome 312. In this respect, the hammer holder/braid assembly implementation described with reference to the embodiment of FIGS. 5-8 offers an exemplary approach to avoiding and/or minimizing potential structural damage and/or failure of the dome by electrically isolating the dome from direct contact with the terminal contact face 121.

With further reference to FIGS. 5 and 6, hammer holder 315 includes an upward extension that is configured and dimensioned to pass through an opening defined in conductive braid 317 and snap connect to disconnect hammer 320 positioned on the other side of braid 317. In this way, hammer holder 315 and disconnect hammer 320 are secured with respect to braid 317 and move in concert therewith. The braid 317 is mounted with respect to a braid base 316 by braid clamps 318 and the subassembly is fixed relative to the top wall 126 of outer can/casing 102, e.g., by welding. Of note, conductive braid 317 is extensible so as to accommodate upward movement of dome 312, hammer holder 315 and disconnect hammer 320 relative to outer can/casing 102.

In use and in response to a build-up in pressure within the assembly defined by outer can/casing 102 and top cover 120, dome 312 will deflect upward relative to top wall 126 of outer can/casing 102. Upon sufficient upward deflection, i.e., based on the internal pressure associated with battery 100 reaching a threshold level, disconnect hammer 320 is brought into contact with the underside of terminal contact face 121 which is in electrical communication with fuse 304 within fuse holder 302. Upward movement of disconnect hammer 320 is permitted due to a "stretching" of braid 317. Contact between disconnect hammer 320 (which is conductive) completes a circuit that runs from cover 126 thru braid 317, hammer head 320, terminal contact face 121, fuse 302, and upstanding terminal 115. The completion of this circuit will cause fuse 302 to "blow", thereby breaking the circuit from the multi-core components positioned within the assembly defined by outer can 102 and top cover 120. Current is bypassed through the outer can 102. Of note, all operative components of PDD assembly 300—with the exception of the deflectable dome 312—are advantageously positioned external to the outer can 102 and top cover 120.

Figure 9:
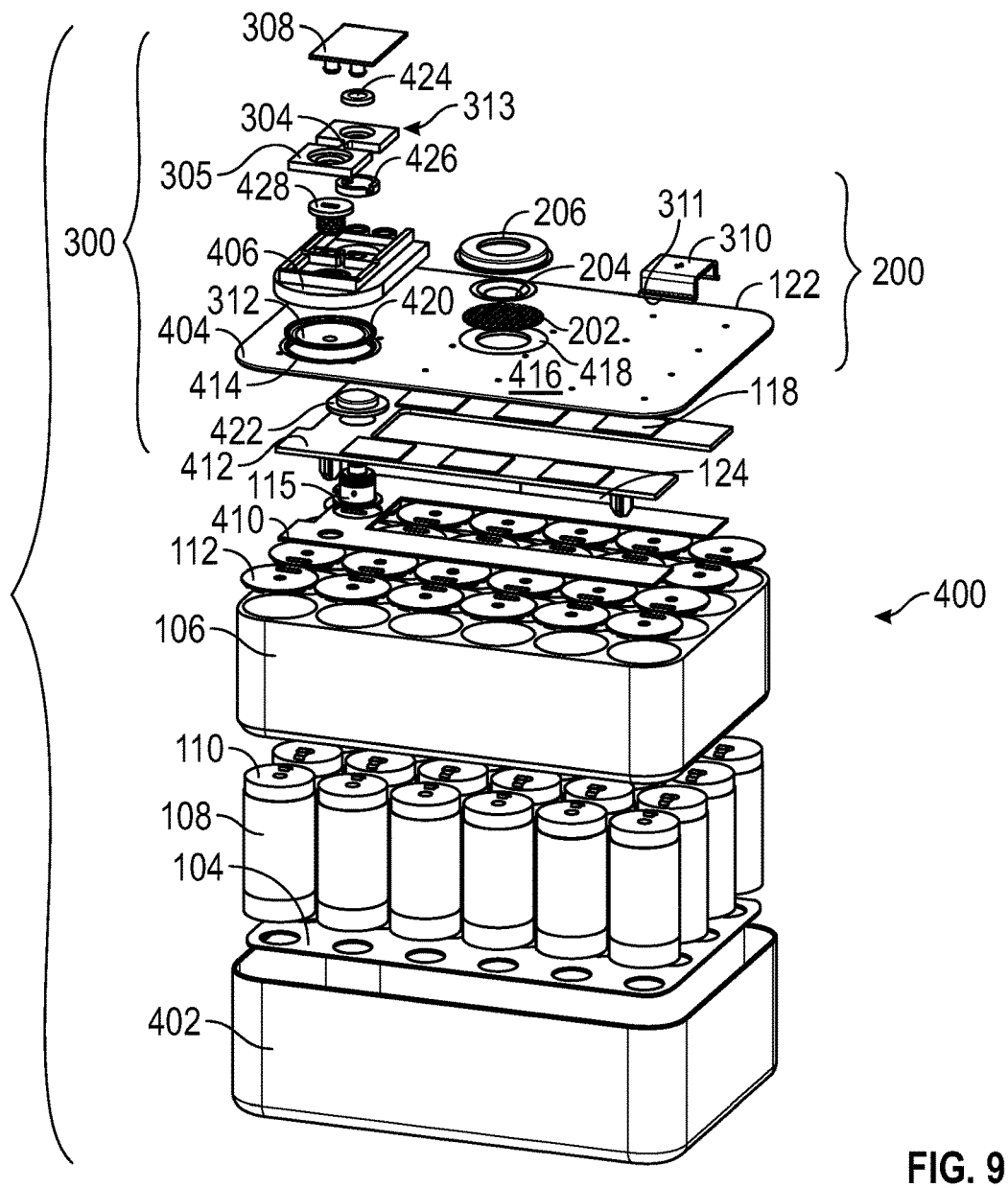
FIG. 9 is an exploded view of an exemplary multi-core lithium ion battery.

Turning to FIG. 9, an exploded view of an alternative exemplary multi-core lithium ion battery 400 is provided. An assembled view of the exemplary lithium ion battery is provided in FIG. 9A. FIG. 9 provides an alternate position for vent assembly 200 and PDD assembly 300 as was initially described with reference to the embodiment of FIGS. 5-8. More specifically, in the embodiment of FIG. 9, the vent assembly 200 and PDD assembly 300 are positioned on top cover 404 of battery 400. Battery 400 includes an outer can 402 that defines an interior region for receipt of components, as follows:

- An aluminum bus bar 104 that defines a plurality (24) of openings (e.g., circular openings);
- A housing or support structure 106 that defines a plurality (24) of spaced, substantially cylindrical regions that are configured and dimensioned to receive jelly roll/jelly roll sleeve subassemblies and to isolate the jelly rolls relative to each other from a side-by-side standpoint;
- A plurality (24) of jelly roll sleeves 108 configured and dimensioned to receive corresponding jelly rolls (i.e., electrochemical units) and to be positioned within the cylindrical regions defined by housing 106—the jelly roll sleeves 108 may be fabricated of various materials, e.g., polymers or metals, and may take the form of polymer and metal foil laminated foil pouches, and serve to further isolate electrolyte associated with individual jelly rolls/electrochemical units from communication with adjacent cavities by way of potential lateral flow;
- A plurality (24) jelly rolls/electrochemical units 110 configured and dimensioned to be positioned within jelly roll housings 108;
- A plurality (24) of substantially circular jelly roll backing sheets (not shown) positioned between bus bar 104 and the jelly rolls 110;
- A plurality (24) jelly roll covers 112 that are configured and dimensioned to cover the jelly rolls 110 positioned within housing 106;
- A copper bus bar 410 that defines a substantially U-shaped geometry so as to effect electrical communication with each of the jelly rolls 110;
- A bus bar insulator 412 that defines a geometry that generally corresponds to the geometry of bus bar 410 so as to insulate the bus bar 410 relative to the top cover of the battery assembly;
- A plurality (6) of anti-vibration mats 118 that are positioned between the bus bar insulator 412 and the top cover to absorb potential vibration and minimize relative movement therebetween;
- A substantially rectangular top cover or lid 404 that is configured and dimensioned to cooperate with the outer can 402 to encase the foregoing components therewithin and support/accommodate the vent assembly 200 and the PDD assembly 300;
- A plurality (24) of steel balls 122 positioned on the exterior of the top cover 404 to obstruct openings formed in the top cover 404 to facilitate electrolyte introduction to the jelly rolls; and
- One or more anti-vibration mats 124 positioned between the outer can 402 and the outer wall(s) of housing 106 to further dampen vibration and prevent movement therebetween.

Of note, the corners of the outer can 402, bus bar 104, housing 106 and top cover 404 are generally radiused at their respective corners to minimize size and facilitate manufacture/assembly. Of further note, the jelly rolls 110 positioned within housing 106 define a multi-core assembly that generally share headspace/atmosphere region within outer can 402 and top cover 404, but are isolated from one another from a side-by-side standpoint. Thus, any build-up in pressure and/or temperature associated with operation of any one or more of the jelly rolls 110 will be spread throughout the shared headspace/atmosphere region and will be addressed, as necessary, by the safety features described herein below.

Still further, exemplary battery 400 includes thermal insulation material positioned between adjacent jelly rolls 110 (not pictured). The thermal insulation material is present at a level sufficient to prevent propagation of thermal runaway and/or ignition of adjacent jelly rolls, as described elsewhere herein. Thermal insulation material may also be incorporated, in whole or in part, within housing 106 (e.g., as a composite and/or a dispersed constituent therewithin).

With further reference to FIG. 9, the safety features associated with the disclosed lithium ion battery 400 include a vent assembly 200 and a pressure disconnect device (PDD) assembly 300. According to the exemplary battery 400 of FIG. 9, operative components of the vent assembly 200 and the PDD assembly 300 are mounted/positioned on or relative to surface 416 of top cover 404.

With reference to the vent assembly 200, it is noted that surface 416 of top cover 404 defines an opening 418. A flame arrestor 202 and a vent disc 204 are mounted with respect to opening 418, i.e., across such opening. The flame arrestor 202 and vent disc 204 are mounted with respect to surface 416 of top cover 404 by vent adapter ring 206. Various mounting mechanisms may be employed to fix vent adapter ring 206 to the surface 416, e.g., welding, adhesive, mechanical mounting structures, and the like (including combinations thereof). Of note, vent disc 204 is necessarily sealingly engaged relative to surface 416 and may be formed in situ, e.g., by score line(s) and/or reduced thickness relative to surface 416, as is known in the art.

As noted above, in the event of a failure of an individual jellyroll, a large amount of gas may be generated (~10 liters), and this gas is both hot (~250-300° C.) and flammable. It is likely that this gas will ignite outside of the multi-jellyroll enclosure after a vent occurs. To prevent the flame front from entering the internal volume defined by outer can 402 and top cover 404, a mesh may be provided to function as flame arrestor 202 and may be advantageously placed/positioned over the vent area, i.e., opening 418. This mesh advantageously functions to reduce the temperature of the exiting gas stream below its auto-ignition temperature. Since the mesh is serving as a heat exchanger, greater surface area/smaller openings reject more heat, but decreasing the open area of the mesh increases the forces on the mesh during a vent.

Turning to the PDD assembly 300, the exploded view of FIG. 9 shows upstanding copper terminal 115 functions as the anode for lithium ion battery 400 and is configured and dimensioned to extend upward thru a further opening 420 formed in the surface 416 of the top cover 404. The upstanding terminal 115 is in electric communication with the copper bus bar 410 positioned within the internal volume defined by outer can 402 and top cover 404, and extends thru bus bar insulator 412 and seal ring 422 so as to be exposed upward of top cover 404. The upper end of upstanding copper terminal 115 is positioned within fuse holder 406, which may define a semicircular and square, non-conductive (e.g., polymeric) structure that is mounted on surface 416 of top cover 404.

Figure 9A:
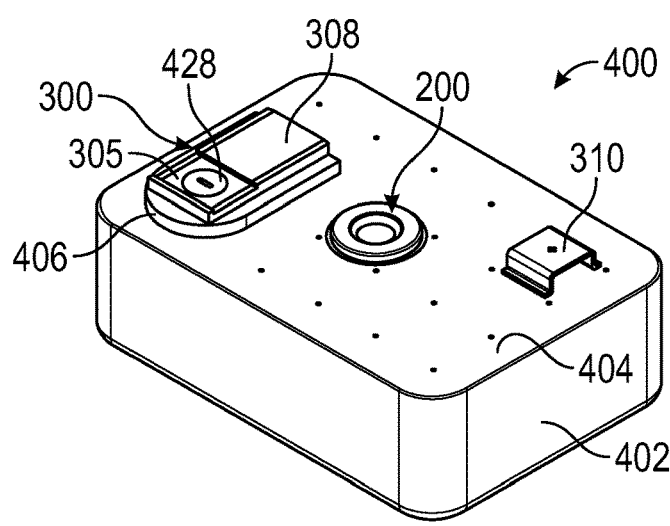
FIG. 9A is an assembled view of the exemplary multi-core lithium ion battery of FIG. 9.

Upstanding terminal 115 is in electrical communication with a conductive element 313 that includes or defines a fuse 304 and a terminal contact surface 305. Conductive element 313 is positioned within fuse holder 406 and is mounted external to top cover 404. Hammer head screw 428 secures conductive element 313 relative to fuse holder 406 and cooperates with conductive element 313 to define a substantially rectangular terminal contact surface, as shown in FIG. 9A. The conductive portions of conductive element 313, other than the exposed terminal contact surface 305, may be electrically isolated within the fuse holder 406 by fuse cover 308. Conductive element 313 rests on fuse holder hold down ring 426, which rests in a cavity on the exposed face of fuse holder 406.

With further reference to PDD assembly 300, a conductive dome 312 is positioned in and mounted with respect to a further opening 414 defined on surface 416 of top cover 404, e.g., by welding of a peripheral edge of dome 312 to top cover 404. Dome 312 is initially flexed inward relative to top cover 404, and is thereby positioned to respond to an increase in pressure within the casing defined by outer can 402 and top cover 404 by outward deflection thereof. Dome 312 is brought into direct contact with an underside of conductive element 313 and/or hammer head 428 based on pressure build-up within the assembly defined by outer can 402 and top cover 404, i.e., pressure build-up beyond a threshold pressure level.

In use and in response to a build-up in pressure within the assembly defined by outer can 402 and top cover 404, dome 312 will deflect upward relative to the plane defined by surface 416 of top cover 404. Upon sufficient upward deflection—i.e., based on the internal pressure associated with battery 400 reaching a threshold level—dome 312 is brought into direct contact with an underside of conductive element 313 and/or hammer head 428. Contact with conductive element/hammer head 428 (which are conductive) completes a circuit that runs from top cover 404 thru dome 312, hammer head 428, conductive element 313, fuse 304, and upstanding terminal 115. The completion of this circuit will cause fuse 304 to "blow", thereby breaking the circuit from the multi-core components positioned within the assembly defined by outer can 402 and top cover 404. Current is bypassed through the casing defined by outer can 402 and top cover 404. Of note, all operative components of PDD assembly 300 other than dome 312 are advantageously positioned external to the outer can 402/top cover 404 and dome 312 is advantageously mounted with respect to an opening 418 defined in top cover 404.

A substantially U-shaped terminal 310 with mounting flanges 311 is mounted in an opposing corner region of top cover 404, relative to surface 416. Terminal 310 is typically fabricated from aluminum and functions as the cathode for battery 400. Terminal 310 may take various geometric forms, as will be readily apparent to persons skilled in the art.

The multi-core design and assembly of battery 400 permits flexibility in the positioning of vent assembly 200 and PDD assembly 300 relative to outer can 402 and top cover 404 thereof. Thus, as shown in FIGS. 5-8, a battery design is provided in which the vent and PDD assemblies are both mounted relative to a top wall of the outer can 102, whereas in FIG. 9, a battery design is provided in which the vent and PDD assemblies are both mounted relative to a top cover 404 that is, in turn, mounted with respect to outer can 402. The flexibility in positioning is permitted, at least in part, by the multi-core design of the disclosed lithium ion batteries in which the electrochemical units/jelly rolls are not individually sealed, but instead are open/unsealed and communicate with a shared head space/atmosphere region. The overall internal volume of the casing thus experiences an increase in internal pressure that may result from a failure of any of the electrochemical units/jelly rolls positioned therewithin, and the vent assembly/PDD assembly may be located at any convenient location provided only that the vent assembly/PDD assembly will be able to sense and respond to pressure increases in the shared atmosphere therewithin. In addition, the vent assembly and PDD assembly need not be positioned on the same surface of the casing, as illustrated below with reference to FIGS. 11 and 11A.

Figure 10:
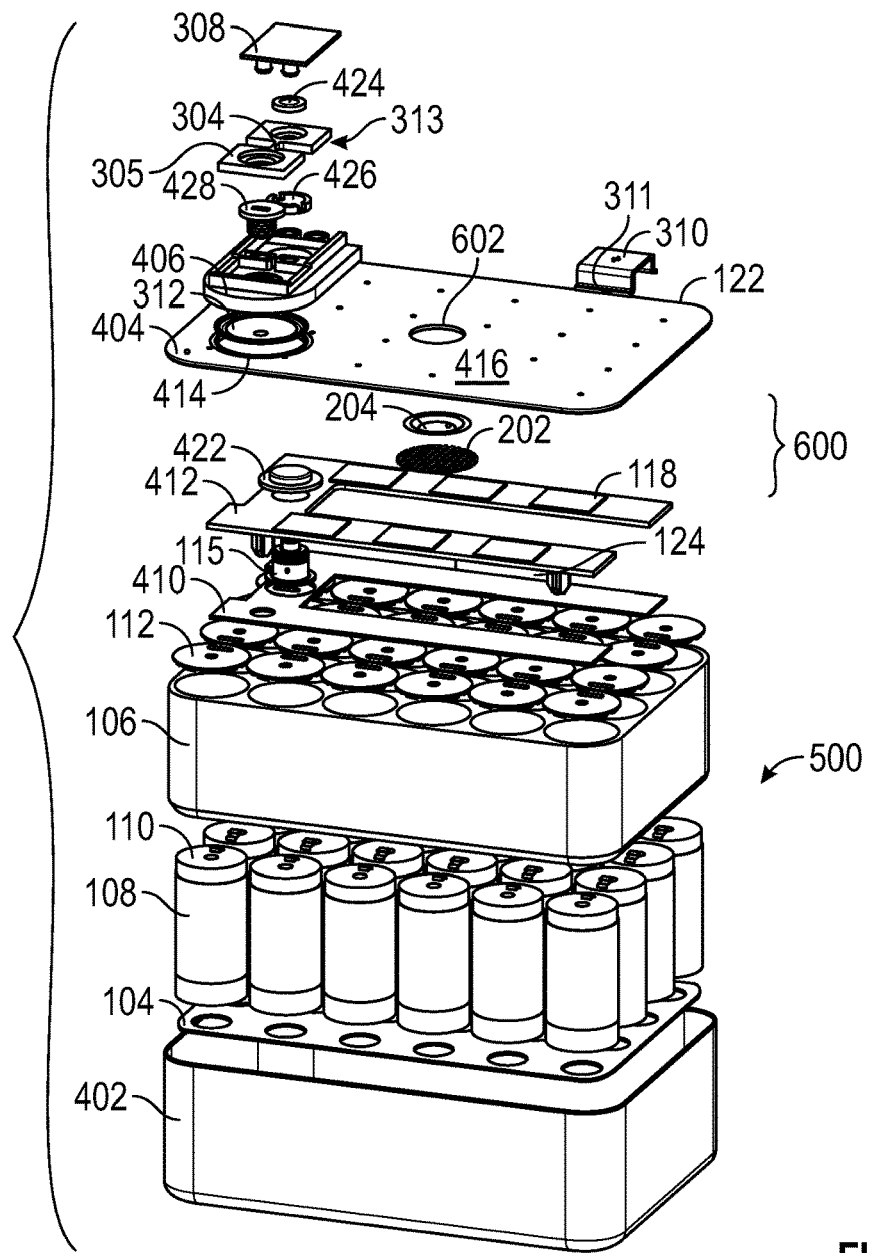
FIG. 10 is an exploded view of an exemplary multi-core lithium ion battery.

With reference to FIG. 10, a further exemplary battery assembly 500 is provided that is substantially similar to battery assembly 400 described with reference to FIGS. 9 and 9A. However, vent assembly 600 differs from vent assembly 200 described with reference previous exemplary embodiments.

Figure 10A:
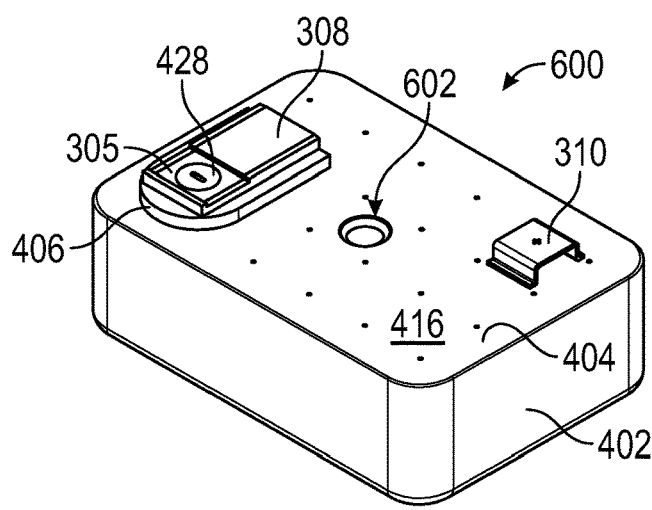
FIG. 10A is an assembled view of the exemplary multi-core lithium ion battery of FIG. 10.

An assembled view of the exemplary lithium ion battery with alternate vent assembly 600 is provided in FIG. 10A. Vent assembly 600 is mounted axial to opening 602 and beneath surface 416 of top cover 404. Vent adapter ring 206, illustrated in FIGS. 5, 6 and 9, has been eliminated; and flame arrestor 202 and vent disc 204 are attached beneath surface 416 of top cover 404 via other installation methods, e.g., welding, adhesive, mechanical mounting structures, and the like (including combinations thereof). Of note, vent disc 204 is necessarily sealingly engaged relative to surface 416 and may be formed in situ, e.g., by score line(s) and/or reduced thickness relative to surface 416, as is known in the art. The functionality of vent assembly 600 is no different from that of vent assembly 200, described above.

Figure 11:
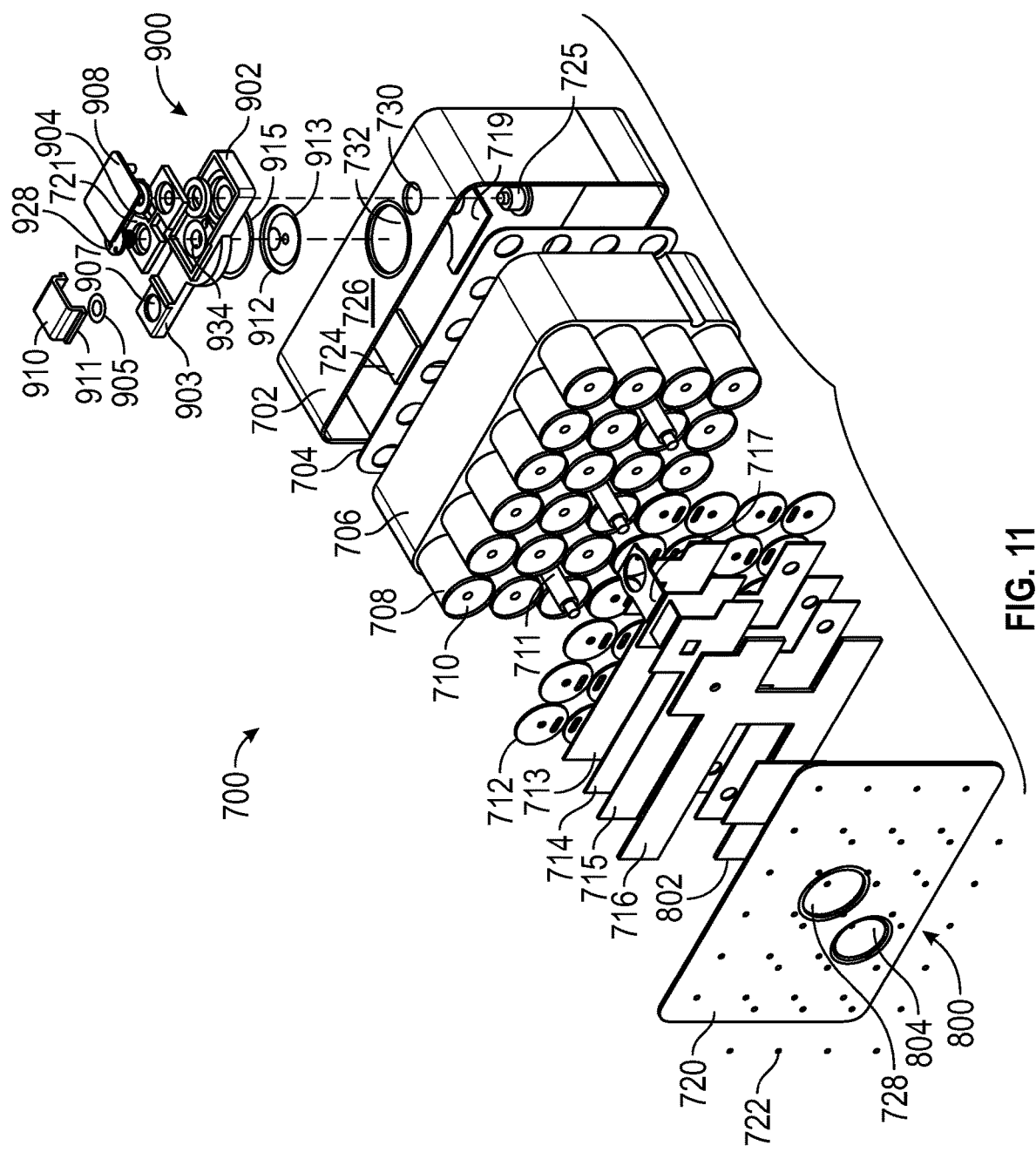
FIG. 11 an exploded view of a further exemplary multi-core lithium ion battery.
Figure 11A:
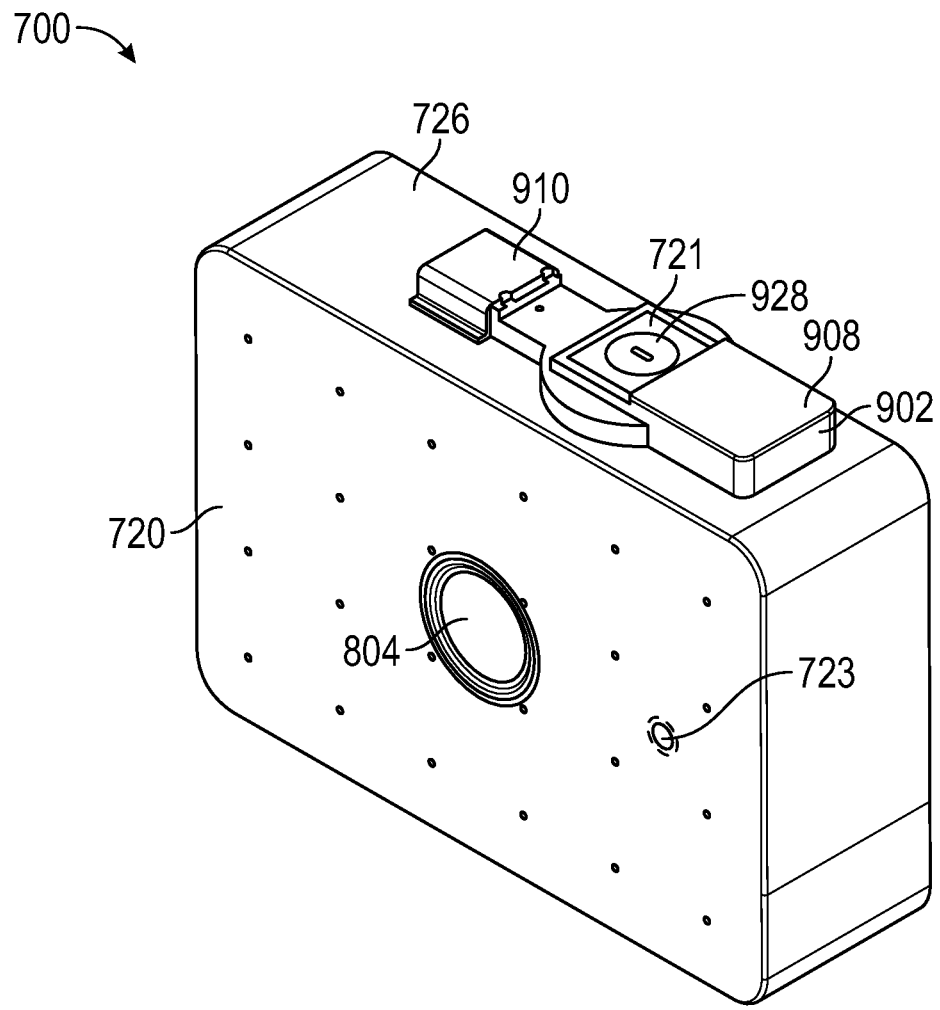
FIG. 11A is an assembled view of the exemplary multi-core lithium ion battery of FIG. 11.

Turning to FIGS. 11 and 11A, a further exemplary battery 700 according to the present disclosure is schematically depicted. Battery 700 includes an outer can or casing 702, that defines an interior region for receipt of components, as follows:

An aluminum bus bar 704 that defines a plurality (24) of openings (e.g., circular openings);

A housing or support structure 706 that defines a plurality (24) of spaced, substantially cylindrical regions or cavities that are configured and dimensioned to receive jelly roll/jelly roll sleeve subassemblies;

A plurality (24) of jelly roll sleeves 708 configured and dimensioned to receive corresponding jelly rolls and to be positioned within the cylindrical regions defined by housing 706—the jelly roll sleeves 708 may be fabricated of various materials, e.g., polymers or metals, and may take the form of polymer and metal foil laminated foil pouches;

A plurality (24) jelly rolls 710, i.e., electrochemical units, configured and dimensioned to be positioned within jelly roll housings 708;

A plurality (24) jelly roll covers 712 that are configured and dimensioned to cover the jelly rolls 710 positioned within the cavities defined by housing 706;

A copper bus bar 714 that defines a substantially H-shaped geometry so as to effect electrical communication with each of the jelly rolls 710;

A bus bar insulator 716 that defines a geometry that generally corresponds to the geometry of bus bar 714 so as to insulate the bus bar 714 relative to the top cover of the battery assembly;

Insulation tape 713 and 715, e.g., polyimide tape, that provides further heat resistant insulation above and below copper bus bar 714;

A substantially rectangular top cover 720 that is configured and dimensioned to cooperate with the outer can 702 to encase the foregoing components therewithin;

A plurality (3) of supports or pillars 711 that extend from housing 706 and that cooperate with top cover 720 to provide support/bracing therebetween—supports 711 may be fixed relative to top cover 720 in various ways, e.g., threading engagement, welding securement, simply interference fit relative to a corresponding aperture, and the like; one of the points of connection relative to top cover 720 is shown in phantom as 723;

A plurality (24) of steel balls 722 positioned on the exterior of the top cover 720 to obstruct openings formed in the top cover 120 to facilitate electrolyte introduction to the jelly rolls;

One or more anti-vibration mats 724 are positioned between the outer can 702 and the outer wall(s) of housing 706 to further dampen vibration and prevent movement therebetween.

The corners of the outer can/casing 702, bus bar 704, housing 706 and top cover 720 are generally radiused at their respective corners to minimize size and facilitate manufacture/assembly. The jelly rolls 710 positioned within housing 706 define a multi-core assembly that generally share headspace within outer can 702 and top cover 720, but do not communicate with each other side-to-side. Thus, any buildup in pressure and/or temperature associated with operation of any one or more of the jelly rolls 710 will be spread throughout the shared headspace and will be addressed, as necessary, by the safety features described herein below. However, electrolyte associated with a first jelly roll 710 does not communicate with an adjacent jelly roll 710 because the substantially cylindrical regions defined by housing 706 isolate jelly rolls 710 from each other from a side-to-side standpoint. The sleeves 708 further contribute to the side-to-side electrolyte isolation as between adjacent jelly rolls 710.

Still further, exemplary battery 700 includes thermal insulation material positioned between adjacent jelly rolls 710 (not pictured). The thermal insulation material is present at a level sufficient to prevent propagation of thermal runaway and/or ignition of adjacent jelly rolls, as described elsewhere herein. Thermal insulation material may also be incorporated, in whole or in part, within housing 706 (e.g., as a composite and/or a dispersed constituent therewithin).

Exemplary safety features associated with the disclosed lithium ion battery 700 include a vent assembly 800 and a pressure disconnect device (PDD) assembly 900. Unlike the exemplary battery designs described with reference to FIGS. 5-10, operative components of the vent assembly 800 and the PDD assembly 900 are not mounted/positioned relative to the same outer surface of the battery casing, e.g., on a top wall 126 of outer can 102 of battery (as shown in FIGS. 5-8) or top cover 404 of battery (as shown in FIG. 10), but instead are deployed on different outer surfaces of the battery casing.

With initial reference to vent assembly 800, top cover 720 defines an opening 728. A flame arrestor 802 and a vent disc 804 are mounted across the opening 728. A seal is maintained in the region of flame arrestor 802 and vent disc 804, e.g., by a vent adapter ring (not pictured). Various mounting mechanisms may be employed to fix the structures associated with vent assembly 800 relative to top cover 720, e.g., welding, adhesive, mechanical mounting structures, and the like (including combinations thereof). Of note, vent disc 804 is necessarily sealingly engaged relative to top cover 720 and may be formed in situ, e.g., by score line(s) and/or reduced thickness relative to top cover 720, as is known in the art.

In the event of a failure of an individual jelly roll (or multiple jelly rolls), a large amount of gas may be generated (~10 liters), and this gas is both hot (~250-300° C.) and flammable. It is likely that this gas will ignite outside of the multi-jelly roll enclosure after a vent occurs. To prevent the flame front from entering the casing, a mesh may be provided to function as flame arrestor 802 and may be advantageously placed or positioned over the vent area, i.e., opening 728. This mesh functions to reduce the temperature of the exiting gas stream below its auto-ignition temperature. Since the mesh is serving as a heat exchanger, greater surface area and smaller openings reject more heat, but decreasing the open area of the mesh increases the forces on the mesh during a vent.

Upstanding copper terminal 725 which functions as the anode for the disclosed lithium ion battery and is configured and dimensioned to extend upward thru an opening 730 formed in the top wall 726 of outer can or casing 702. The upstanding terminal 725 is in electric communication with the copper bus bar 714 and bus bar connector 717 internal to the casing 702, and extends thru bus bar connector insulator 719 so as to be exposed upward and outward of outer can/casing 702. The upper end of upstanding copper terminal 725 is positioned within fuse holder 902, which may define a substantially rectangular, non-conductive (e.g., polymeric) structure that is mounted along the top wall 726 of outer can/casing 702. Upstanding terminal 725 is in electrical communication with terminal contact face 721 by way of fuse 904.

Fuse 904 is positioned within fuse holder 902 and external to outer can/casing 702 in electric communication with upstanding copper terminal 725 and terminal contact face 721. The fuse components may be electrically isolated within the fuse holder 902 by fuse cover 908.

A substantially U-shaped terminal 910 defines spaced flange surfaces 911 that are in electrical and mounting contact with the top wall 726 of outer can/casing 702. In exemplary embodiments, terminal 910 is positioned over an extension 903 of fuse holder 902 that facilitates positioning of terminal 910. A conventional O-ring 905 may be received within an aperture formed in the extension 903 to dampen potential vibration/movement of fuse holder 902 relative to top wall 726. O-ring 905 may be received in an aperture 907 formed in extension 903 such that O-ring engages the surface of top wall 726 and establishes a stable relationship between fuse holder 902 and top wall 726.

Aluminum bus bar 704 which is internal to casing 702 is in electrical communication with the outer can/casing 702, thereby establishing electrical communication with terminal 910. Terminal 910 may take various geometric forms, as will be readily apparent to persons skilled in the art. Terminal 910 is typically fabricated from aluminum and functions as the cathode for the disclosed lithium ion battery 700. Thus, the anode terminal contact face 721 and cathode terminal 910 are positioned in a side-by-side relationship on the top wall 726 of casing 702 and are available for electrical connection, thereby allowing energy supply from battery 700 to desired application(s).

With reference to exemplary PDD assembly 900, a conductive dome 912 is positioned with respect to a second opening 732 defined in the top wall 726 of outer can/casing 702. Dome 912 defines a region of increased cross-sectional thickness central thereto. Thus, in an exemplary embodiment, a conductive film disc 913 is applied to a central region of dome 912, e.g., by welding or other adherence method, thereby increasing the cross-sectional dimension of the dome 912 in such central region.

Dome 912 is initially flexed inward relative to the outer can/casing 702, and is thereby positioned to respond to an increase in pressure within the outer can by outward/upward deflection thereof. Dome 912 may be mounted with respect to top wall 726 by a dome adapter ring which is typically welded to the periphery of dome 912 and then further welded with respect to top wall 726 to fix the periphery of dome 912 relative to top wall 726. A sealing O-ring 915 may be included to provide an enhanced seal in the region of interface between fuse holder 902 and dome 912.

Figure 12A:
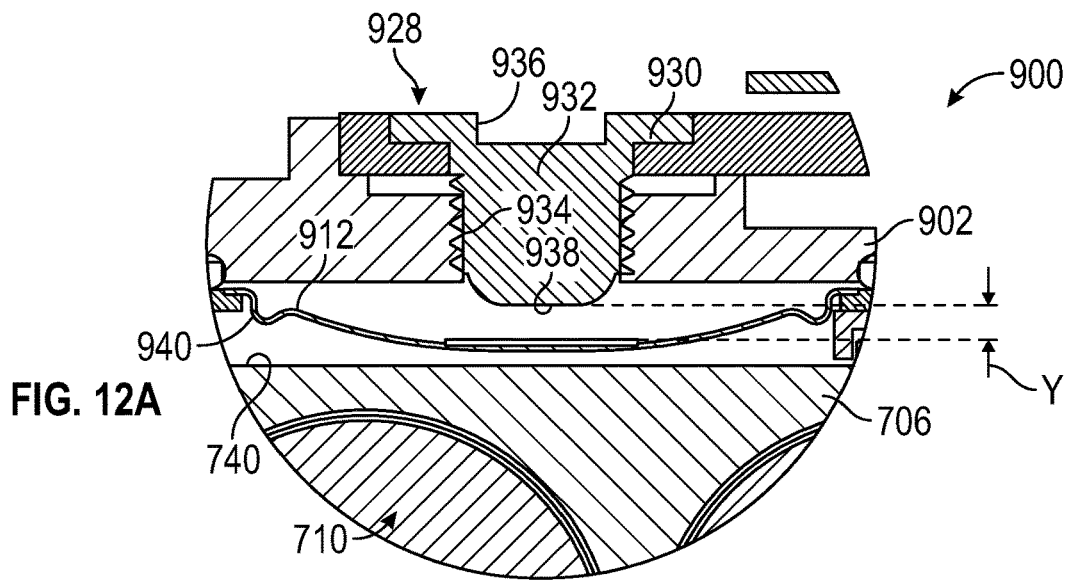
FIGS. 12A-12C are three (3) schematic side views that show progression of a deflectable dome in response to a pressure increase within a casing.
Figure 12B:
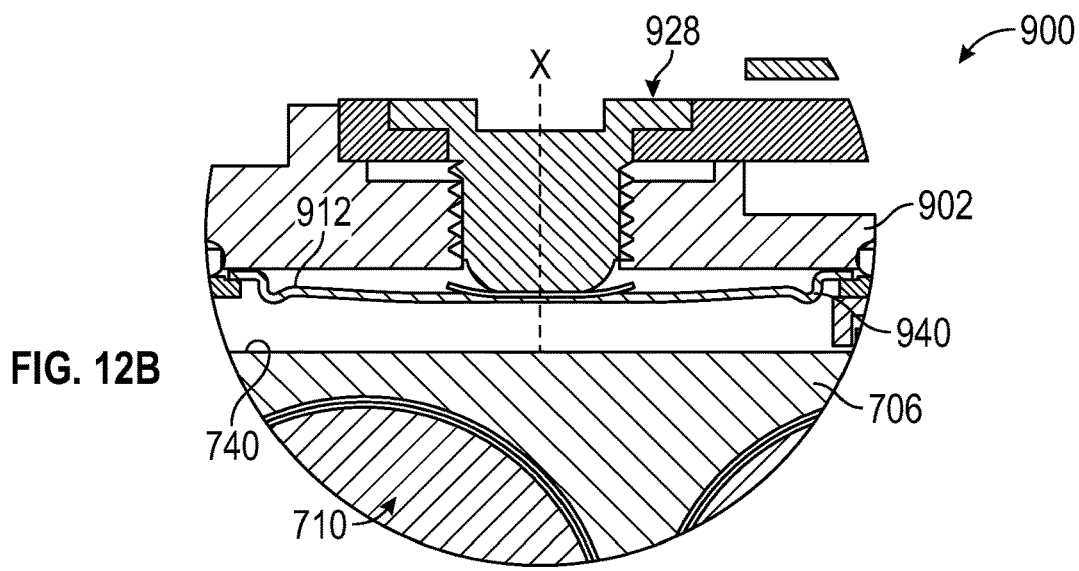
Figure 12C:
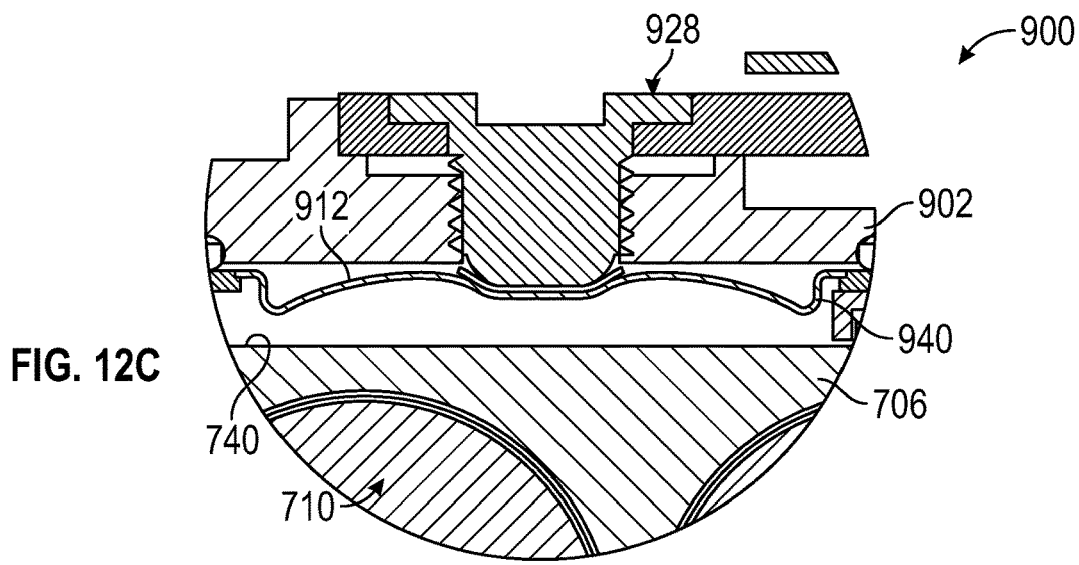

With reference to FIGS. 12A-12C, additional features and functions of PDD 900, including exemplary specifically dome 912 and hammer head 928, are described according to the present disclosure. Hammer head 928 defines a circumferential flange or head region 930 and a threaded shank 932 extending therefrom. The threaded shank 932 is adapted to engage corresponding threads formed in an aperture 934 defined in fuse holder 902. Head region 930 cooperates with terminal contact face 721 to define a substantially flush upper face thereof. A drive feature 936 is defined on the head region 930 to facilitate interaction with a tool, e.g., a screw driver or the like, to threadingly engage hammer head 928 relative to aperture 932. Once threaded into place, hammer head 928 is securely held in the desired position relative to dome 912, thereby ensuring reliable and exacting electrical contact between dome 912 and hammer head 928 when pressure conditions within the battery casing activate the dome 912.

In the assembled condition shown in FIGS. 12A-12C, the distal face 938 of hammer head 928 advantageously extends beyond the underside of fuse holder 902. The central axis of hammer head 928 (shown as dashed line "X" in FIG. 12B) is substantially aligned with the center of circular dome 912. In the initial position of FIG. 12A, dome 912 is bowed away from the distal face 938 of hammer head 928. This relative orientation reflects a condition wherein the pressure within the volume bounded by can 702 and top cover 720 is within normal operating ranges, i.e., not at an elevated level such that a deflection response of dome 912 has been initiated. The pressure associated with normal operating condition of a lithium ion battery according to the present disclosure will vary depending on many factors, including the power/energy capacity of the battery, the number of jelly rolls/electrochemical units positioned within the casing, the volume of the shared atmosphere region, the composition of the electrolyte (including specifically the type and level of degassing agent).

In typical lithium ion battery implementations of the present disclosure wherein the battery capacity is 30 Amphours or greater, operating pressures under normal conditions are between 0 and 5 psig. Accordingly, operating pressures of between 10 psig and 70 psig may be deemed acceptable for PDD activation, although lower pressure ranges, e.g., pressures in the range of 10 psig to 30 psig, may be deemed acceptable pressure operating ranges in exemplary implementations of the present disclosure. The PDD of the present disclosure is designed so as to be responsive at a selected pressure (or limited pressure range) within the casing of the battery, e.g., 20 psig±0.1 psig or the like. Of note, the PDD activation pressure may be selected at least in part to ensure that the temperature within the battery casing does not exceed acceptable levels, e.g., an internal temperature that does not exceed 110° C. to 120° C. If the internal temperature is permitted to exceed about 110° C. to 120° C., significant issues may arise that could lead to internal short(s) of the jelly roll(s)/electrochemical unit(s) (e.g., based on separator shrinkage or rupturing) and/or thermal runaway. According to the present disclosure, activation of the disclosed PDD at the predetermined pressure threshold is generally effective to prevent against thermal runaway and other potentially catastrophic failure conditions.

In particular and in exemplary embodiments of the present disclosure, when the internal pressure reaches the PDD threshold value, the dome disc pops up to contact the hammer head causing a short circuit between positive and negative terminals, which results in fuse failure. After the fuse has failed (i.e., "blown"), the negative terminal connecting to the external circuit is isolated from jelly rolls in the container, and the negative terminal is kept connecting to the positive terminal via the case and hammer head, resulting in current directly flowing from the negative terminal to the case, i.e., by-passing jelly rolls.

Figure 13:
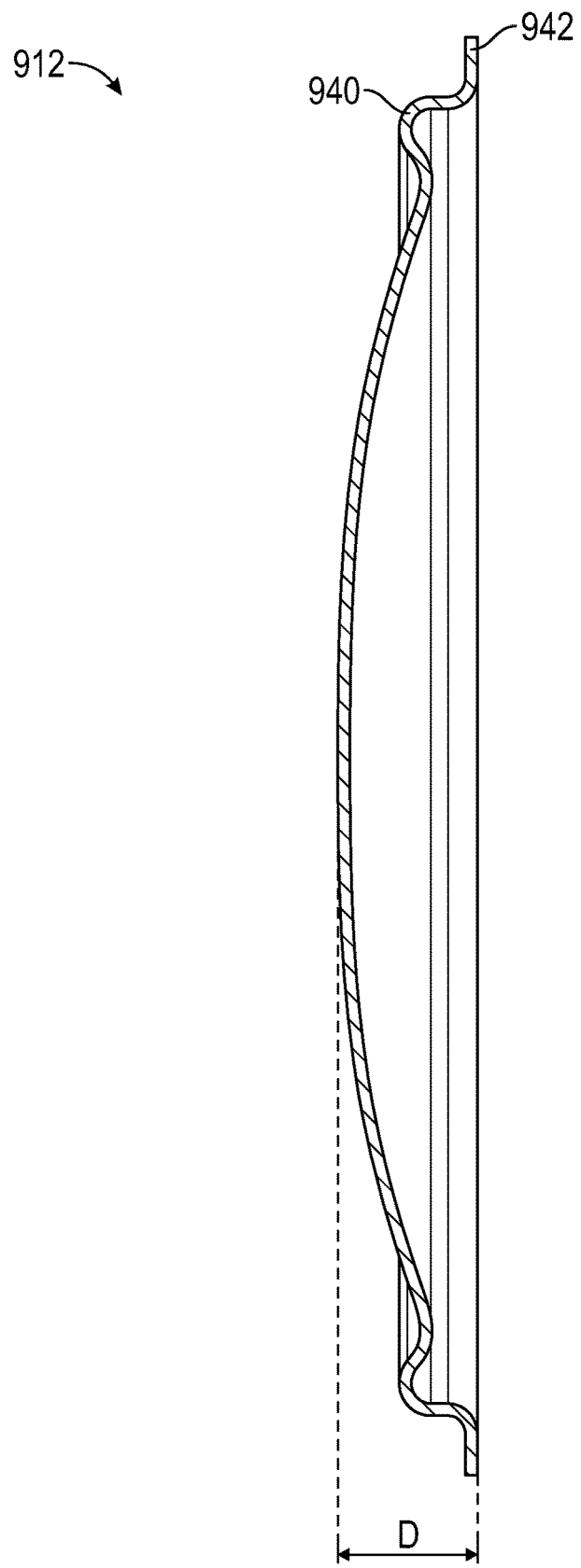
FIG. 13 is a sectional side view of an exemplary deflectable dome.

In an exemplary embodiment of the present disclosure, and as shown in the cross-section of FIG. 13, dome 912 (prior to addition of conductive film disc 913) may include or define a circumferential groove 940 at an outer periphery thereof (but internal of circumferential mounting flange 942). The groove 940 facilitates response of dome 912 to internal pressures developed within the battery casing.

In an exemplary embodiment of the present disclosure where dome 912 is fabricated from aluminum such that the central region thickness is about 0.015 to 0.022 inches (with or without film disc 913), the diameter of dome 912 (exclusive of mounting flange region 942) is about 1.18 inches, and the diameter of dome 912 internal of groove 940 is about 1.03 inches, the radius of the distal face 938 of hammer head 928 is about 0.06 to 0.08 inches, and the activation pressure is about 20 to 25 psig, the distance "D" from the top face of mounting flange 942 to the surface of dome 912 at a center point thereof once the film disc 913 (diameter of about 0.404 inches) is applied to the central region of dome 912 (not shown in FIG. 13) is about 0.115 inches to about 0.123 inches.

Of note, as shown in FIGS. 12A-12C, the distal face 938 of hammer head 928 extends below the plane defined by the lower face of fuse holder 902, thereby closing the gap between such distal face 938 and the central region of dome 912. The initial distance "Y" between the distal face 938 of hammer head 928 and the central region of dome 912 (with film disc 913 applied thereto) is approximately 0.063 inches. Thus, the downward extension of hammer head 928 relative to the lower face of fuse holder 902 reduces the required travel distance for dome 912 to contact hammer head 928 and complete an electrical circuit therewith. The initial spacing distance "Y" will vary depending on the specifics of a PDD design based on such factors as the operating pressures to be accommodated within the battery, the design parameters of dome 912 and the pressure at which PDD 900 is to be activated.

Once a pressure that meets or exceeds the predetermined pressure threshold is reached within the battery casing, the sequence schematically depicted in FIGS. 12B and 12C commences according to an exemplary embodiment of the present disclosure. With reference to the inversion progression of dome 912 in response to an elevated pressure within the battery casing defined by outer can and top cover, dome 912 will deflect upward relative to the distal face 938 of hammer head 928. As shown in FIG. 12B, upon sufficient upward deflection—i.e., based on the internal pressure associated with the battery reaching a threshold level—the central region of dome 912 is brought into direct physical contact with the distal face 938 of hammer head 928. The travel distance required to place dome 912 and hammer head into initial contact is equal to the initial spacing distance "Y". However, to ensure consistent, continuous and wide area contact over the entirety of the distal face 938 of hammer head 928, the dome 912 is configured and dimensioned to undergo a minimum travel distance of at least about 0.02 inches greater than the initial spacing distance "Y" when inversion is complete, e.g., as shown in FIG. 12C. Thus, for example, where initial spacing distance "Y" is about 0.063 inches as described above, the minimum travel distance of dome 912 when fully inverted is at least about 0.083 inches. This minimum travel distance is thus on the order of at least about 120% to 140% of the initial spacing distance "Y". The "interference" established by the fact that the minimum travel distance of dome 912 exceeds the initial spacing distance "Y" helps to ensure a positive electrical connection in the short circuit mode that enables reliable current bypass from the battery, and minimizes the potential for undesirable temperature increases associated with discharge current.

As shown in FIG. 12C, full inversion of dome 912 causes dome 912 to deform around the distal face 938 of hammer head 928, thereby further ensuring consistent, continuous and wide area contact of dome 912 relative to hammer head 928. As will be apparent to persons skilled in the art, a more complete and reliable electrical contact between dome 912 and hammer head 928 reduces the likelihood of burn through of the dome 912, as well as the disadvantageous potential for electrical surges/pulses due to intermittent contact that can increase the likelihood of temperature rise and thermal runaway of electrochemical units and/or electrolyte. The presence of film disc 913 or other thickening of the central region of dome 912 further enhances the consistent, continuous and wide area contact between dome 912 and hammer head 928.

With further reference to FIGS. 12A-12C, it is noted the physical proximity and relationship of PDD 900 relative to support structure 706 and jelly rolls/electrochemical units 710. As schematically depicted in FIGS. 12A-12C, the side wall 740 of support structure 706 is spaced from the underside of fuse holder 902 in a defined manner, such that the space required for positioning and operation of dome 912 is clearly established and maintained. Thus, a minimum of space need be devoted to accommodating dome 912, thereby permitting maximal packing density for the electrochemical units 710 without sacrificing PDD operation. The volume within which dome 912 moves constitutes a shared atmosphere region for the unsealed electrochemical units positioned in support structure 706. As a result of the shared atmosphere region and the relatively large space available for positioning and operation of dome 912, the disclosed PDD is able to operate effectively and reliably at relatively low pressures, e.g., as low as 10 psig, for batteries with capacities of 30 Ah and higher.

Still further, the PDD of the present disclosure may be designed for activation at a first pressure, e.g., 10 to 40 psig (or higher, depending on battery design), the vent assembly may be designed for activation (i.e., pressure release/venting) at a second pressure that is at least 5 to 10 psig higher than the activation pressure of the PDD, and the overall design of the battery casing (i.e., welds, seals, joints and the like) may be designed with a failure pressure rating that is at least 5 to 10 psig higher than the activation pressure of the vent assembly. In this way, the sequence for safety response of the battery design may be established so as to minimize risks associated with battery design and operation.

As is apparent from each of the disclosed battery systems, the PDD components and the vent structure of the present disclosure advantageously interact with and respond to conditions within the battery casing based on components that are mounted with respect to apertures/openings formed directly in the can or lid of the casing. For example, the disclosed dome is mounted with respect to an opening formed in the can itself in FIGS. 5, 6 and 11, while the disclosed dome is mounted with respect to an opening formed in the lid in FIGS. 9 and 10. Equally beneficially, the vent is mounted with respect to an opening formed directly in the can in FIGS. 5 and 6, while the disclosed vent is mounted with respect to an opening formed in the lid in FIGS. 9-11.

No intermediate or accessory structure is required to support the PPD and/or vent structures of the present disclosure. Indeed, only one additional opening relative to the interior of the battery is required according to the embodiments of the present disclosure, i.e., an opening to accommodate passage of the Cu terminal. The simplicity and manufacturing/assembly ease of the disclosed battery systems improves the manufacturability and cost parameters of the disclosed battery systems. Still further, the direct mounting of the PDD and vent assemblies relative to the can and/or lid of the disclosed batteries further enhances the low profile of the disclosed batteries. By low profile is meant the reduced volume or space required to accommodate the disclosed PDD and vent safety structures/systems, while delivering high capacity battery systems, e.g., 30 Ah and higher.

Mitigation of Arc Generation Relative to Dome in Exemplary Pressure Disconnect Devices To avoid a potential for dome disc burn-through that might create hole(s) due to arc generation when the dome is activated, two advantageous design options have been developed according to the present disclosure: (i) a thicker dome disc, and (ii) welding additional foil on the disc. The two options may be independently implemented, or they may be implemented in combination.

Both thickening of the dome disc and welding additional foil on the dome disc (thereby increasing mass in the region of the dome disc) have been shown to eliminate burn-through hole in the dome disc when applying 800 A DC current. The results of these tests are shown in Tables 1 & 2 set forth below.

TABLE 11

Dome disc in PDD subassembly after applying high DC current

| Dome material & thickness | Weld metal & thickness | Hammer radius | Activation pressure (psig) | Applied current (A) | Fuse | Dome damage |
|---|---|---|---|---|---|---|
| Al/0.012" | N/A | 0.025" | 20-25 | 800 | Littelfuse MIDI 200A | Big burn-through hole |

TABLE 11-continued

Dome disc in PDD subassembly after applying high DC current

| Dome material & thickness | Weld metal & thickness | Hammer radius | Activation pressure (psig) | Applied current (A) | Fuse | Dome damage |
|---|---|---|---|---|---|---|
| Al/0.012" | N/A | 0.060" | 20-25 | 800 | | Small burn-through hole |
| Al/0.015" | N/A | 0.060" | 35 | 800 | | No burn-through |
| Al/0.012" | 0.004" Al | 0.060" | 20-25 | 800 | | No burn-through |
| Al/0.012" | 0.004" Al | 0.080" | 20-25 | 800 | | No burn-through |
| Al/0.012" | N/A | 0.025" | 20-25 | 800 | Cadenza | Big burn-through |
| Al/0.012" | 0.010" Al | 0.060" | 20-25 | 900 | | No burn-through |
| Al/0.012" | Cu tape (3M 1187) | 0.060" | 20-25 | 800 | Littelfuse MIDI 200A | No burn-through |

The effect of thickness and type of additional welding metal foil on dome disc popping pressure with different thickness Al foils and Cu foil welded on the Al dome disc has been investigated. Based on these studies and as shown in Table 2, the Al foil thickness or Cu foil thickness has no significant effect on dome popping pressure.

TABLE 12

Dome popping pressure with welded additional foil

| Additional foil material | Foil thickness (inch) | Dome popping pressure (psi) | | |
|---|---|---|---|---|
| | | Max | Min | Average |
| Al | 0.004 | 22 | 20 | 22 |
| Al | 0.010 | 22 | 20 | 21 |
| Al | 0.012 | 25 | 19 | 21 |
| Cu | 0.010 | 23 | 20 | 21 |
| Specification | N/A | 15 | 25 | 20 |

The additional metal foil can advantageously act as a sacrificial layer when an arc is generated, thereby protecting the dome disc from burning through. In addition, the larger thermal mass and lower resistance associated with the options disclosed herein beneficially reduces the local heat at the contact area between the hammer and dome disc. It is expected that the thicker and more conductive the foil is, the more effective the disclosed designs will be in preventing the arc from burning through.

In implementing designs to mitigate the risk of burn through when the dome is activated, i.e., when the disclosed pressure disconnect device is triggered, it is noted that the selection and use of different materials may be beneficially employed. For example, materials that exhibit a higher melting point may be advantageous because they will less readily burn through. Also, the electrical conductivity of the selected material may benefit the design and operation of the dome trigger, e.g., materials that exhibit greater electrical conductivity will more effectively/rapidly dissipate current from the dome region, thereby reducing the risk of burn through.

Indeed, the speed with which the dome (or other PDD trigger mechanism) responds to a pressure disconnect condition impacts on the degree to which the design must mitigate against potential burn through, i.e., the more quickly the dome/trigger responds, the less likely a burn through condition may occur (and vice versa). Thus, for a given PDD release pressure (e.g., 40 psi), a dome/trigger mechanism that is designed to respond at that pressure can be expected to respond at a certain speed based on its material(s) of construction, geometry, thickness/mass, etc. For a second PDD release pressure (e.g., 90 psi), a particular dome/trigger mechanism that is designed to respond at that pressure can be expected to respond at a potentially different speed based on its material(s) of construction, geometry, thickness/mass, etc. According to the present disclosure, the design of the dome/trigger mechanism may be selected (e.g., based on material(s) of construction, geometry, thickness/mass, etc.) so as to prevent burn through in view of the expected speed of PDD response.

Experimental Results

1. Overcharging Test of Cell with Pressure Disconnect Device a. Test Procedures

Utilizing a lithium ion battery fabricated according to the design of FIG. 5, charge an 80 Ah cell that includes 24 jelly rolls to 100% state of charge (SOC) with a constant current of 16 A at room temperature to 4.2V, followed by constant voltage charge at 4.2V, and ending at current reaching 4 A. Record voltage and capacity.

Overcharge test: charge the cell with a constant current of 32 A.

A thermocouple is placed in the center of cell. Terminate charging when the cell's SOC reached 200%.

Figure 14:
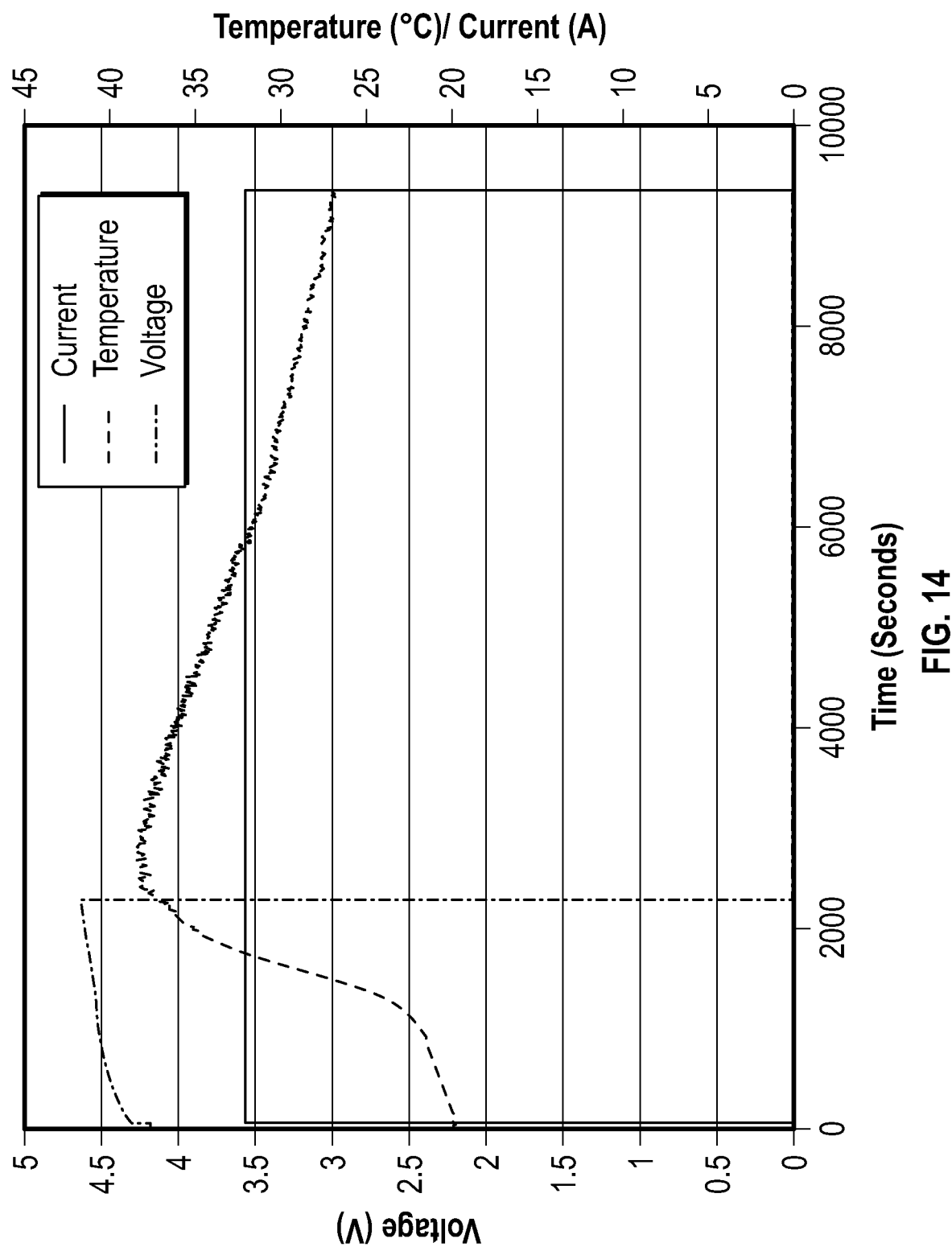
FIG. 14 is a plot of charge current, cell voltage and cell surface temperature for an experimental test.

The charge current, cell voltage and cell surface temperature variation during overcharging are plotted in FIG. 14.

b. Results

The pressure disconnect device was activated by system conditions at about 4.63V.

After PDD activation, the charge current was by-passing the cell.

The maximum cell surface temperature was 38° C. Except for the blown fuse, the cell exhibited no other changes. Thus, the PDD device functioned effectively to protect the cell from damage.

2. Test of Pressure Disconnect Device Assembly

Figure 15:
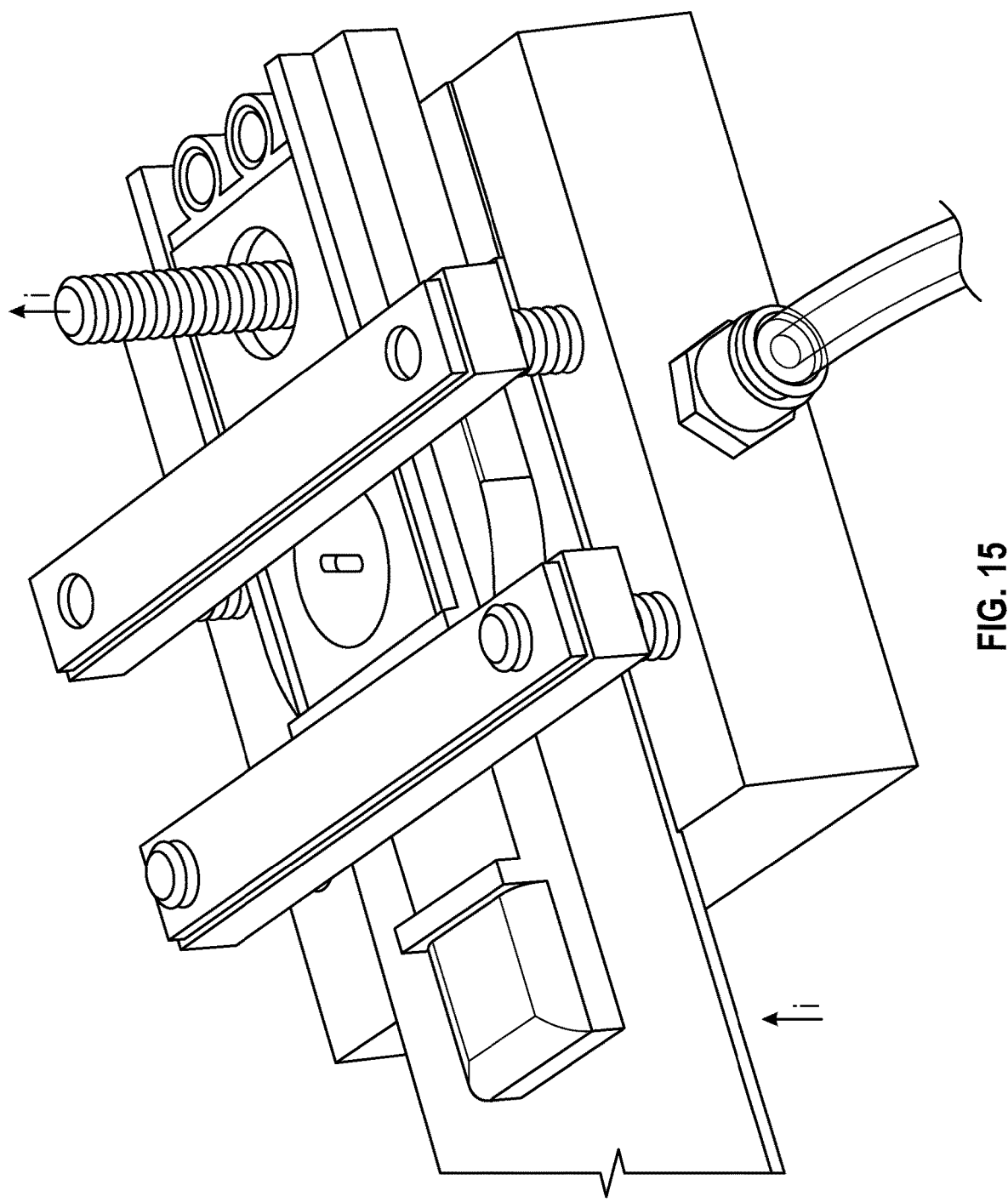
FIG. 15 is a schematic depiction of a test fixture used to test a pressure disconnect device.

The test setup is shown in FIG. 15 was utilized to test a pressure disconnect device according to the present disclosure. The pressure disconnect device assembly includes a pressure dome that is welded on an aluminum coupon, a hammer, a fuse and a fuse holder. The test fixture has an adaptor to adapt the pressure dome. A pre-determined pressure is applied through the pressure dome adaptor. A thermocouple is attached on the pressure dome near the edge of the hammer contact area. Current clamps are connected to the assembly and a 900 amp current is applied.

Figure 16:
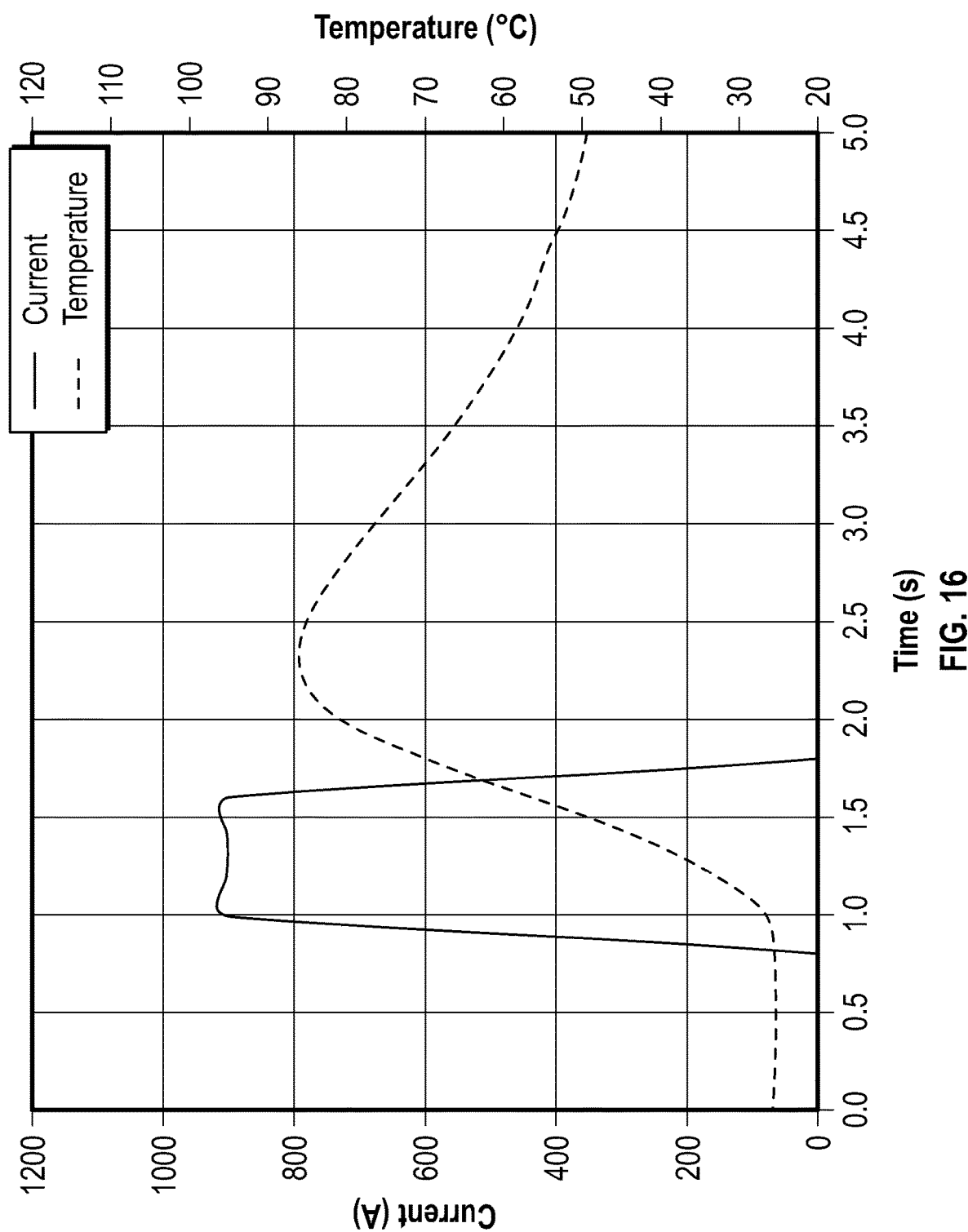
FIG. 16 is a plot of current and temperature variation during test of a pressure disconnect device assembly.

Apply pressure of 25 psi to activate the unit. The current and temperature variation during the test are plotted in FIG. 16. The fuse was blown approximately 0.6 seconds after the pressure dome activation. The maximum temperature measured at the pressure dome is about 86° C. Thus, the pressure disconnect device operated as desired, and would have been effective in protecting a cell if mounted with respect to a lithium battery as described herein.

Figure 17:
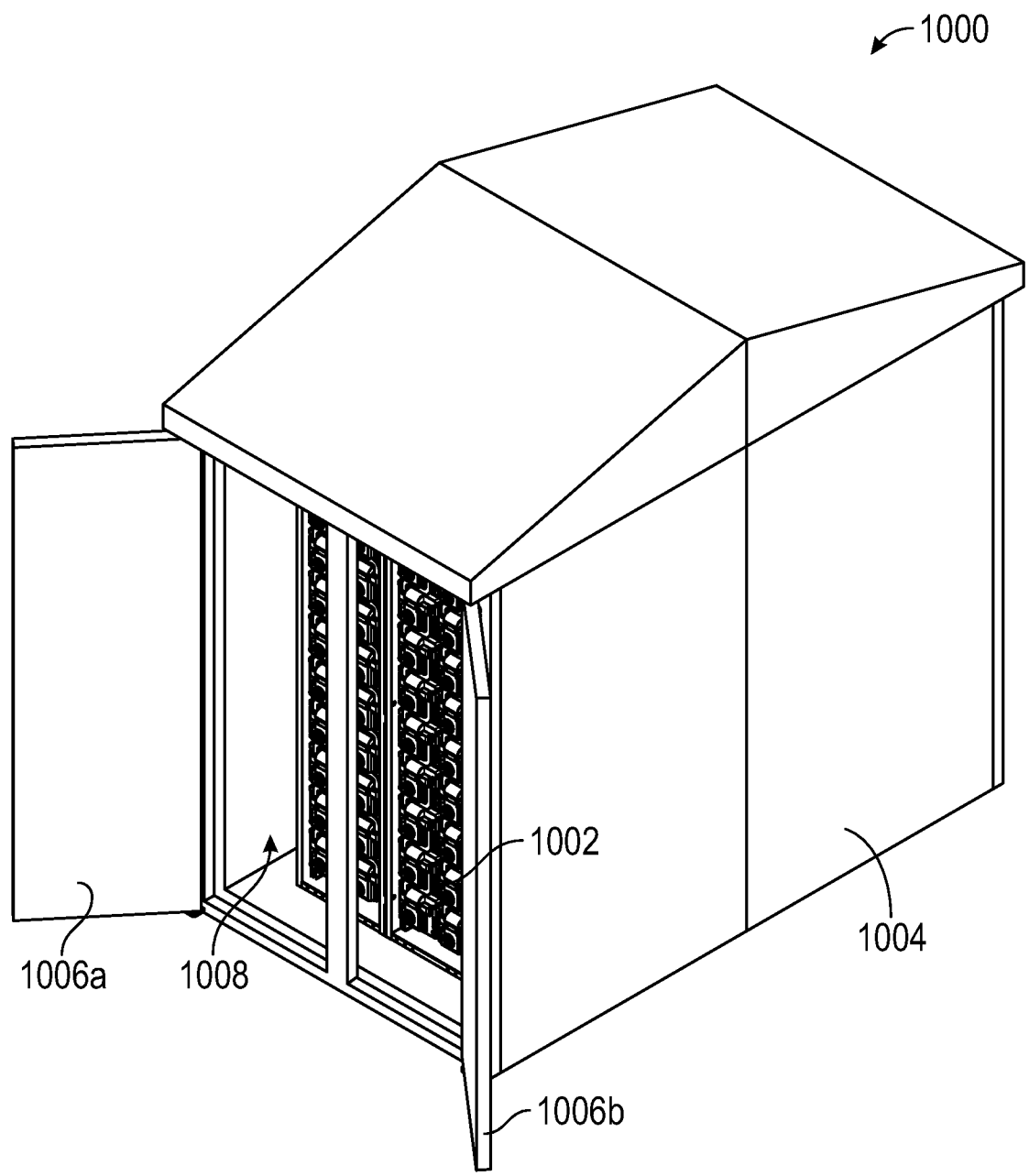
FIGS. 17-19 are schematic depictions of a battery system positioned within a trailer, i.e., an exemplary enclosed space.
Figure 18:
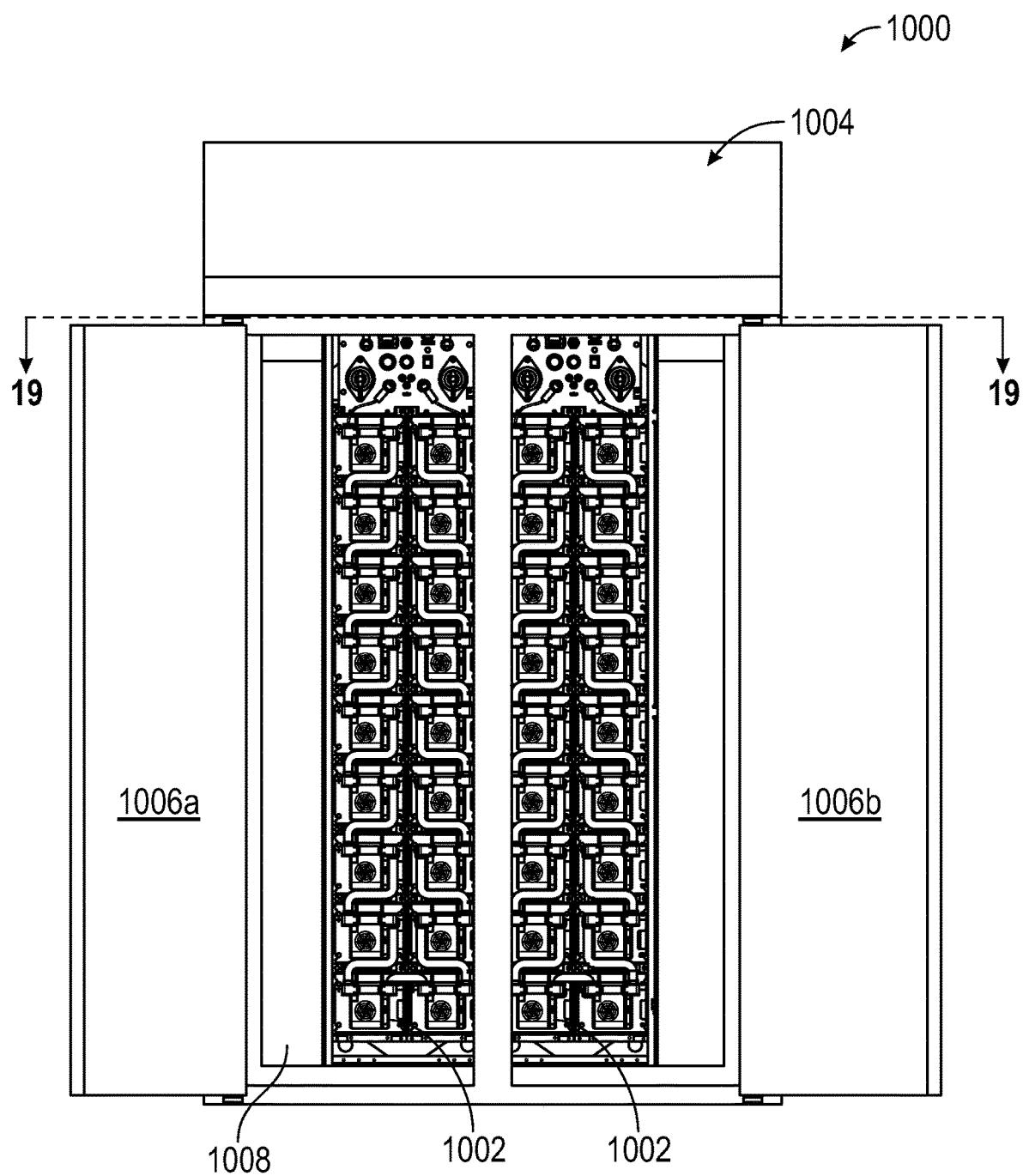
Figure 19:
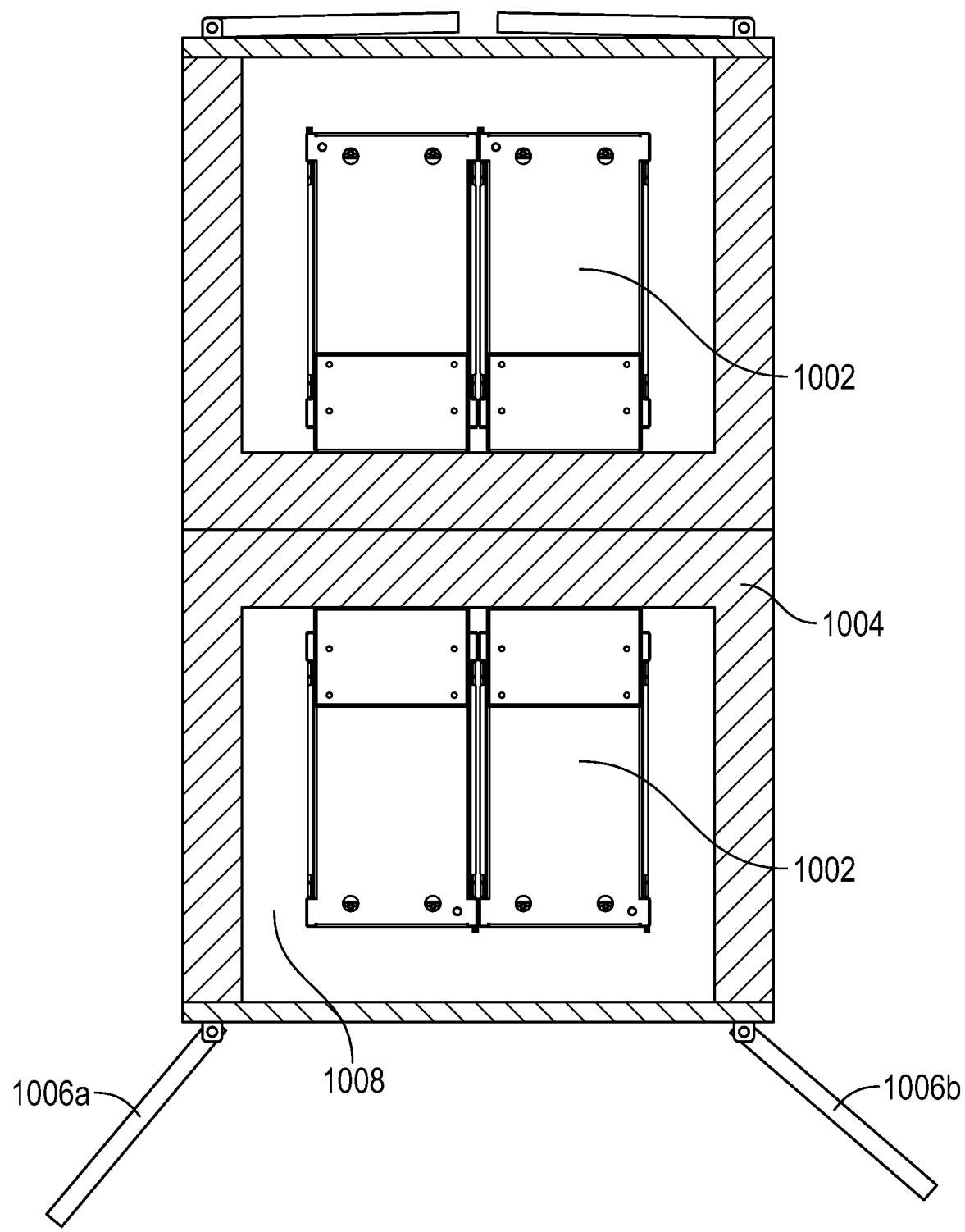

Turning to FIGS. 17-19, schematic depictions of a first exemplary battery system 1000 are provided. Batteries 1002 are positioned within a trailer 1004, i.e., an enclosed space, that includes hinged doors 1006a, 1006b. The trailer 1002 defines an internally available volume 1008. The batteries 1002 are positioned on racks or in cabinets and include internal components/design features that are not visible including, inter alia, a plurality of modules, wherein at least one of the plurality of modules includes a plurality of Li-ion cells, and wherein the plurality of Li-ion cells includes a first Li-ion cell and a second Li-ion cell in a side-by-side orientation, and at least one thermal insulator positioned between the first Li-ion cell and the second Li-ion cell, wherein the at least one thermal insulator has a thickness of at least 0.3 mm and an insulating conductivity that is less than 0.5 W/mK. Of note, the energy capacity of the battery system 1000 is selected so as to ensure that the internally available volume 1008 (measured in liters) is in the range of about 39±5 times and 80±5 times the amp-hour (Ah) capacity of one individual Li-ion cell of the plurality of Li-ion cells associated with batteries 1002.

Figure 20:
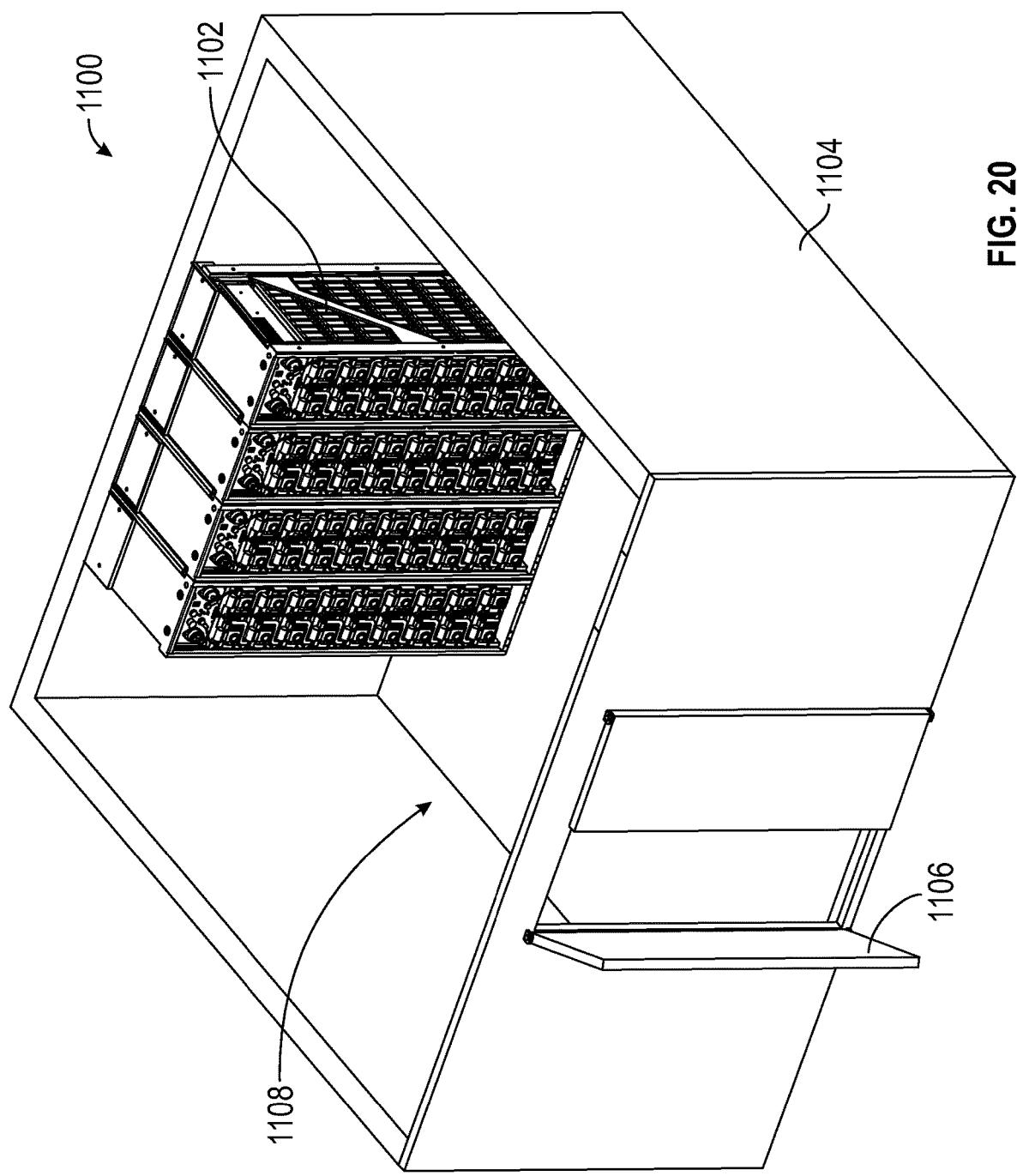
FIG. 20-22 are schematic depictions of a battery system positioned within a data room, i.e., an alternative exemplary enclosed space.
Figure 21:
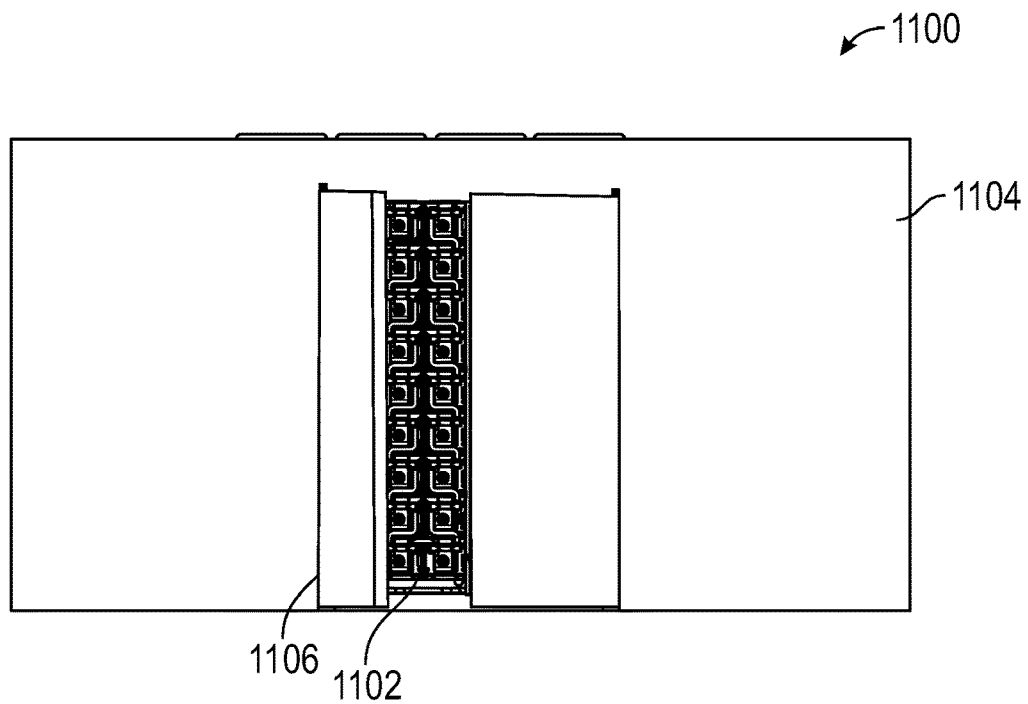
Figure 22:
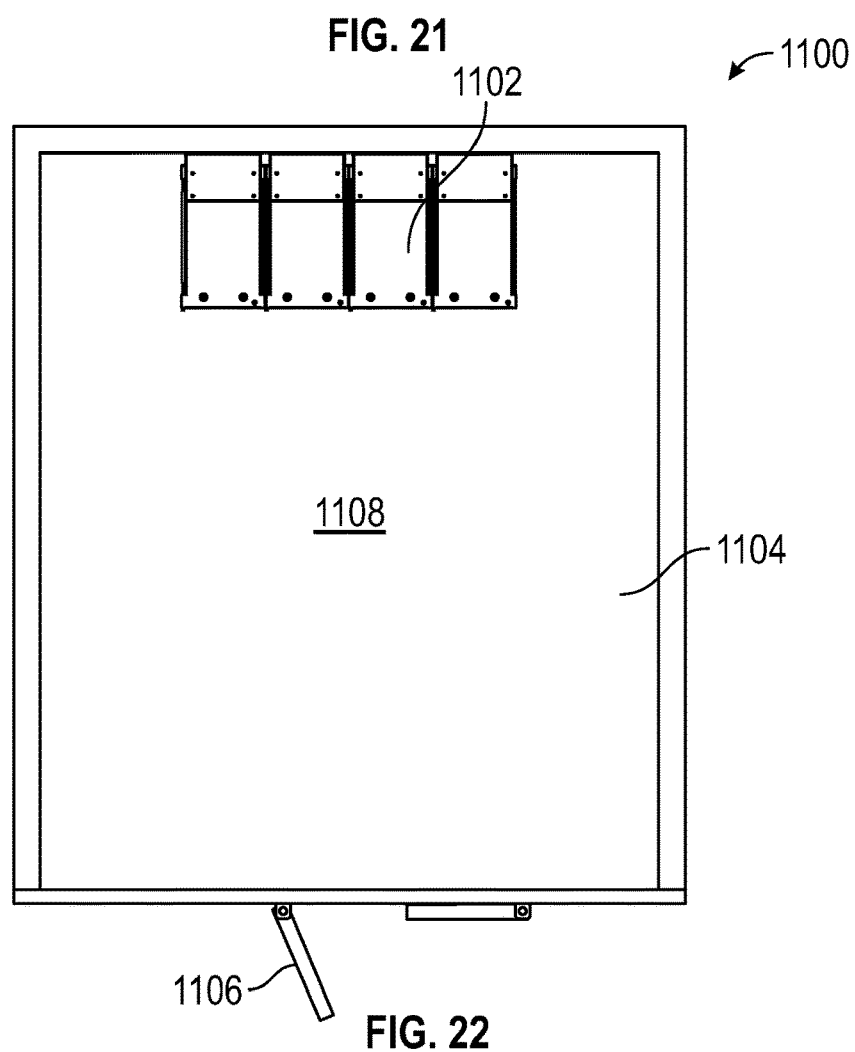

FIGS. 20-22 depict battery system 1100 that includes batteries 1102 positioned within a data room 1104, i.e., an enclosed space, that includes a hinged door 1106. The data room 1104 defines an internally available volume 1108. The batteries 1102 are positioned on racks or in cabinets and include internal components/design features that are not visible including, inter alia, a plurality of modules, wherein at least one of the plurality of modules includes a plurality of Li-ion cells, and wherein the plurality of Li-ion cells includes a first Li-ion cell and a second Li-ion cell in a side-by-side orientation, and at least one thermal insulator positioned between the first Li-ion cell and the second Li-ion cell, wherein the at least one thermal insulator has a thickness of at least 0.3 mm and an insulating conductivity that is less than 0.5 W/mK. Of note, the energy capacity of the battery system 1100 is selected so as to ensure that the internally available volume 1108 (measured in liters) is in the range of about 39±5 times and 80±5 times the amp-hour (Ah) capacity of one individual Li-ion cell of the plurality of Li-ion cells associated with battery system 1100.

Figure 23:
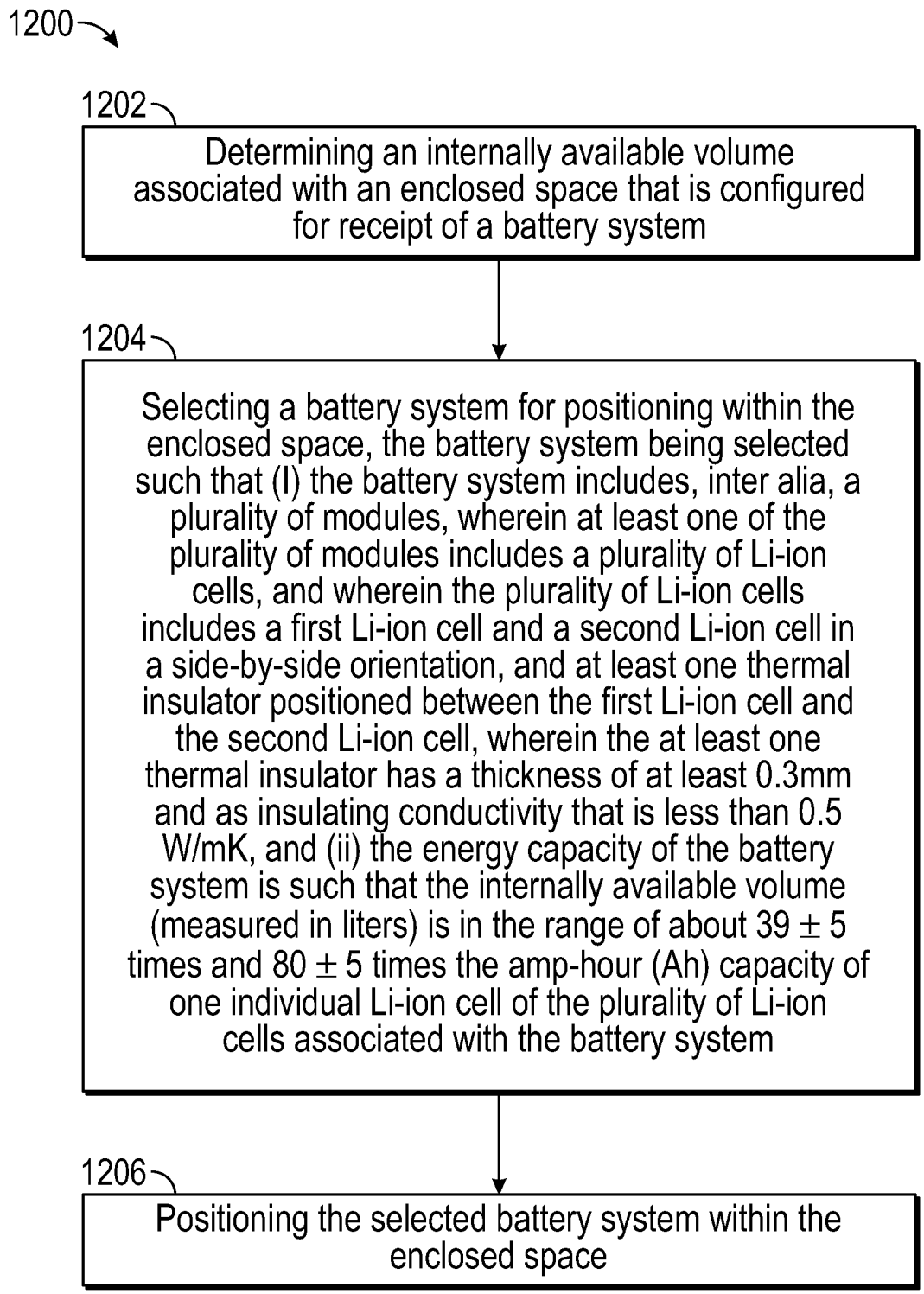
FIG. 23 is a flowchart reflecting steps associated with deployment of a battery system in an enclosed space according to the present disclosure.

With reference to FIG. 23, flowchart 1200 provides a flowchart reflecting steps associated with deployment of a battery system in an enclosed space according to the present disclosure. As depicted in flowchart 1200, operative steps for battery system deployment according to an exemplary implementation of the present disclosure includes:

Step 1202: Determining an internally available volume associated with an enclosed space that is configured for receipt of a battery system;

Step 1204: Selecting a battery system for positioning within the enclosed space, the battery system being selected such that (i) the battery system includes, inter alia, a plurality of modules, wherein at least one of the plurality of modules includes a plurality of Li-ion cells, and wherein the plurality of Li-ion cells includes a first Li-ion cell and a second Li-ion cell in a side-by-side orientation, and at least one thermal insulator positioned between the first Li-ion cell and the second Li-ion cell, wherein the at least one thermal insulator has a thickness of at least 0.3 mm and an insulating conductivity that is less than 0.5 W/mK, and (ii) the energy capacity of the battery system is such that the internally available volume (measured in liters) is in the range of about 39±5 times and 80±5 times the amp-hour (Ah) capacity of one individual Li-ion cell of the plurality of Li-ion cells associated with the battery system; and Step 1206: Positioning the selected battery system within the enclosed space.

In a further exemplary embodiment of the present disclosure, a battery design is provided that addresses two major heat transfer modes in a module, namely conduction through contact with neighboring cells and convection through venting gas.

According to the disclosed battery design, conduction through contact with neighboring cells can be mitigated through inclusion, inter alia, of a thermal insulating mat placed between cells.

With reference to the second noted cause of heat transfer, the venting gas from a lithium ion cell is flammable and hot. When the void space in an enclosure is insufficient, the venting gas content will be above LFL, which can result in ignition or fire. If the fire or hot venting gas propagates to neighboring cells, these cells will undergo thermal runaway. The venting gas thus needs to be prevented from reaching neighboring cells to the extent possible.

Figure 24:
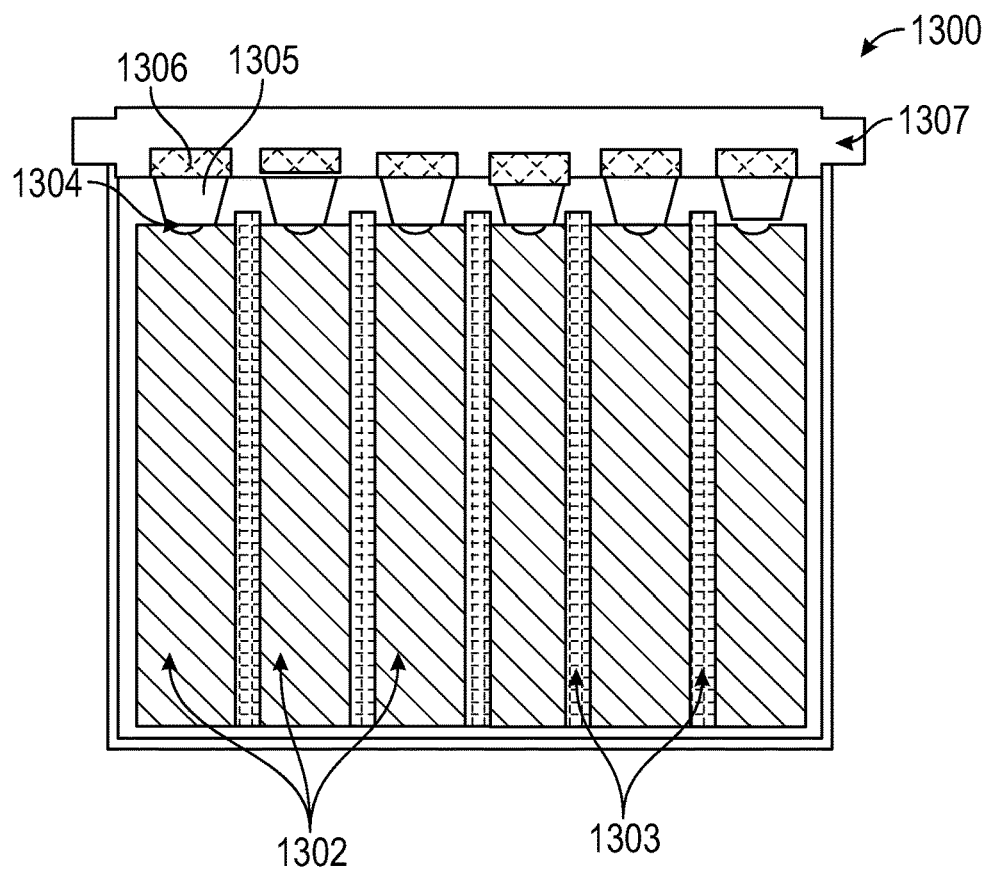
FIG. 24 is a sectional depiction of the interior of a battery system that includes a venting gas pathway for controlled venting of gas generated within the battery system.

With reference to FIG. 24, a sectional side view of a battery module 1300 is provided that includes a plurality of cells 1302 in side-by-side relation. A thermal insulating mat 1303 is positioned between adjacent cells 1302, thereby minimizing heat transfer therebetween. When a cell 1302 undergoes thermal runaway, its vent 1304 opens. A ceramic cup 1305 is located above the vent 1304, so that the venting gas flows through the ceramic cup 1306. A thermal insulating cover layer 1306 is placed between each individual ceramic cup 1305 and a venting gas passing channel 1307 that extends transversely thereabove. The venting gas passing channel 1307 is in communication with each of the ceramic cups 1305 associated with respective cells 1302. When a cell 1302 undergoes venting and thermal runaway, the thermal insulating cover layer 1306 will be blown off by the venting gas, and the venting gas is guided into the gas passing channel 1307. The thermal insulating cover layers 1306 covering other ceramic cups 1305 prevent the venting gas in the venting gas passing channel 1307 from flowing back to other cells 1302 in the module 1300. Thus, the venting gas is prevented from reaching neighboring cells.

It is generally preferred that the venting gas passing channel 1307 is pre-filled with inert gas, such as nitrogen, carbon dioxide, etc. When the venting gas flows into the gas passing channel 1307, it will not be ignited due to the absence of air. To enable pre-filling inert gas, the venting gas passing channel 1307 needs to be sealed. The seals between the venting gas passing channel 1307 and individual ceramic cup(s) 1305 can be placed under each thermal insulating cover layer 1306. These seals need to be sufficiently weak to allow the venting gas to break through such seal. In addition, at least one of the ends of the venting gas passing channel 1307 is also weakly sealed to allow the venting gas to flow therethrough in instances where venting of gas from a cell 1302 has occurred. Both ends of the venting gas passing channel 1307 may be weakly sealed to allow potential release of vent gas at both ends thereof.

According to exemplary embodiments, the venting gas passing channel 1307 can be used for individual modules, but also shared by multiple modules in a battery pack/unit.

Figure 25:
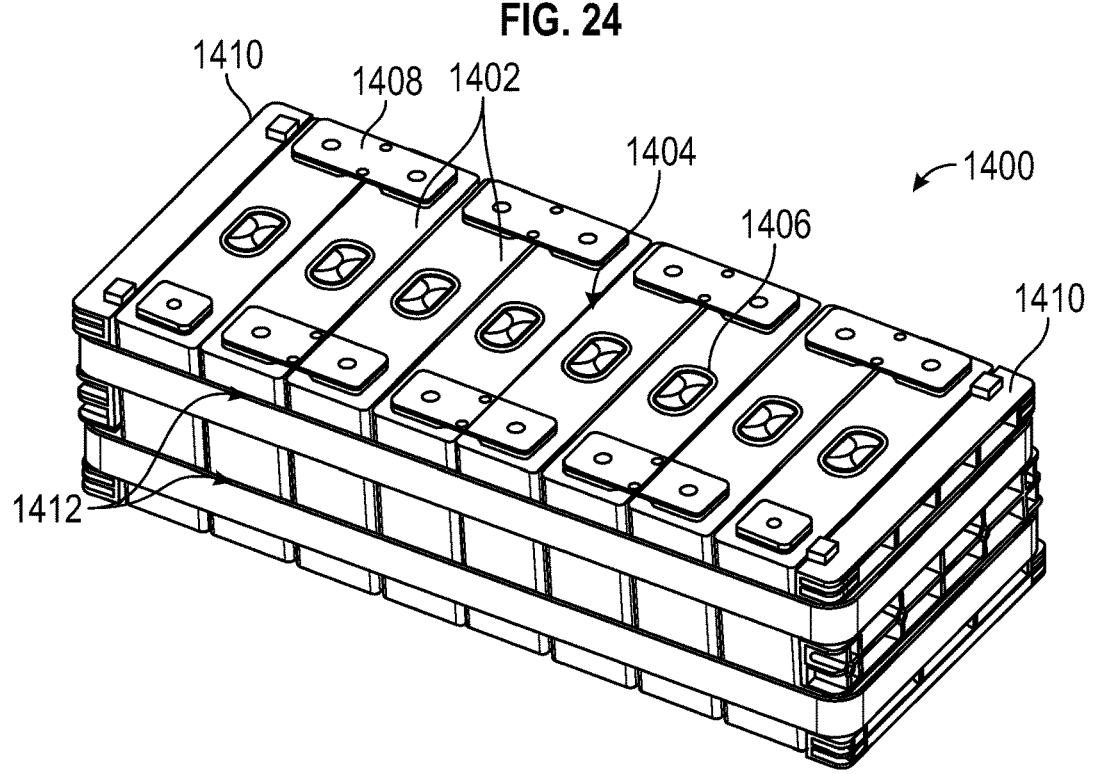
FIG. 25 is a schematic depiction of eight (8) prismatic cells in side-by-side relation with a separator positioned therebetween.

Turning to FIG. 25, a perspective view of an exemplary battery module 1400 is provided. Module 1400 includes eight (8) cells 1402 in side-by-side relation. A mat 1404, e.g., a ceramic mat, is positioned between adjacent cells 1402 to minimize heat transfer therebetween. A vent 1406 is provided for each of the cells 1402 to allow venting of gases that are generated by the cell, e.g., in the case of thermal runaway. Adjacent cells 1402 are in electrical communication with each other based on busbars 1408 that communicate between the terminals of adjacent cells 1402. A pair of module end plates 1410 are provided, one at each end of module 1400, and module straps 1412 extend around the overall module assembly to secure the cells relative to each other. Thus, each of module straps 1412 extends around the two module end plates 1410 and the side-by-side cells 1402 (with ceramic mats 1404 positioned therebetween) to define an assembled battery module 1400.

Although the present disclosure has been described with reference to exemplary embodiments and implementations thereof, the present disclosure is not limited by or to such exemplary embodiments or implementations. Rather, the present disclosure may be embodied in other forms without departing from the spirit or essential characteristics thereof. The present embodiments are therefore to be considered in all respects as illustrative and not restrictive.

The invention claimed is:

1. A battery system comprising:
an enclosed space;
one or more lithium ion batteries positioned within the enclosed space, each of the one or more lithium ion batteries including a plurality of modules, wherein each of the plurality of modules includes a plurality of Li-ion cells, and wherein the plurality of Li-ion cells includes a first Li-ion cell and a second Li-ion cell in a side-by-side orientation; and at least one thermal insulator positioned between the first Li-ion cell and the second Li-ion cell, wherein said at least one thermal insulator has a thickness of at least 0.3 mm and an insulating conductivity that is less than 0.5 W/mK,
wherein the enclosed space defines an internally available volume measured in liters that is in the range of about 34 times and 85 times the amp-hour capacity of the first Li-ion cell.

2. The system of claim 1, wherein the plurality of Li-ion cells are lithium iron phosphate (LFP) cells, and wherein each of the LFP cells has a capacity in a range of 10 Ah to 70 Ah.

3. The system of claim 2, wherein the internally available volume of the enclosed space is greater than 340 liters.

4. The system of claim 2, wherein the internally available volume of the enclosed space is less than 5,950 liters.

5. The system of claim 1, wherein the plurality of Li-ion cells are lithium nickel manganese cobalt oxide (NMC) cells, and wherein each of the NMC cells has a capacity in a range of 6 Ah to 50 Ah.

6. The system of claim 5, wherein the internally available volume of the enclosed space is greater than 210 liters.

7. The system of claim 5, wherein the internally available volume of the enclosed space is greater than 3750 liters.

8. The battery system in claim 1, wherein each of the Li-ion cells has a pressure-activated vent.

9. The battery system of claim 8, wherein each pressure-activated vents is equipped with a flame arrestor.

10. The battery system in claim 8, wherein the pressure-activated vent is activated at a pressure below about 100 psi.

11. The battery system of claim 8, wherein the battery is configured such that, when activated, gas that is released through each pressure-activated vent is directed to a pocket or channel filled with inert gas.

12. The battery system of claim 1, wherein the at least one thermal insulator includes one or more materials is selected from the group consisting of nesquehonite, gypsum, magnesium phosphate octahydrate, aluminium hydroxide, hydromagnesite, dawsonite, magnesium hydroxide, magnesium carbonate subhydrate, boehmite, calcium hydroxide, and sodium bicarbonate.

13. The battery system of claim 1, wherein the at least one thermal insulator is a ceramic separation structure.

14. The battery system of claim 1, wherein the at least one thermal insulator includes a microporous material, a fiber matrix and an opacifier.

15. The battery system of claim 1, wherein the at least one thermal insulator includes alumina trihydroxide.

16. The battery system of claim 1, wherein the at least one thermal insulator includes a metal oxide.

17. The battery system of claim 1, wherein the at least one thermal insulator includes mineral wool.

18. The battery system of claim 1, wherein the at least one thermal insulator includes a silicate-based ceramic material.

19. The battery system of claim 1, wherein the thickness (in mm) of the at least one thermal insulator is equal to or larger than about 1% of the energy density of the Li-ion cell measured as Wh/kg.

20. The battery system of claim 1, wherein the first Li-ion cell is an individual Li-ion cell.

21. The battery system of claim 1, wherein the first Li-ion cell is a group or subset of Li-ion cells that are collectively thermally isolated from a second Li-ion cell or subset of Li-ion cells by the at least one thermal insulator.

22. The battery system of claim 21, wherein the amp-hour capacity of the first Li-ion cell for the group or subset of Li-ion cells is the cumulative amp-hour capacity of the Li-ion cells included in such group or subset of Li-ion cells.

23. The battery system of claim 1, further comprising one or more fans to enhance atmospheric movement within the enclosed space.

24. The battery system of claim 1, wherein the at least one thermal insulator is configured and dimensioned to isolate a temperature increase from transferring from the first Li-ion cell to the second Li-ion cell to the extent necessary to propagate thermal runaway or ignition of the second Li-ion cell.

* * * * *